United States Patent [19]
Olnowich

[11] Patent Number: 6,122,659
[45] Date of Patent: Sep. 19, 2000

[54] MEMORY CONTROLLER FOR CONTROLLING MEMORY ACCESSES ACROSS NETWORKS IN DISTRIBUTED SHARED MEMORY PROCESSING SYSTEMS

[75] Inventor: Howard Thomas Olnowich, Endwell, N.Y.

[73] Assignee: International Business Machines Corporation, Armonk, N.Y.

[21] Appl. No.: 09/394,565

[22] Filed: Sep. 10, 1999

Related U.S. Application Data

[62] Division of application No. 08/890,341, Jul. 10, 1997, Pat. No. 6,044,438.

[51] Int. Cl.[7] .......................... G06F 15/167; G06F 12/00
[52] U.S. Cl. ...................... 709/213; 709/214; 711/120; 707/201
[58] Field of Search ..................................... 709/213, 214; 711/120, 130, 142, 150; 707/201

[56] References Cited

U.S. PATENT DOCUMENTS

| | | |
|---|---|---|
| 4,399,504 | 8/1983 | Watts et al. . |
| 4,562,539 | 12/1985 | Vince . |
| 4,651,318 | 3/1987 | Luderer .................................... 370/422 |
| 4,755,930 | 7/1988 | Wilson, Jr. et al. . |
| 4,965,719 | 10/1990 | Shoens et al. . |
| 5,313,609 | 5/1994 | Baylor et al. . |
| 5,442,758 | 8/1995 | Slingwine et al. . |
| 5,444,705 | 8/1995 | Olnowich et al. . |
| 5,452,447 | 9/1995 | Nelson et al. . |
| 5,499,349 | 3/1996 | Nikhil et al. . |
| 5,530,816 | 6/1996 | Holt . |
| 5,535,116 | 7/1996 | Gupta et al. . |
| 5,537,569 | 7/1996 | Masubichi . |
| 5,537,574 | 7/1996 | Elko et al. . |
| 5,557,792 | 9/1996 | Josten et al. . |
| 5,561,809 | 10/1996 | Elko et al. . |
| 5,592,625 | 1/1997 | Sandberg . |
| 5,610,953 | 3/1997 | Olnowich et al. . |
| 5,611,049 | 3/1997 | Pitts . |
| 5,737,568 | 4/1998 | Hamaguchi et al. . |
| 5,832,534 | 11/1998 | Singh et al. . |
| 5,835,024 | 11/1998 | Olnowich et al. . |
| 6,044,438 | 3/2000 | Olnowich ................................ 711/130 |

OTHER PUBLICATIONS

M. Duboise et al. "Effects of Cache Coherency in Mulit-processors", *IEEE Transactions on Computers*, vol. C–31, No. 11, Nov. 1982.

*Primary Examiner*—Krisna Lim
*Attorney, Agent, or Firm*—Shelley M Backstrand

[57] ABSTRACT

A shared memory parallel processing system interconnected by a multi-stage network combines new system configuration techniques with special-purpose hardware to provide remote memory accesses across the network, while controlling cache coherency efficiently across the network. The system configuration techniques include a systematic method for partitioning and controlling the memory in relation to local verses remote accesses and changeable verses unchangeable data. Most of the special-purpose hardware is implemented in the memory controller and network adapter, which implements three send FIFOs and three receive FIFOs at each node to segregate and handle efficiently invalidate functions, remote stores, and remote accesses requiring cache coherency. The segregation of these three functions into different send and receive FIFOs greatly facilitates the cache coherency function over the network. In addition, the network itself is tailored to provide the best efficiency for remote accesses.

24 Claims, 41 Drawing Sheets

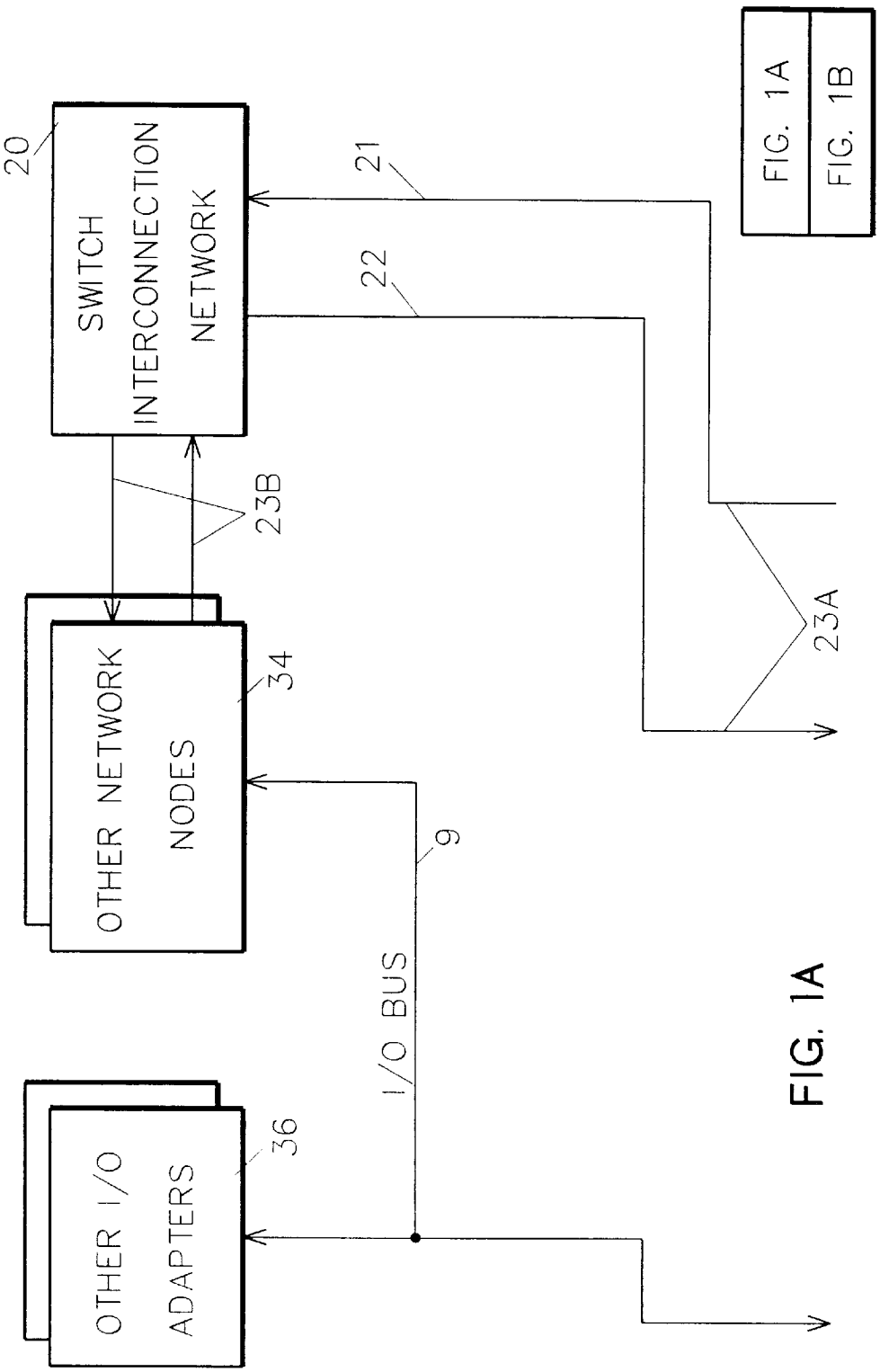

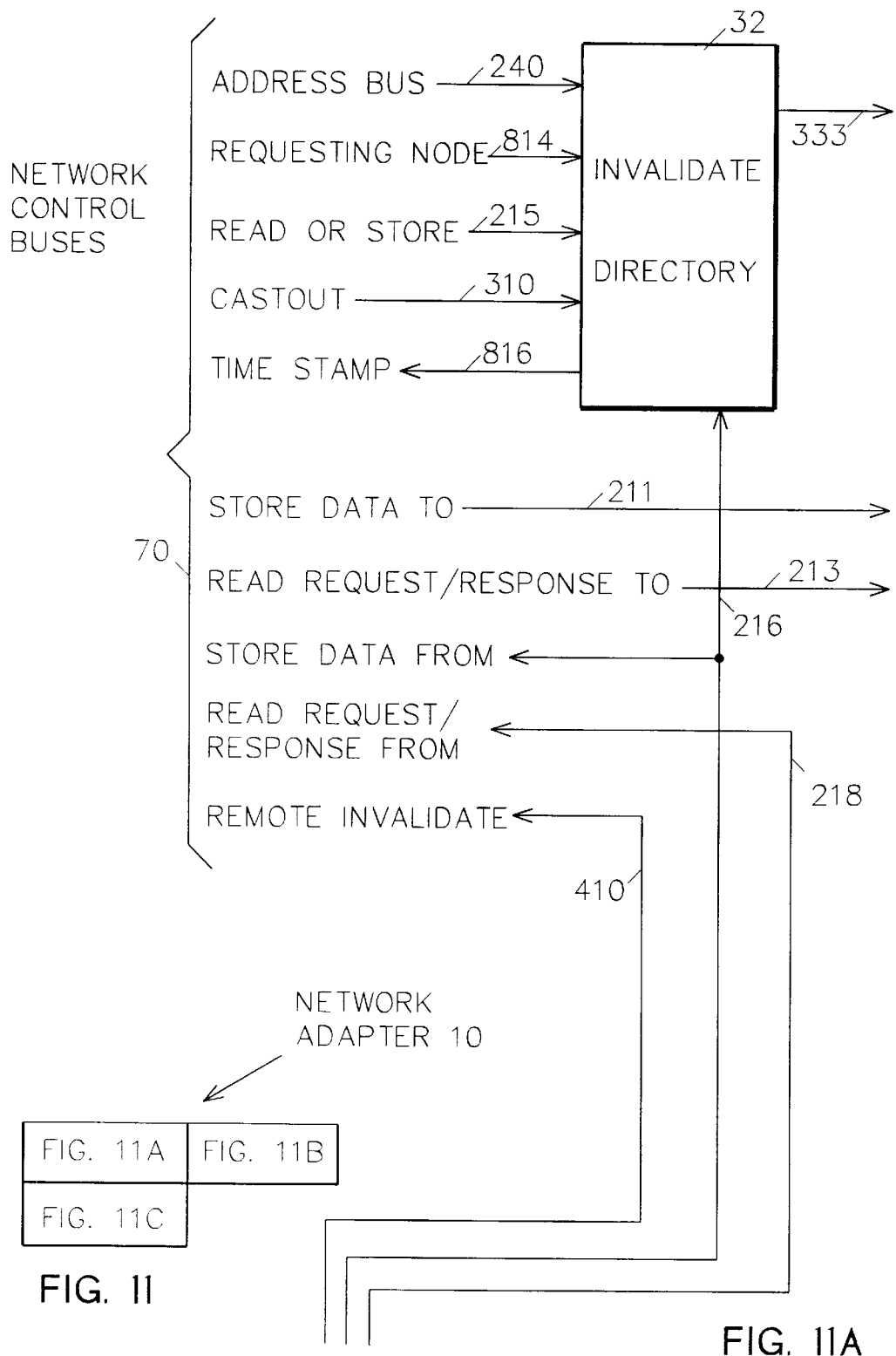

| | MEMORY AREA | SENDING NODE ID | TIME STAMP | WORD COUNT | DESTINATION NODE ID | MEMORY ADDRESS |
|---|---|---|---|---|---|---|
| 0 1 1 | 0 OR 1 | | | | | |
| 810 811 812 | 815 | 813A | 817 | 819 | 813B | 818 |

↗ 13C

FIG. 13C    RESPONSE

| | MEMORY AREA | SENDING NODE ID | TIME STAMP | WORD COUNT | NODE ID ASSIGNMENT | MEMORY ADDRESS ALL ZEROS |
|---|---|---|---|---|---|---|
| 1 0 0 | 0 | | | | | |
| 810 811 812 | 815 | 813A | 817 | 819 | 813B | 818 |

↗ 13D

FIG. 13D    NODE ID ASSIGNMENT

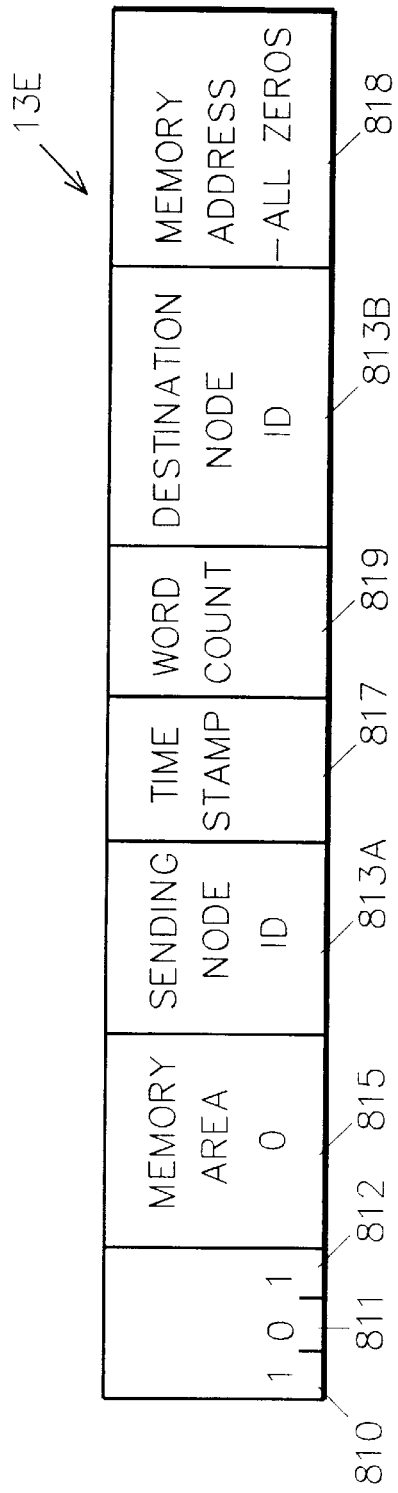
FIG. 13E  INVALIDATION
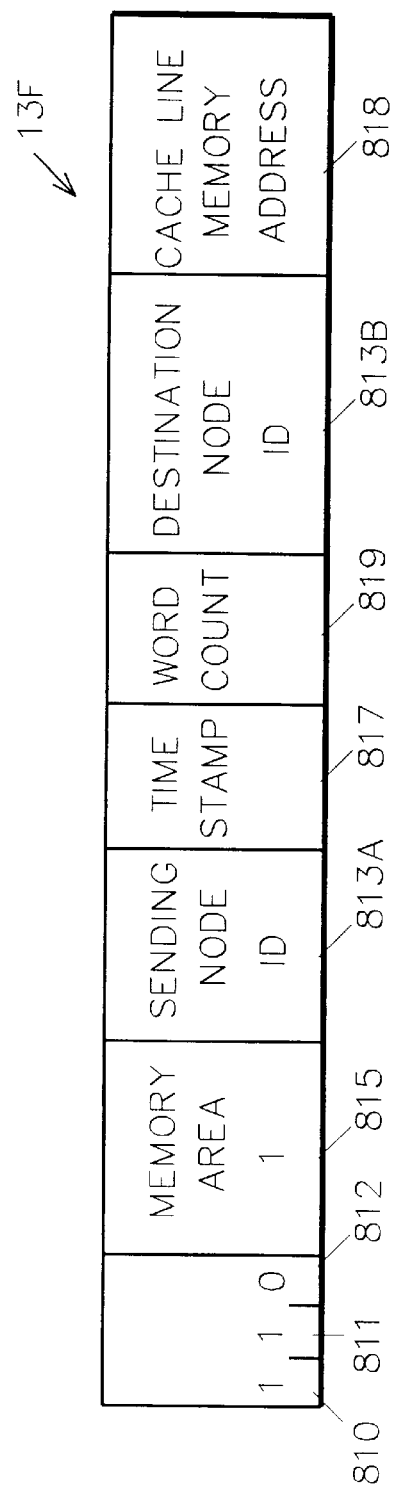
FIG. 13F  CAST OUT

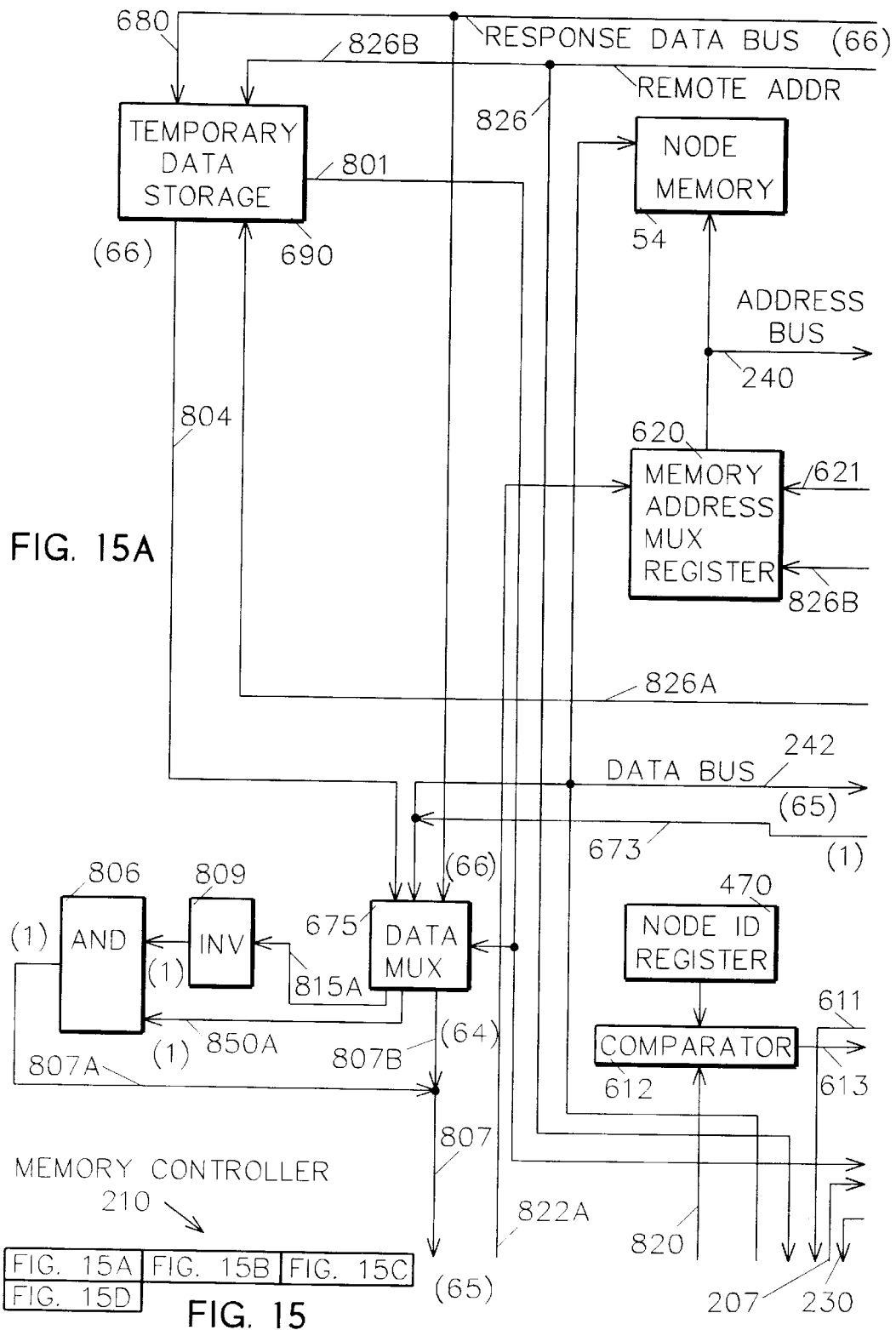

MEMORY CONTROLLER FOR CONTROLLING MEMORY ACCESSES ACROSS NETWORKS IN DISTRIBUTED SHARED MEMORY PROCESSING SYSTEMS

CROSS-REFERENCES TO RELATED APPLICATIONS

This application is a divisional of Ser. No. 08/890,341, filed Jul. 10, 1997 U.S. Pat. No. 6,044,438 issued Mar. 28, 2000 to by Howard T. Olnowich for Memory Controller for Controlling Memory Accesses Across Networks in Distributed Shared Memory Processing Systems (as amended). U.S. patent application Ser. No. 08/891,404, filed Jul. 10, 1997, entitled "Cache Coherent Network Adapter For Scalable Shared Memory Processing Systems", filed concurrently herewith is assigned to the same assignee hereof and contains subject matter related, in certain respects, to the subject matter of the present application; it is incorporated herein by reference.

BACKGROUND OF THE INVENTION

1. Technical Field of the Invention

This invention relates to digital parallel processing systems, wherein a plurality of nodes communicate via messages over an interconnection network and share the entire memory of the system. In particular, this invention deals with distributing the shared memory amongst all the system nodes, such that each node implements a portion of the entire memory. More specifically, the invention relates to a tightly coupled system including local caches at each node, and a method for maintaining cache coherency efficiently across a network using distributed directories, invalidation, read requests, and write-thru updates.

2. Background Art

As more and more processor performance is demanded for computing and server systems, shared memory processors (SMPs) are becoming an important option for providing better performance. SMPs comprise a plurality of processors that share a common memory pool with a part or most of the memory pool being remote from each processor. There are basically two types of multiprocessing systems: tightly coupled and loosely coupled. In a tightly coupled multiprocessor, the shared memory is used by all processors and the entire system is managed by a single operating system. In a loosely coupled multiprocessor, there is no shared memory and each processor has an exclusive memory, which can be loaded from the network if desired.

For either tightly or loosely coupled systems, the accessing of memory from a remote node or location is essential. Accessing remote memory verses local memory is a much slower process and requires performance enhancement techniques to make the remote access feasible. The first performance technique uses local caches (usually several levels of cache) at each processor. Cache memories are well known in the art for being a high performance local memory and alleviating traffic problems at the shared memory or network. A cache memory comprises a data array for caching a data line retrieved from the shared memory, where a cache data line is the basic unit of transfer between the shared memory and the cache. Since the cache size is limited, the cache also includes a directory for mapping the cache line from shared memory to a location within the cache data array. The cache contains either instructions or data, which sustain the processor's need over a period of time before a refill of the cache lines are required. If the data line is found in the cache, then a cache "hit" is said to have occurred. Otherwise, a cache "miss" is detected and refill of a cache line is required, where the refill replaces a cache line that has been least recently used. When a multi-processing system is comprised of distributed shared memory, the refill can come from the local shared memory or remote shared memory resident in a different node on the network. Conventionally, caches have been classified as either "write-back" or "write-thru". For a write-thru cache, changed data is immediately stored to shared memory, so that the most recent data is always resident in the shared memory. For a write-back cache, changed data is held in the cache and only written back to shared memory when it is requested by a another node or replaced in the cache.

The execution of programs and the fetching of variables from shared memory at a remote node takes many processor cycle times (15 cycles at best and usually a lot more). The larger the system, the larger the distance to the remote memory, the more chance of conflict in the interconnection scheme, and the more time wasted when fetching from remote memory.

A second performance enhancement technique becoming popular is multi-threading, as disclosed by Nikhil et al in U.S. Pat. No. 5,499,349 "Pipelined Processor using Tokens to Indicate the Next Instruction for Each Multiple Thread of Execution" and N. P. Holt in U.S. Pat. No. 5,530,816 "Data Processing System for Handling Multiple Independent Data-driven Instruction Streams". The multi-threading technique uses the time when the processor becomes stalled because it must fetch data from remote memory, and switches the processor to work on a different task (or thread).

Traditionally, cache coherency is controlled by using a multi-drop bus to interconnect the plurality of processors and the remote memory, as disclosed by Wilson, Jr. et al in U.S. Pat. No. 4,755,930, "Hierarchical Cache Memory System and Method". Using a multi-drop bus, cache updating is a rather simple operation. Since the bus drives all processors simultaneously, each processor can "snoop" the bus for store operations to remote memory. Anytime a variable is stored to remote memory, each processor "snoops" the store operation by capturing the address of remote memory being written. It then searches its local caches to determine whether a copy of that variable is present. If it is, the variable is replaced or invalidated. If it is not, no action is taken.

Cache coherency is not so easy over networks. This is because a network cannot be snooped. A network establishes multiple connections at any time; however, each connection is between two of the plurality of nodes. Therefore, except for the two nodes involved in the transfer of data, the other nodes do not see the data and cannot snoop it. It is possible to construct a network that operates only in broadcast mode, so that every processor sees every data transfer in the system. J. Sandberg teaches this approach in U.S. Pat. No. 5,592,625, "Apparatus for Providing Shared Virtual Memory Among Interconnected Computer Nodes with Minimal Processor Involvement". Sandberg uses only writes over the network to broadcast any change in data to all nodes, causing all nodes to update the changed variable to its new value. Sandberg does not invalidate or read data over the network, as his solution assumes that each node has a full copy of all memory and there is never a need to perform a remote read over the network. Sandberg's write operation over the network to update the variables at all nodes negates the need for invalidation because he opts to replace instead of invalidate. This defeats the major advantage of a network over a bus; i.e., the capability to perform many transfers in parallel is lost since only one broadcast is allowed in the network at a time. Thus, Sandberg's approach reduces the network to having the performance of a serial bus and restricts it to performing only serial transfers—one transfer at a time. This effectively negates the parallel nature of the system and makes it of less value.

A further problem with SMP systems is that they experience performance degradation when being scaled to systems having many nodes. Thus, state-of-the-art SMP systems typically use only a small number of nodes. This typical approach is taught by U.S. Pat. No. 5,537,574, "Sysplex Shared Data Coherency Method" by Elko et al, and allows shared memory to be distributed across several nodes with each node implementing a local cache. Cache coherency is maintained by a centralized global cache and directory, which controls the read and store of data and instructions across all of the distributed and shared memory. No network is used, instead each node has a unique tail to the centralized global cache and directory, which controls the transfer of all global data and tracks the cache coherency of the data. This method works well for small systems but becomes unwieldy for middle or large scale parallel processors, as a centralized function causes serialization and defeats the parallel nature of SMP systems.

A similar system having a centralized global cache and directory is disclosed in U.S. Pat. No. 5,537,569, "Multi-processor System Utilizing a Directory Memory and Including Grouped Processing Elements Each Having Cache" by Y. Masubuchi. Masubuchi teaches a networked system where a centralized global cache and directory is attached to one node of the network. On the surface, Masubuchi seems to have a more general solution than that taught by Elko in U.S. Pat. No. 5,537,574, because Masubuchi includes a network for scalability. However, the same limitations of a centralized directory apply and defeat the parallel nature of SMP systems based upon Masubuchi.

The caching of remote or global variables, along with their cache coherency, is of utmost importance to high performance multi-processor systems. Since snoopy protocols broadcasting write only messages or using one central directory are not tenable solutions for scalability to a larger number of nodes, there is a trend to use directory-based protocols for the latest SMP systems. The directory is associated with the shared memory and contains information as to which nodes have copies of each cache line. A typical directory is disclosed by M. Dubois et al, "Effects of Cache Coherency in Multiprocessors", IEEE Transactions on Computers, vol.C-31, no. 11, November, 1982. Typically, the lines of data in the cache are managed by the cache directory, which invalidates and casts out data lines which have been modified. All copies of the data line are invalidated throughout the system by an invalidation operation, except the currently changed copy is not invalidated.

In related art, loosely coupled computer systems have been disclosed for transferring large blocks or records of data from disk drives to be stored and instructions executed at any node of the system. In U.S. Pat. No. 5,611,049, "System for Accessing Distributed Data Cache Channel at Each Network Node to Pass Requests and Data" by W. M. Pitts, Pitts teaches a special function node called a Network Distributed Cache (NDC) site on the network which is responsible for accessing and caching large blocks of data from the disk drives, designating each block as a data channel, forwarding the data to requesting nodes, and maintaining coherency if more than one node is using the data. The system is taught for local area networks, wherein nodes share large blocks of data, and the shared memory is the storage provided by the NDC. This is a good approach for local area networks and loosely coupled computer systems, but would cause unacceptably long delays between distributed shared memory nodes of tightly coupled parallel processing nodes.

Baylor et al in U.S. Pat. No. 5,313,609, "Optimum Write-back Strategy for Directory-Based Cache Coherence Protocols" teaches a system of tightly coupled processors. Baylor solves the problem of a single shared, centralized memory being a bottleneck, when all processors collide while accessing the single shared memory unit. Baylor disperses and partitions the shared memory into multiple (n) shared memory units each uniquely addressable and having its own port to/from the network. This spreads the traffic over n shared memory modules, and greatly improves performance. Baylor organizes the system by placing all the processing nodes on one side of the network and all the shared memory units on the other side of the network, which is a normal view of a shared memory system having multiple processors and multiple shared memory units. However, this organization is not designed for the computers in the field today, which combine processors and memory at the same node of the network. To provide cache coherency, Baylor uses write-back caches and distributed "global directories", which are a plurality of directories—one associated with each shared memory unit. Each global directory tracks the status of each cache line in its associated shared memory unit. When a processor requests the cache line, the global directory poles the processors having copies of the requested cache line for changes. The processors write-back to the global directory any modifications to the cache line, and then the global directory returns the updated cache line to the requesting processor. Only shared memory and the requesting node are provided the modified copy of the cache line. Other nodes must periodically request a copy if they wish to stay coherent. The method has the disadvantage of requiring a long access time to shared memory because cache coherency is provided in series with the request for shared memory data.

A. Gupta et al in U.S. Pat. No. 5,535,116, "Flat Cache-Only Multiprocessor Architecture" teaches a different directory based cache coherency system with distributed directories, which is the prior art that is most similar to the present invention. However, Gupta's invention is targeted towards Attraction Memory (AM) located at each node, instead of shared memory. Gupta defines AM as large secondary or tertiary caches storing multiple pages of data which replace main memory at each node and provide a Cache-Only Multiprocessor. A page is defined as being up to 4K bytes of sequential data or instructions. A page of data is not assigned to any specific node, but can be located in the secondary or tertiary cache at any node which has read that page from disk storage. This complicates the directories and the copying of data to various nodes. Each processing node is assigned as a "home" node to a set of physical addresses to track with its portion of the distributed directory. Since each cache data line does not usually reside at the home node having the directory which is tracking it, Grupta requires four network messages to access any cache line from a requesting node. The requesting node sends the read request over the network to the home node first. The home node access its directory to find the "master" node; i.e., the node which has the master copy of the requested data. The home node then sends the read request across the network a second time to the master node. The master node returns a copy of the requested data over the network to the requesting node. The requesting node then sends an acknowledgement message to the home node to verify that it has received the requested data, and the home node records in its directory that the requesting node has a copy of the data line. The present invention differs in that it is more efficient, having statically assigned shared memory at each node and requiring only two network messages to access any cache line. A read request goes to the node implementing the shared memory location, the data is accessed and returned while the directory is updated in parallel.

It is the object of this invention to provide an improved method and apparatus for maintaining cache coherency in a tightly coupled system.

It is a further object of the invention to maintain cache coherency over a network operating in full parallel mode through use of a write-thru cache, invalidation of obsolete data, and a distributed directory.

It is a further object of this invention to provide a tightly coupled system whereby each processing node contains a portion of the shared memory space, and wherein any node can access its local portion of shared memory or the remote portion of shared memory contained at other nodes over the network in the most expedient manner.

It is a further object of this invention to provide a directory-based cache coherency approach using a write-thru cache, invalidation of obsolete data, and a distributed directory whereby cache coherency is maintained over a network without performing broadcasts or multicasts over the network.

It is a further object of this invention to enable normal SMP performance enhancement techniques, such as caching and multi-threading, to be used with SMPs when operating over multi-stage networks.

It is a further object of this invention to support the reading and invalidation of cache lines from remote nodes over the network by implementing six different FIFOs in the network adapter for expediting remote fetches, remote stores, and invalidations over the network.

It is a further object of this invention to mark shared memory areas as containing changeable or unchangeable data, and to mark each data double-word as being changeable or unchangeable data for the purpose of providing a more efficient cache coherent system.

It is the further object of this invention to provide a small and efficient set of special-purpose messages for transmission across the network for requesting remote data, invalidating remote data, storing remote data, and responding to remote read requests.

SUMMARY OF THE INVENTION

A cache coherency system for a shared memory parallel processing system including plurality of processing nodes. A multi-stage communication network is provided for interconnecting the processing nodes. Each processing node includes one or more caches for storing a plurality of cache lines. A cache coherency directory is distributed to each of the nodes for tracking which of the nodes have copies of each cache line. A plurality of send FIFOs and receive FIFOs are used at each node adapter to segregate and handle invalidate functions, remote stores, and remote reads requiring cache coherency.

Other features and advantages of this invention will become apparent from the following detailed description of the presently preferred embodiment of the invention, taken in conjunction with the accompanying drawings.

BRIEF DESCRIPTION OF THE DRAWINGS

FIGS. 1A and 1B, arranged as shown in FIG. 1, are a diagram of a typical digital network showing the interconnection of a network node to the network and the components of the network node according to the preferred embodiment of this invention.

FIGS. 11A and 11B and 11C, arranged as shown in FIG. 11, are a diagram showing further details of and the interfaces to the network adapter including three send FIFOs, three receive FIFOs, and an invalidation directory according to the preferred embodiment of this invention.

FIGS. 13A, 13B, 13C, 13D, 13E, 13F, and 13G are diagrams showing the formats of the seven different message types used to communicate across the network according to the preferred embodiment of this invention.

FIGS. 15A, 15B, 15C and 15D, arranged as shown in FIG. 15, are a diagram showing further details of and the interfaces to the memory controller including logic for processing both local and remote reads and stores according to the preferred embodiment of this invention.

BEST MODE FOR CARRYING OUT THE INVENTION

Figure 1B:
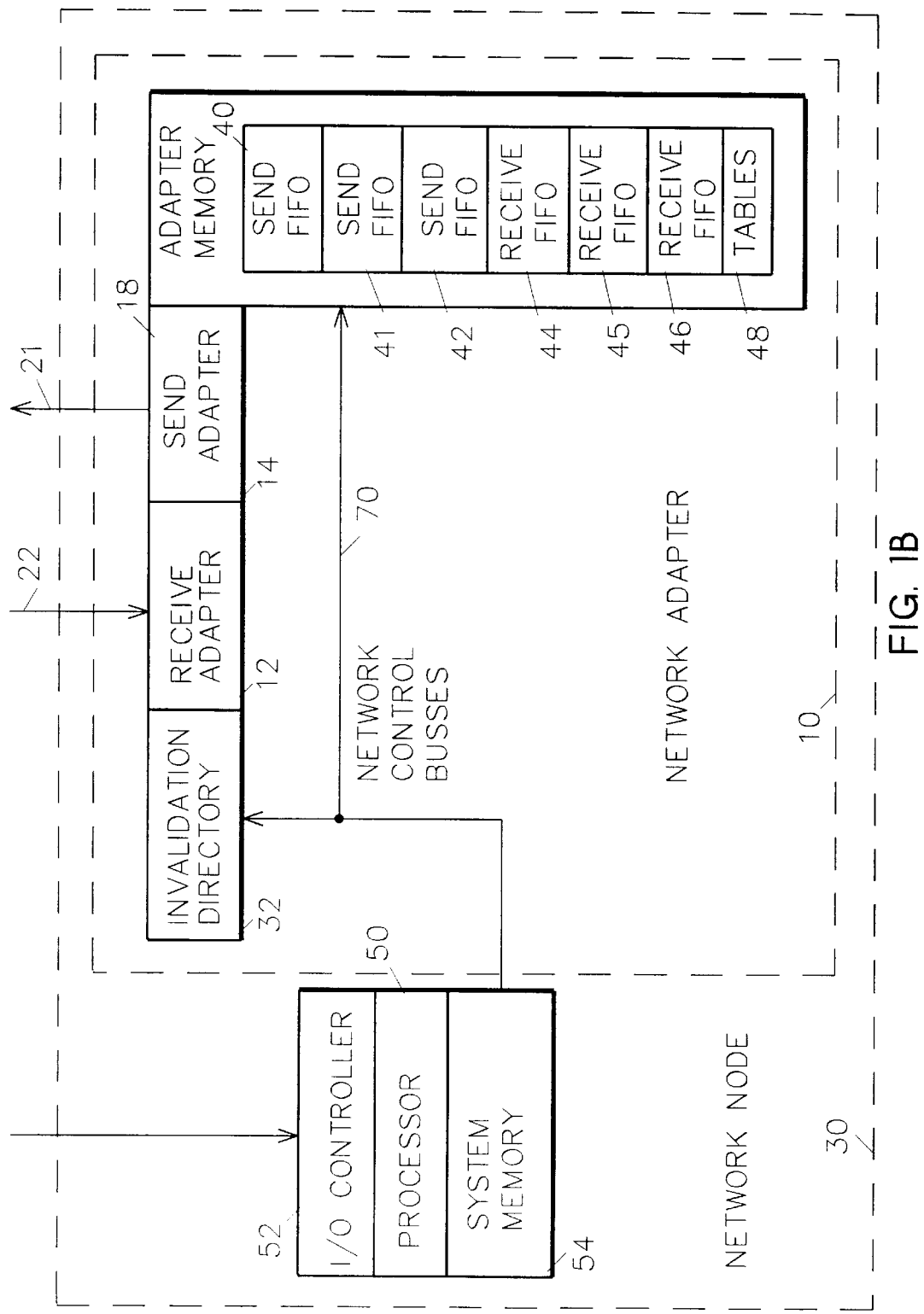

In accordance with the invention, a cache coherent network implements a tightly coupled multiprocessor system using a high speed multi-stage network to interconnect a scalable plurality of nodes. Each node implements local caches and cache coherency is maintained across the network. Each node interfaces the network through a network adapter which implements quick path mode and camp-on mode connections across the network. One quick path attempt is made to establish the connection which, if rejected, is followed by successive alternate path attempts in camp-on mode.

Three send FIFOs and three receive FIFOs are used at each node adapter to segregate and handle invalidate functions, remote stores, and remote reads requiring cache coherency. Send FIFO 1 and receive FIFO 1 are reserved for invalidate messages across the network. Send FIFO 2 and receive FIFO 2 are reserved for controlling store operations across the network, which can only occur for changeable data. Send FIFO 3 and receive FIFO 3 are reserved for controlling remote read operations across the network, which involve both a read request message and a response message. The memory controller at each node generates messages to the network when remote nodes are addressed, and sends them to specific FIFOs for transmission to the network.

In accordance with a preferred embodiment of the invention, a tightly coupled multiprocessor system is provided using a high speed multi-stage network to interconnect a scalable plurality of nodes. Each node of the system implements local caches, and cache coherency is maintained by a directory-based approach. The system implements a shared memory space which provides a single network-wide address space distributed across all nodes of the system. Each node provides a unique part of the address space and every node has access to the entire memory space.

The system of the preferred embodiment of the invention combines new system configuration techniques with special-purpose hardware to provide remote memory accesses across the network, while controlling cache coherence efficiently across the network. The system configuration techniques include a systematical method for partitioning and controlling the memory in relation to local verses remote accesses. Most of the special-purpose hardware is implemented in a network adapter, which is used to interface each node to the network. The network adapter implements many unique hardware features for controlling cache coherency over a multi-stage network. In addition, the network itself is tailored to provide the best efficiency for remote accesses.

Following is a summary of system configuration and techniques implemented in accordance with the preferred embodiment of the invention:

1. Shared Memory Distribution—the shared memory is divided into equal sectors with one sector residing at each of the nodes. The system of an exemplary embodiment can support up to 256 nodes. The memory address includes sector identification (ID) bits. For any node the sector ID bits are equal to the Node ID, which identifies the node over the network. For instance, Node 0 has a Node ID equal to 00h (hexadecimal) and the sector of memory implemented at Node 0 has a sector ID also equal to 00h.

2. Node Memory Sub-Division—the sector of memory at each node is further sub-divided into two separate areas: one for changeable data and one for unchangeable data. Cache coherency functions are only provided for the data located in the changeable area. Changeable data is also identified by an additional bit included with every word stored to memory. When set to 0, the changeable bit defines the associated memory word as being unchangeable; when set to 1, the associated memory word is changeable.

3. Non-Cacheable Data—it is possible to store changeable data to the unchangeable area of node memory; however, such data is declared to be non-cacheable, since it is located in an area of memory for which cache coherency is not provided. Thus, "changeable" data is data that is stored to an area of memory for which cache coherency is provided, and "unchangeable" data is data that is stored to an area of memory for which cache coherency is not provided.

4. I/O Registers—a Node ID register and a changeable area locator register are loaded during initialization and contain the node number of the local node and the boundaries (or extent) for the changeable data section in local memory, respectively.

5. Memory Controller—The memory controller at each node contains intelligence to decide whether an accessed address is located in local memory or remote memory. This is accomplished by comparing memory sector definition bits of the memory address word to the Node ID register. If the compare is equal, the address is located in local memory. In this case, the memory controller accesses and returns the data locally without involving the network adapter. If the compare is not equal, the address is located in remote memory and the memory controller signals the processor that a remote read is required for thread z. This causes the processor to switch program threads. The memory controller also generates a read request message to be sent to the network adapter for the memory address being accessed. The read request message is sent over the network to the node containing the addressed memory location. The data is accessed from the remote memory, returned over the network to the requesting node. The remotely accessed data is not stored to local memory. The processor can then return to executing thread z.

6. Network connection process—Further in accordance with a preferred embodiment of the network adapter of the invention, an efficient network connection algorithm is provided. The network adapter controls two types of connections across the network:

1) One quick path attempt (also referred to as a normal connection) is made first to establish the connection at low latency. This allows data to be accessed across the network in the quickest possible time for the normal case.

2) If the quick path is rejected, alternates paths (also referred to as a camp-on connection) are tried successively in camp-on mode. Camp-on causes the message to stop and wait at the last stage of the network when contention is encountered. A rejection issued by the first and middle stages causes a retry of another alternate path to circumvent network blockage. An accept going to zero and not returning to 1 immediately means that contention has been encountered at the last stage of the network. Further retries of other alternate paths will not help in this case, because network blockage is not the problem. The pending connection camps-on the last stage. Whether immediately or later, accept going to a 1 means the contention is gone and the stuck message may proceed.

7. Node Identification—The network adapter controls node numbering. In an exemplary embodiment, the network has 256 nodes and 8 node identification (ID) bits are required to uniquely define the 256 nodes.

8. Invalidate Directory—The network adapter implements the invalidate directory as a look-up table. The entries in the table keep a list of which nodes have accessed copies of changeable cache lines from the memory sector located at the associated node. Every request to read changeable data from local memory by any node (local or remote) causes the node number of the requesting node to be added to the list. Any store to a cache line that resides in the changeable section of memory causes the invalidate directory to send invalidation messages across the network to all nodes listed in the invalidate directory. As each invalidate message is sent, the corresponding entry in the list is cleared.

9. Three Send FIFOs and three RCV FIFOs—These FIFOs are used at each network adapter to segregate and handle efficiently invalidate functions, remote stores, and remote reads requiring cache coherency. They are used to control the following operations:

Send FIFO 1 and RCV FIFO 1—are reserved for invalidate messages across the network.

Send FIFO 2 and RCV FIFO 2—are reserved for controlling store operations across the network, which by definition can only occur for changeable data.

Send FIFO 3 and RCV FIFO 3—are reserved for controlling remote read operations across the network, which involve both a read request message and a response message.

The segregation of these three functions into different send and receive FIFOs greatly facilitates the cache coherency function over the network.

Referring to FIG. 1, a typical network node 30 in accordance with the system of the invention is shown. In parallel systems, a plurality of nodes 30, 34 communicate via messages sent over an interconnection network 20. Each node 30, 34 usually interfaces to network 20 via a network adapter 10. Node 30 includes processor 50, system memory 54, and I/O controller 52, and network adapter 10. Node 30 attaches to one port 23A of the network 20 in full duplex and contains network adapter 10 which sends to and receives messages from the network 20 for communication with other nodes 34.

Network adapter 10 includes four entities: 1) send adapter 14 which transmits messages from network adapter 10 to network adapters at other nodes 34 attached to network 20; 2) receive (RCV) adapter 12 which receives messages from the other network adapters at nodes 34 interfacing network 20; 3) adapter memory 18, which includes an area of memory dedicated to three send FIFOs 40, 41, 42, an area of memory dedicated to three receive (RCV) FIFOs 44, 45, 46, and an area of memory dedicated to tables 48; and 4) invalidation directory 32 (sometimes referred to as the cache coherency directory) which is provided for cache coherency across network 20. Identical copies 34 of node 30 are connected to each bidirectional port 23A, 23B of the network 20. Bi-directional port 23A includes one sending port 21 into the network (sending port with respect to network adapter 10) and one receiving port 22 from the network (receiving port with respect to network adapter 10). Sending adapter 14 at this node 30 sends a message across network 20 to RCV adapter 12 at another node 34.

In an SMP system, network adapter 10 connects from a memory controller (210, FIG. 2A) for system memory 54 via network control bus 70.

Figures 2, 2A:
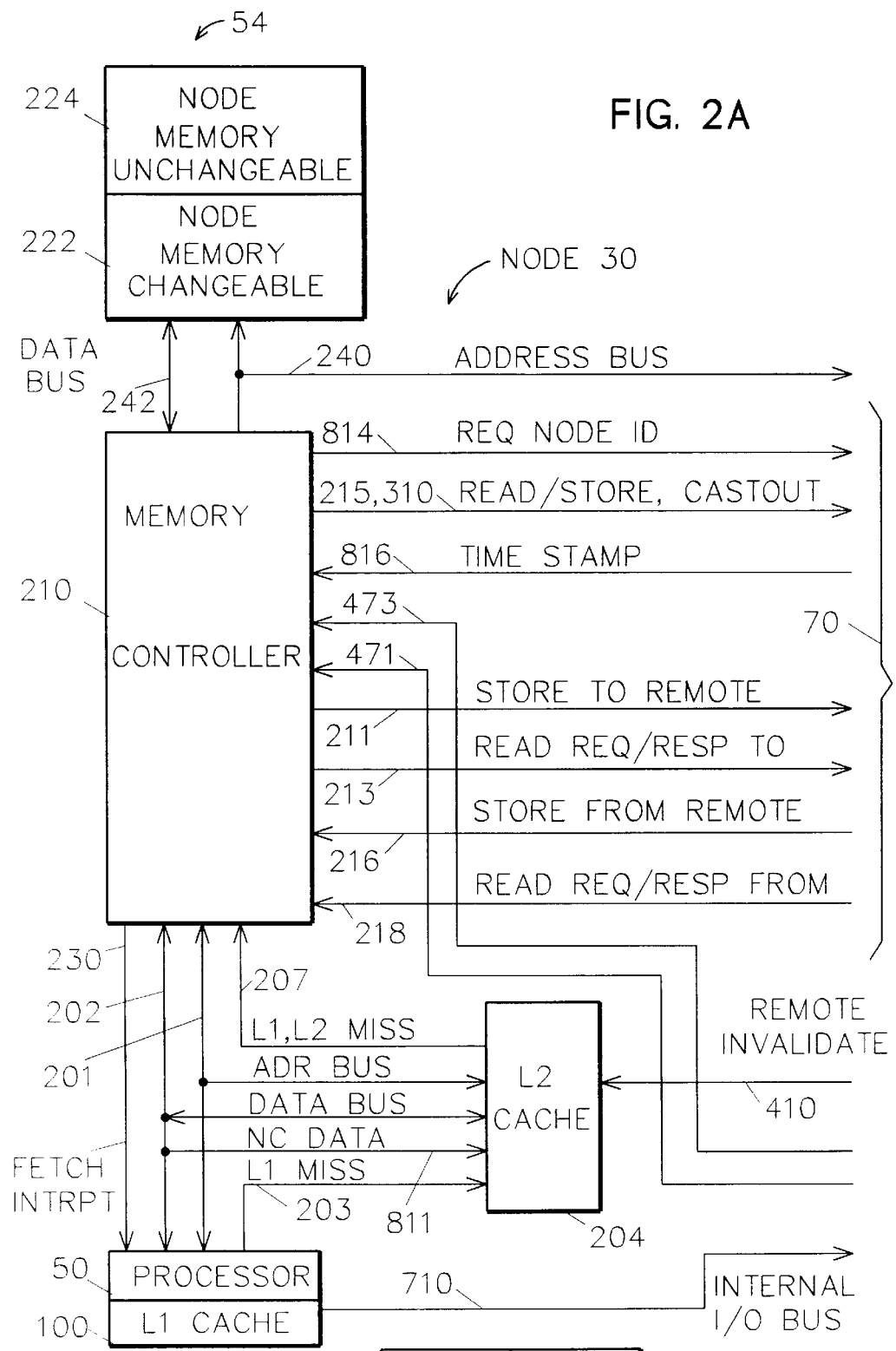
FIGS. 2A and 2B, arranged as shown in FIG. 2, are a diagram showing further details of the network node for performing cache coherency including the node memory, the memory controller, the L2 Cache, the L1 Cache, and the I/O controller according to the preferred embodiment of this invention.
Figure 2B:
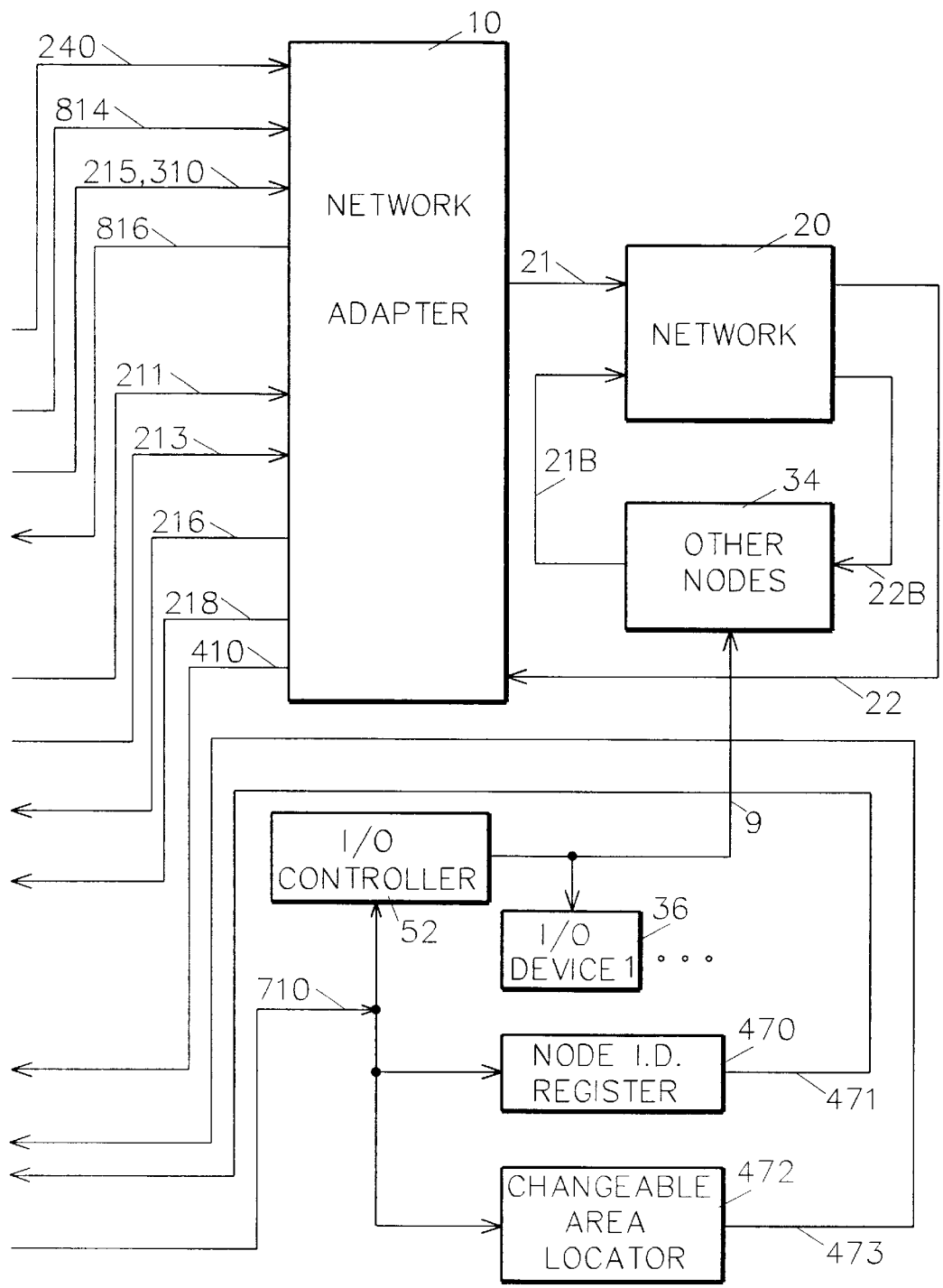

Referring to FIGS. 2A and 2B, typical processor 50, system memory 54, and I/O controller blocks 52 of FIG. 1 are shown in further detail, including the node connection to network 20 via network adapter 10.

Memory controller 210 is attached to node memory 54, including node memory unchangeable 224 and node memory changeable 222, over bidirectional, 65 bit (64 data bits and bit 850) data bus 242 and address bus 240, which is also fed to network adapter 10 as part of network control busses 70. Network control lines and busses 70 interfacing memory controller 210 and network adapter 10 include address bus 240; request node ID line 814, read/store, cast out lines 215, 310, store to remote line 211, read request/response to remote nodes line 213, all to adapter 10; and time stamp line 816, store from remote node line 216, and read request/response from remote node line 218, all from adapter 10. Network adapter 10 is connected to/from network 20 over port busses 21 and 22, respectively, and through network 20 other nodes 34 over port busses 21B and 22B. Remote invalidate line 410 from adapter 10 is fed to L2 cache 204.

I/O controller 52 is connected to other nodes 34 and I/O devices 36 over bus 9. Internal I/O bus 710 from L1 cache 100 is fed to I/O controller 52, node ID register 470 and changeable area locator 472. Node ID register 470 output 471 and changeable area locator output line 473 are fed to memory controller 210.

Memory controller 210 output fetch interrupt line 230 is fed to processor 50. L1 miss line 203 is fed from processor 50 to L2 cache 204; and L1, L2 miss line 207 is fed from L2 cache 204 to memory controller 210. Bidirectional address bus 201 and data bus 202 interconnect controller 210, processor 50 and L2 cache 204. Nonchangeable data bus 807 is fed off data bus 202 to L2 cache 204.

Referring to FIGS. 2A and 2B, in operation, node 30 contains the normal processor functions: processor 50, L1 cache 100, L2 cache 204, memory controller 210, node memory 54, I/O controller 52 for connecting to I/O devices 36 via I/O bus 9, and internal I/O bus 710 for connecting to local registers 470, 472, and I/O controller 52.

In a parallel system, a plurality of nodes 30, 34 are interconnected by a multi-stage network 20. Network adapter 10 normally implements message buffers, including a send FIFO containing a plurality of messages to send to network 20, and a receive (RCV) FIFO containing a plurality of messages which have been received from network 20.

If centralized, remote system memory becomes a hot spot and bottleneck with all nodes trying to access it at once. To eliminate the memory bottleneck, the shared memory is divided into smaller sections and distributed throughout the system to be practical for scalability. The most useful SMP system contains multiple nodes 30, 34 in a configuration where part of the system memory is located at each node 30, 34 and designated as node memory 54. In this case all nodes of the system are comprised identically as shown in FIG. 2. Every node 30 has access to local memory (node memory 54) which is the sector of memory residing within node 30, and to remote memory (node memory 54 of other nodes 34) located across network 20. Each node 30 can access remote memory located at other nodes 34 via network adapter 10 and network 20.

The total memory combining memory 54 at each node 30, 34 forms the shared memory space of the system, and does not cause a bottleneck by being lumped in a single place. This shared memory space provides a single network-wide address space, which is distributed across all nodes 30, 34 of the system. Each node 30, 34 provides a unique part of the address space and every node has access to the entire memory space. In accordance with a preferred embodiment, for simplicity only physical addresses are used and equal amounts of shared memory are distributed to each node. In addition, the preferred embodiment does not use any global locking techniques. It is well known in the field how to expand a physical addressing system to virtual addressing and various sizes of distributed memory. These concepts are taught for networked shared memory systems by Sandberg in U.S. Pat. No. 5,592,625, "Apparatus for Providing Shared Virtual Memory Among interconnected Computer Nodes with Minimal Processor Involvement". Likewise, global locking mechanisms for use when two nodes are competing to read-modify-write the same shared memory location are well known in the art. Global locking approaches are described in U.S. Pat. No. 4,399,504, "Methods and Means for Sharing Data Resources in a Multiprocessing, Multiprogramming Environment" by Watts et al, and U.S. Pat. No. 4,965,719, "Method for Lock Management, Page Coherency, and Asynchronous Writing of Changed Pages to External Store in a Distributed Computing System" by Shoens et al. The invention does not preclude applying other techniques such as virtual addressing, various sizes of distributed memory, and global locking to further enhance the preferred embodiment.

The preferred embodiment of network 20 is a multi-stage interconnection network comprised of Allnode switches at each stage of network 20. The dual priority version of the Allnode switch (U.S. Pat. No. 5,444,705, "Dual Priority Switching Apparatus for Simplex Networks") provides the switch which has multiple copies interconnected to form network 20 for this invention. The Allnode dual priority switch is called dual because it operates in two basic modes: 1) normal or low priority mode, and 2) camp-on or high priority mode. The difference between the two modes relates mainly to how blockage or contention is handled when encountered in network 20. In normal mode blockage or contention, when trying to establish a path through the network, results in the switch rejecting the connection and destroying any partial connection path established in the network prior to the blockage. In camp-on or high priority mode the connection command is not rejected, but is held pending until the blockage or contention ends. Then, the connection is made and the message transfer continues. The transfer of the message is delayed by the blockage or contention. Any partial connection path established in the network is not destroyed, but maintained throughout the delay period.

Further description of the operation of the system elements set forth in FIGS. 2A and 2B, and further details with respect to their structures, will be provided hereafter.

Figure 3:
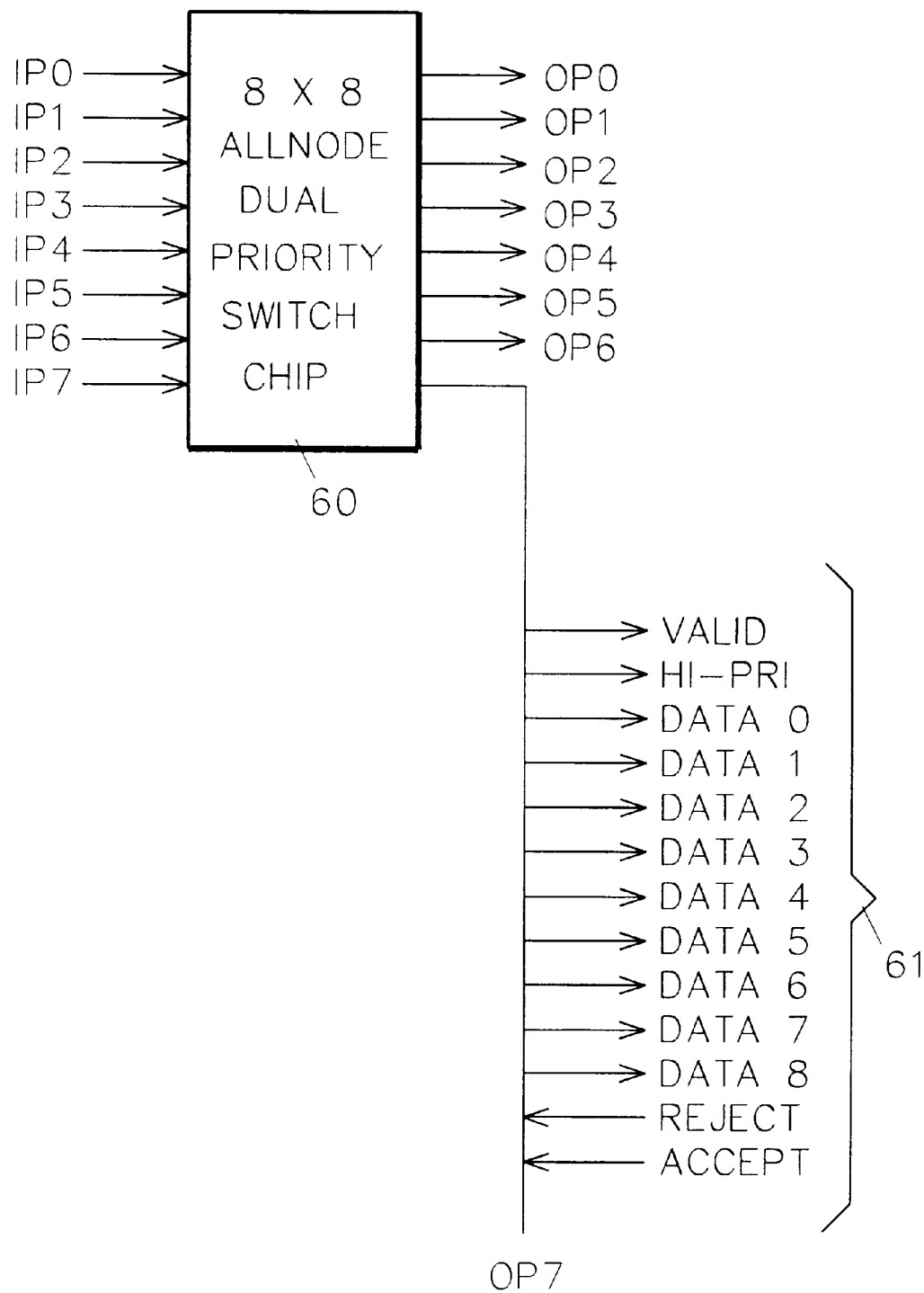
FIG. 3 is a diagram showing the interfaces to the 8×8 Allnode dual priority switch, which is the base network switch for transferring 9-bits of data in parallel.

Referring to FIG. 3, the switch used in building network 20 is set forth. Allnode dual priority switch 60 provides an 8×8 (8 input ports and 8 output ports) version of the switch. Signal lines 61 are replicated at each input port IP0 through IP7 and output port OP0 through OP7. The sets of switch interface lines 61 to each port contain 13 unique signals: 9 digital data lines, and 4 digital control lines (HI-PRI, VALID, REJECT, and ACCEPT). The nine digital data signals plus the HI-PRI and VALID control lines have a signal flow in the direction going from input port to output port across switch 60, while the REJECT and ACCEPT control lines have a signal flow in the opposite direction. The Allnode switch provides a self-routing, asynchronous, unbuffered network capable of trying a plurality of alternate paths between any two nodes. Normally alternate paths are tried in succession until an available path is found to circumvent blocking. Unbuffered means that the switch itself never stores any portion of the message, it merely forwards the message by direct connection without storing.

Each unidirectional switch interface set 61 requires only 13 signals, as shown in FIG. 3, to transmit data through the network 20—the data transfer width is byte-wide plus parity (9 bits) at a time. The signals required are:

DATA: 9 parallel signals DATA0 through DATA8 used to transmit switch connection requests and to transmit data messages.

VALID: When active, indicates that a data message plus its routing prefix is in the process of being transmitted. When inactive, it indicates a RESET command and causes the corresponding switch input port 21 of switch 60 to break all connections and to reset to the IDLE state.

CAMPON (also referred to as HI-PRI): When active, indicates the message in process is in the camp-on mode. If blockage in network 20 or contention for the destination node 34 is encountered, the connection request will remain pending and connections established in previous stages of the network remain active. When CAMPON is inactive, it indicates that the message in process is in normal mode and when blockage or contention is encountered connections established in previous stages of the network are broken immediately.

REJECT: Signal flow is in the opposite direction from the DATA and VALID signals. When REJECT is active, it indicates that blockage or contention has been detected in normal mode, and is not used in high priority mode.

ACCEPT: Signal flow is in the same direction as the REJECT signal. When ACCEPT is active during the transfer of the data message, it indicates that a message is in the process of being received and checked for accuracy. When ACCEPT goes inactive after the transfer of the data message, it indicates the message has been received correctly.

When ACCEPT is active during the establishment of a connection in camp-on mode, it indicates that the connection is being held pending. During the establishment of a connection in normal mode, ACCEPT has no meaning. When ACCEPT goes inactive after holding a camp-on connection pending, it indicates that the blockage or contention has ended and the requested connection has been established.

Figure 4:
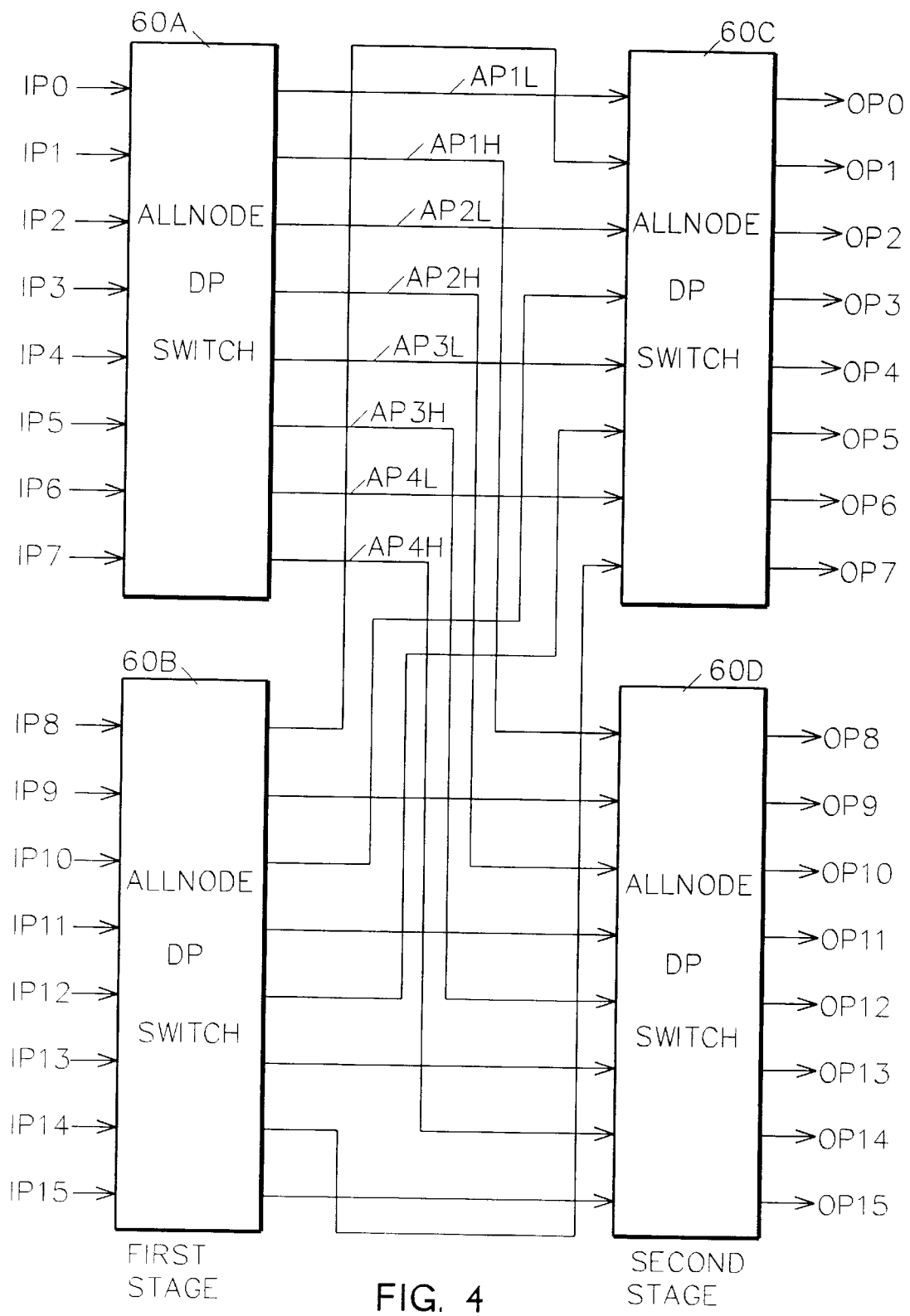
FIG. 4 is a diagram showing a typical multi-stage network for 16 nodes comprised of 2 stages of switches according to the preferred embodiment of this invention.

Referring to FIG. 4, a preferred embodiment of network 20 for interconnecting 16 parallel nodes in two stages is shown. Networks for interconnecting larger numbers of parallel nodes are available by incorporating more switch stages or fewer alternate paths into network 20. The Allnode dual priority (DP) switches are arranged in 2 columns, where each column is a stage of network 20. The first stage contains switches 60A, 60B and provides 16 input ports IP0 through IP15 to network 20 over interfaces 21. The second stage contains switches 60C, 60D and provide 16 output ports OP0 through OP15 from network 20 over interfaces 22. In accordance with this exemplary embodiment, there are provided in network 20 four alternate paths (AP) between any two nodes. For example, the four paths available for connecting input node IP0 and output node OP0 are AP1H through AP4H, and those for input node IP0 and output node OP8 are AP1L through AP4L. In this embodiment, input port 21 at switch 20 corresponds to one of ports IP0 through IP15, and output port 22 corresponds to one of OP0 through OP15.

Figure 5:
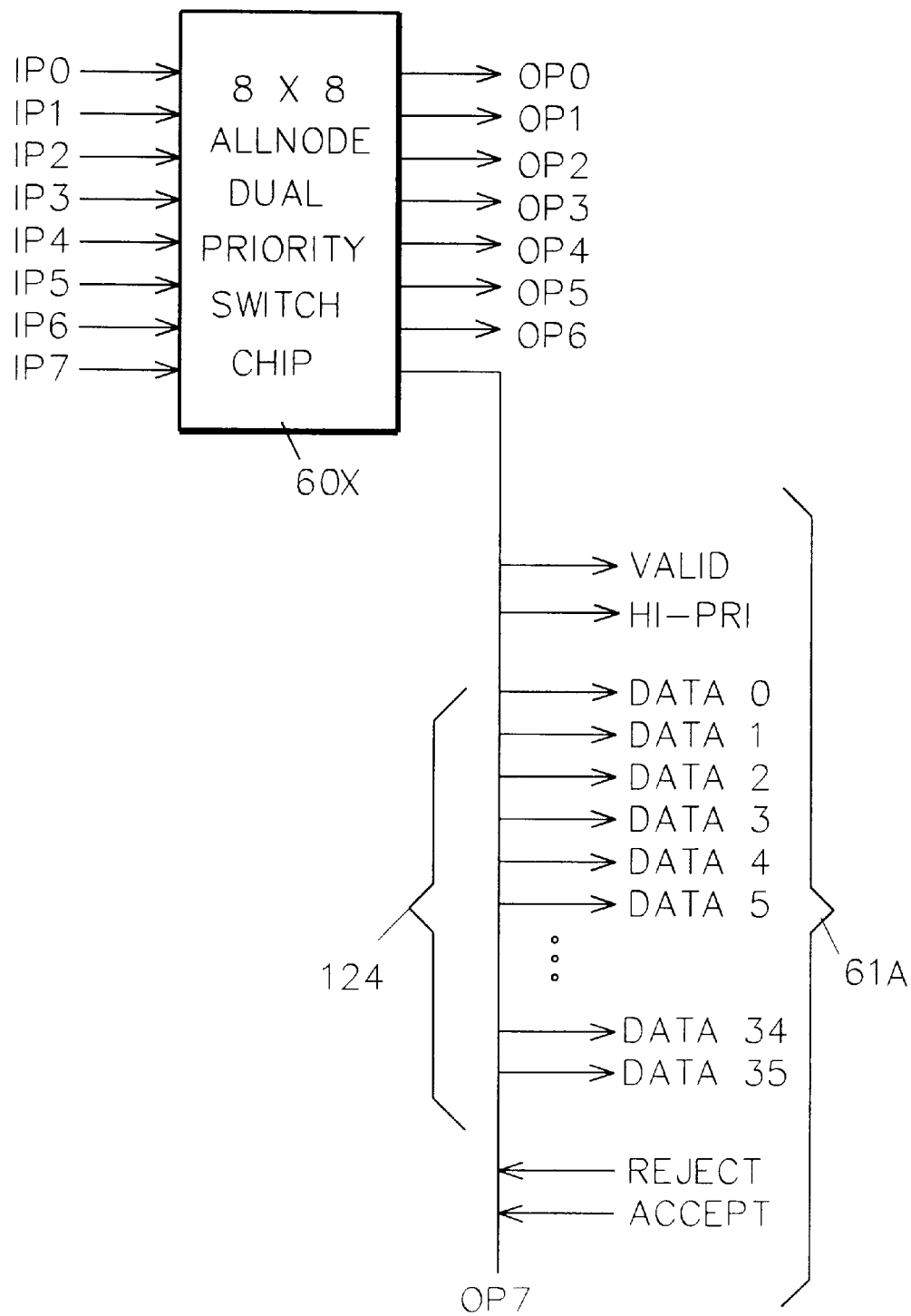
FIG. 5 is a diagram showing the interfaces to an expanded 8×8 Allnode dual priority switch, which is expanded for higher performance by transferring 36-bits of data in parallel according the preferred embodiment of this invention.

Referring to FIG. 5, the throughput of network 20 can be increased by increasing the data width to n bits wide across the network, rather than the 9-bit data interface shown in FIG. 3. For the preferred embodiment a data width of 36 bits in parallel is chosen. In this case, the Allnode unidirectional interface at receive adapter 12 scans 36 data lines 124 plus 4 control lines, which together form unidirectional switch interface 61A at each of ports OP0 through OP7 (with similar interfaces at each of ports IP0 through IP7). The maximum throughput that such a network could support is 36 bits×100 MHZ×16 network connections (maximum number of network connections at any time)=576 gigabits/sec. Switch 60X for use in building switch network 20, or its equivalent, is the preferred embodiment. The chip for the switch shown in FIG. 5 might be unwieldy to build, because of the 640 signal I/O pins required on the chip (40 lines per port×16 ports=640 signal I/O pins). However, an equivalent design would be to replace each switch 60A, 60B, 60C, 60D in the network of FIG. 4 with four chips in parallel; i.e., 4 of the switch chips shown in FIG. 3 which would have 9 data field 124 signals each for a total of 36 parallel data signals through the network. The switches 60 of FIG. 3 have only 208 signal I/O pins required (13 signals per port×16 ports= 208 signal I/O's). The resulting network would require 16 switch chips, but would be an equivalent network to a 4 switch chip network 60A, 60B, 60C, 60D built from the switch 60X shown in FIG. 5.

Figure 6:
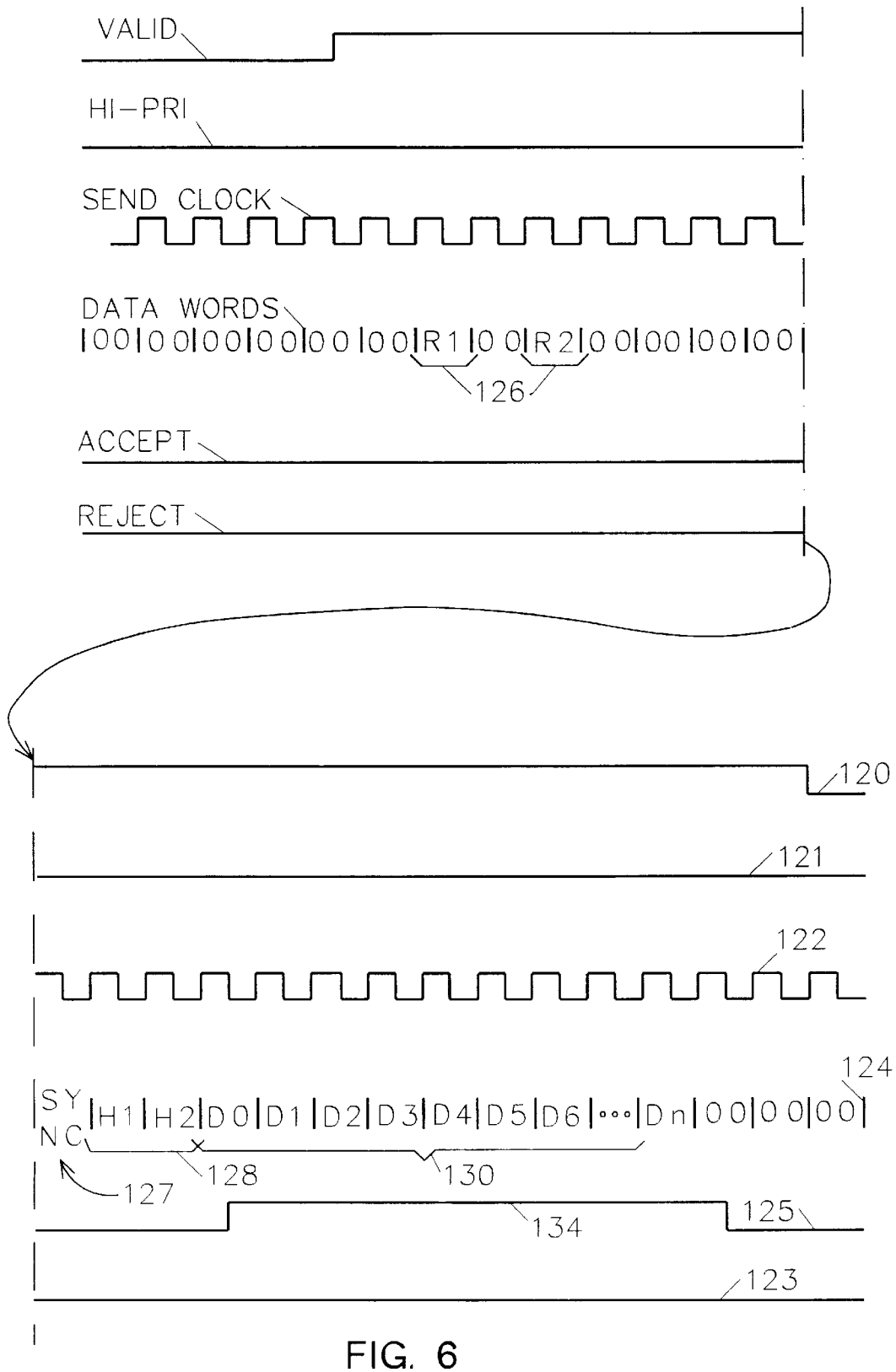
FIG. 6 is a diagram showing the timing sequence for transferring a message in 36-bit parallel format over the network according to the preferred embodiment of this invention.

Referring to FIG. 6, the timing of a message sent over the Allnode switch network 20 is shown. Send adapter 14 transmits 36-bit words of data synchronized to the rate of the sending clock 122 (the clock rate is 100 MHZ for the preferred embodiment). When send adapter 14 is not transmitting a message, it sends all zeroes data words (designated by 00 in FIG. 6) and deactivates its VALID signal to 0. Sending clock 122 internal to send adapter 14 is always oscillating, but no message is sent to network 20. Send adapter 14 sends only the word-wide data 124 plus the VALID 120 and HI-PRI 121 signals to network 20. Send adapter 14 in node 30 does not send a clock to network 20, neither does any other node 34 connected to the network. The switch is unclocked. Sending adapter 14 receives two control signals (REJECT 123 and ACCEPT 125) from network 20 to help it track the progress of a message being transmitted to the network.

In the normal mode send adapter 14 begins transmitting a message to network 20 by activating the VALID signal 120 to 1, while sending null (00) data words. After several clock times elapse, send adapter 14 sends routing bytes 126 (R1, R2) to select a connection path through the network of FIG. 4 to the desired destination. Each routing byte 126 selects one of 8 routing options at each stage of the network. A network 20 having N stages requires N routing bytes 126. A null (00) word is sent after every routing byte 126. The null word immediately following each routing byte 126 is called a dead field and provides time for the unclocked switch to resolve any contention problems. After the routing bytes, send adapter 14 transmits one or several additional null (00) words and begins to transmit the message by first sending one SYNC word 127 to start the message, followed by the message 128, 130. One data word is sent every clock time as shown in FIG. 6.

Figure 7:
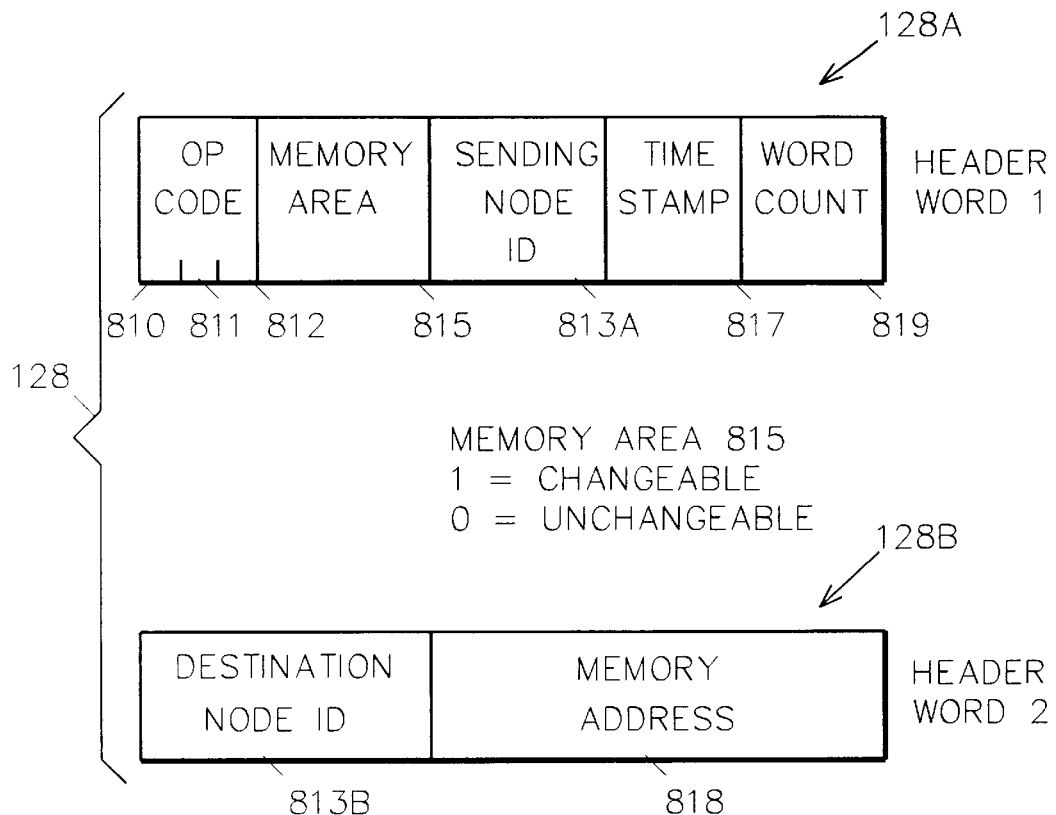
FIG. 7 is a diagram showing the message header transmitted across the network according to the preferred embodiment of this invention.

Referring to FIG. 7, node identification (ID) number 813A, 813B that is different for each node 30, 34 is assigned at initialization time. The node ID is sent over network 20 by one of the node 30 processors which is acting as master processor for the purpose of initializing the system. The master processor sends out one message for each node number in the system. The message is comprised only of header word 128 of FIG. 7 and no data message words 130 (shown in FIG. 5). One of the four possible OP Codes contained in bits 810 and 811 of header word 128 identifies the message as a node ID assignment message, when bit 810 equals 1 and bit 811 equals 0. The node ID assignment message contains the node ID of the targeted node 34 in destination field 813B of the same message header word 128. The sending adapter 14 at the master processor and network 20 route each message to 1 and only 1 node based on the destination field 813B. The wiring of the network (which is usually hardwired) determines which node 34 gets the message for each destination. Note that for all messages sent across network, the destination field 813B is actually the node number of the node 34 which is to receive the message. During initialization each node 34 receives 1 message from the master processor and uses the destination field 813B in header word 128 in conjunction with the node ID assignment OP Code to determine its assigned node number. Processor 50 at each node 30, 34 receives the initialization message, interprets it, and then stores over internal I/O bus 710 the node number into Node ID register 470. The node ID value is simply the port number of the node on the network. For the preferred embodiment, the network has 16 nodes and only the low order 4 node ID bits are required to uniquely define the 16 nodes. The node ID register for this case contains 8 bits, but the higher order bits are all zeroed.

Referring again to FIG. 6 in connection with FIG. 7, message header words H1, H2 128 are sent immediately after the SYNC word 127 and include two words—header word 1 (H1, 128A) and header word 2 (H2, 128B). Header words 128A and 128B include OP code bits 810–812, memory area control bit 815, sending node (source) ID 813A, network destination node ID 813B, memory address 818, time stamp 817 and word count 819 fields. Immediately after header 128, the message data words 130 (D0 to Dn) follow, where n indicates that the message can be of variable length. After data word Dn is transmitted to complete the sending of valid data words, null (00) words are sent and the VALID signal 120 stays active waiting to see if the message is accepted or rejected. FIG. 6 shows the message being accepted by signal 134 on ACCEPT line 125 returning to 0 and REJECT 123 never going active. After ACCEPT goes to 0, VALID 120 goes to 0 to indicate the completion of the message. The connection path through the network is broken by VALID going to 0.

The ALLNODE networks are excellent for the SMP application, because the network is non-buffered. This means that there is no buffering of data in the network itself; i.e., after a connection is made data travels across the network as if it were a direct connection between sender and receiver. The delay experienced is approximately equal to the length of cable used to connect the two nodes, which says it is impossible to design a lower latency transfer. In addition, the Allnode switch for SMP will implement two means of establishing a connection: 1) quick (normal) path and 2) camp-on (high priority) path. The quick path is exactly that, the fastest way to establish a connection across the network when blockage in the switch and contention at the receiving node are not encountered. The connection time for the quick path requires 2 clock times per switch stage based on the sending clock 122 defined by network adapter 10. For instance, if sending clock 122 is selected to be 100 MHZ, the clock time would be 10 ns. If would require 20 ns to select each switch stage, so 2 stages=40 ns total. Thus, in 4 clock times (40 ns) a connection can be established across the network by the quick path approach if blocking or contention is not encountered.

The network adapter 10 will make two different attempts to establish each connection across the network. The first attempt will always be the quick path over an alternate path which is chosen at random, which will normally establish a connection across the network in the quickest possible time. If the quick path is blocked or experiences contention, it is rejected.

Figure 8:
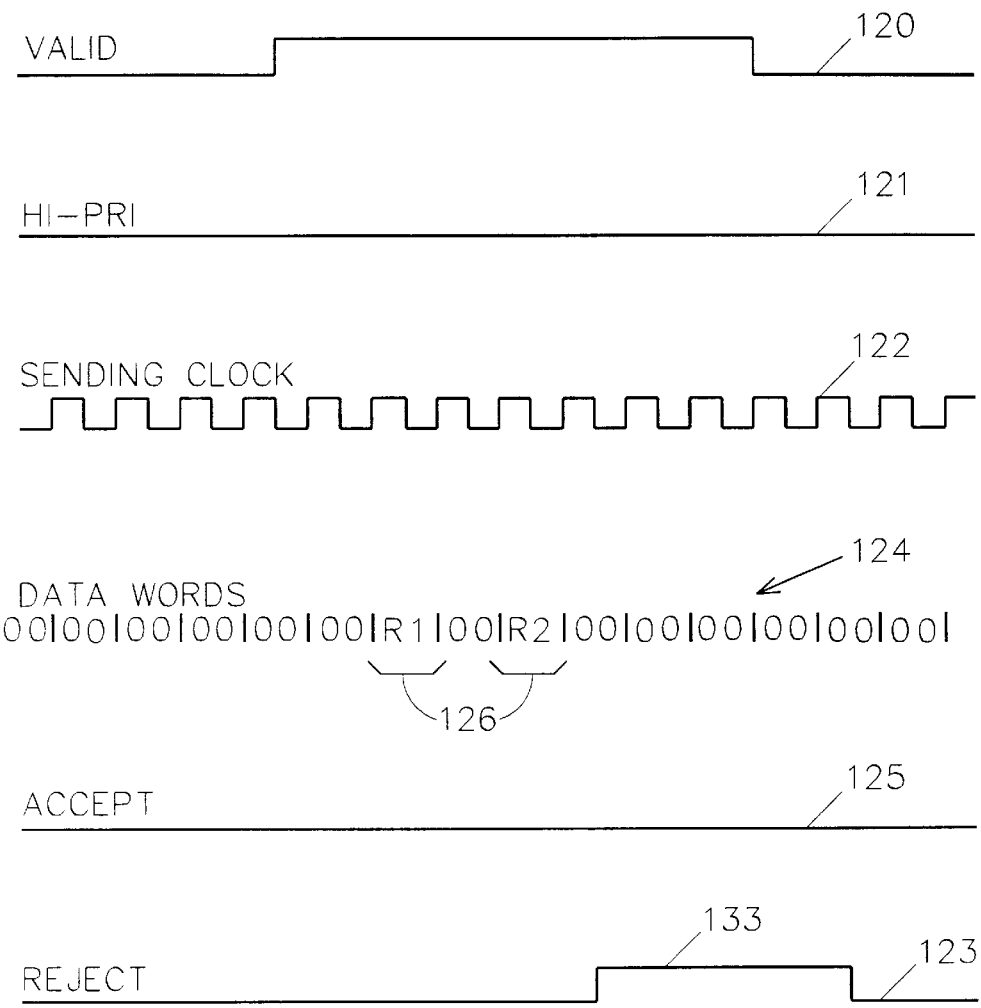
FIG. 8 is a diagram showing the timing sequence for rejecting a message attempted over the quick path if the network connection cannot be established immediately according to the preferred embodiment of this invention.

Referring to FIG. 8, the timing sequence for a first attempt, or quick path, is shown with rejection. (FIG. 6 shows the timing sequence for a quick path with acceptance). For the quick path, HI-PRI signal 121 is not activated and the routing bytes 126 follow each other immediately, separated only by a dead field (null word). If the path is blocked or contended, the REJECT 123 signal is activated as pulse 133. Network adapter 10 sees pulse 133 and aborts the attempt by deactivating the VALID 120 signal. Switch 60 sees VALID 120 go to 0 and responds by dropping the REJECT 123 signal to 0 completing pulse 133. In addition, VALID going to 0 breaks any network connections established by the rejected attempt.

Figure 9:
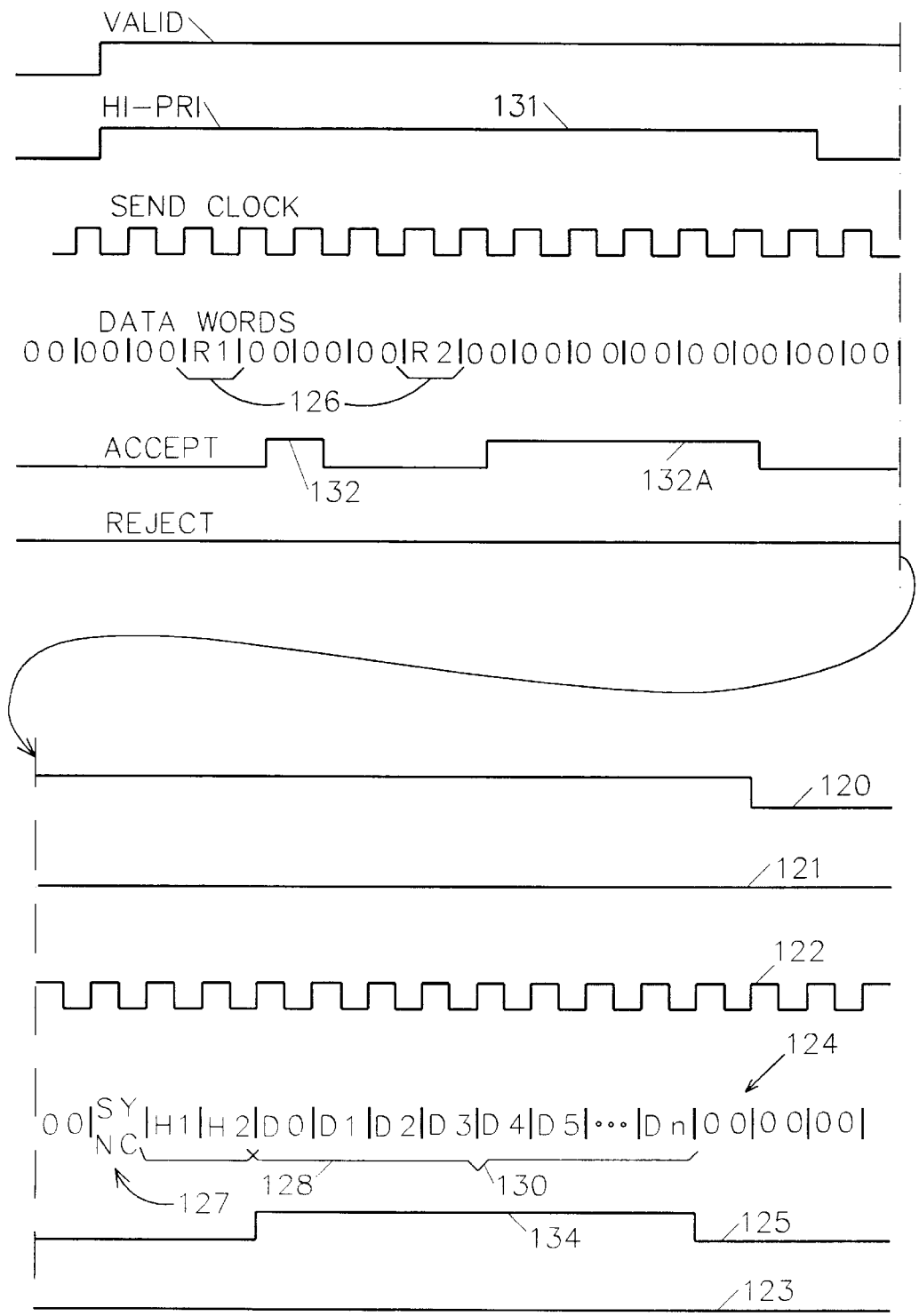
FIG. 9 is a diagram showing the timing sequence for transferring a message in camp-on mode according to the preferred embodiment of this invention.

Referring to FIG. 9, a second attempt, following rejection of a first, or quick path, attempt uses the camp-on path. The camp-on path is treated differently as controlled by the activation of the HI-PRI line 121 signal 131 in switch interface 61, which is activated prior to and during the transmission of routing bytes 126. Camping-on is the quickest way to deliver a message when blockage or contention is encountered. For the camp-on case, the network connection is maintained through the first stage of the network if contention or blocking is encountered at the second stage of the network. The rise of the HI-PRI signal 131 at the either stage, informs switch 60 to camp-on, if it cannot make the connection. Camping-on means that the switch drives ACCEPT line 125 to 1 creating pulse 132 at stage 1 and pulse 132A at stage 2. REJECT 123 is never activated for the camp-on path. ACCEPT 125 stays at 1 until the connection is made, then ACCEPT goes to 0 completing either pulse 132 or 132A. This signals network adapter 10 that the connection is established and the message 127, 128, 130 continues immediately after the fall of ACCEPT 125. FIG. 9 shows, with signal 132, that the first stage in the timing example shown responds quicker than the second stage, shown by signal 132A, which must wait a longer time for the blockage or contention to end.

In summary, the connection algorithm across the network is as follows:

1) One quick path attempt is made first over a randomly chosen alternate path.

2) If the quick path is rejected, a different alternate path is tried in camp-on mode. An ACCEPT 125 signal going to 1 and not returning to 0 immediately means that blockage or contention has been encountered. Whether immediately or later, ACCEPT 125 going to a 0 always means to proceed with the message, that the blockage or contention has ended and the desired connection has been established.

For the preferred embodiment, the shared memory is divided into 16 equal sectors with one sector residing at each of the 16 nodes. Eight bits of shared memory address 818 are used to uniquely define up to 256 sectors of memory. The preferred embodiment for simplicity only deals with 16 sectors of memory, which are defined by the low-order 4 bits of the 8 sector bits of shared memory address (the 4 high order bits are zeroes).

Figure 10:
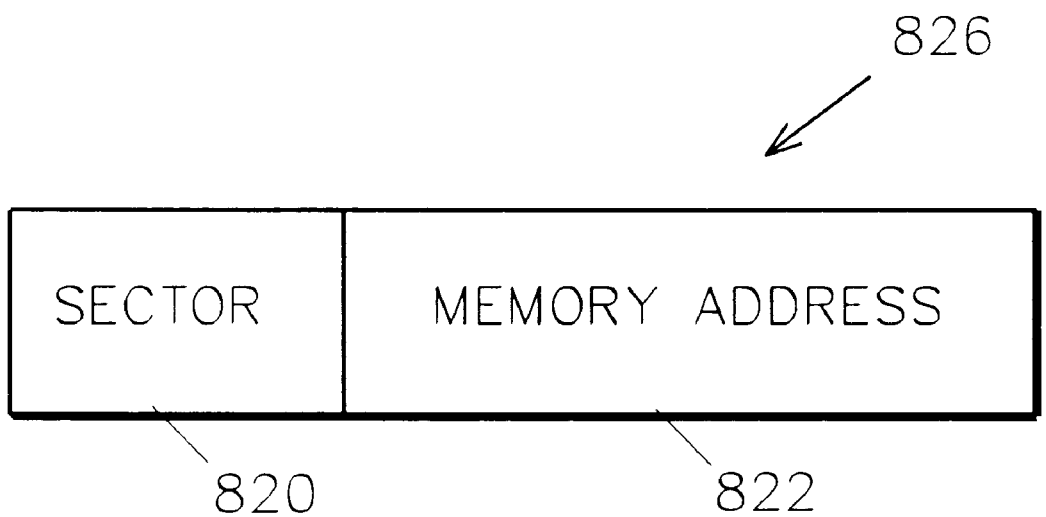
FIG. 10 is a diagram showing the composition of the memory address according to the preferred embodiment of this invention.

Referring to FIG. 10, the memory address word 826 (as distinguished from memory address 818 in header 128) is comprised of 2 parts: memory sector definition—8 bits 820, and memory address 822. The memory address word format 826 can either be generated locally or remotely. The local address word is designated by 826A and the remote address word is designated 826B. Memory sector definition bits 820 define which node contains the corresponding section of memory, such that for any node 30, 34 the sector bits 820 are equal to the node ID register 470. For instance, node 0 has a node ID register equal to 00h (00 in hexadecimal) and the sector of memory implemented at node 0 has memory sector definition bits 820 also equal to 00h. Memory sector definition bits 820, node ID register 470, and destination field 813B of header 128 are all 8 bits with the high order 4 bits all zeroed. For other embodiments, larger networks are used which have more nodes. The limitation caused by the 8-bit fields 820, 470, 813A or 813*b* limits the systems to 256 nodes. If the 8-bits fields were increased in size, mode than 256 nodes would be used.

Referring to FIG. 11A, network adapter 10 is designed specifically to handle shared memory processor (SMP) cache coherency efficiently over network 20. As previously described, network control busses 70 between memory controller 210 and network adapter 10 include address bus 240, requesting node line 814, read or store line 215, castout line 310, time stamp 816, store data to remote line 211, read request/response to remote line 213, store data from remote line 216 and read request/response from remote line 218. Remote invalidate line 410 is fed from adapter 410 to L2 cache 204.

Within network adapter 10, invalidate directory 32 receives address bus 240, requesting node 814, read or store 215 and castout 310 and provides time stamp 816. Store data from remote line 216 is also an input to directory 32. An output of invalidate directory is send invalidate or cache update messages line 333 to send FIFO 40. The outputs of send FIFO 40 are local invalidate bus 336A to send response invalidate block 338 associated with send FIFO 42 and line 351 to priority selection block 500. (In a sense, the sending of an update message is an invalidation process, for the obsolete data in a changed cache line is invalidated by being corrected, or updated.)

Send FIFO 41 receives store data to remote line 211, and its output on line 352 is fed to priority selection block 500. Send FIFO 42 receives read request/response to remote line 213, and provides its output on line 353 to priority selection block 500. The output of priority selection block 500 is fed to network router logic block 530, the output of which is send adapter 14 output port 21 to switch network 20.

Figure 11B:
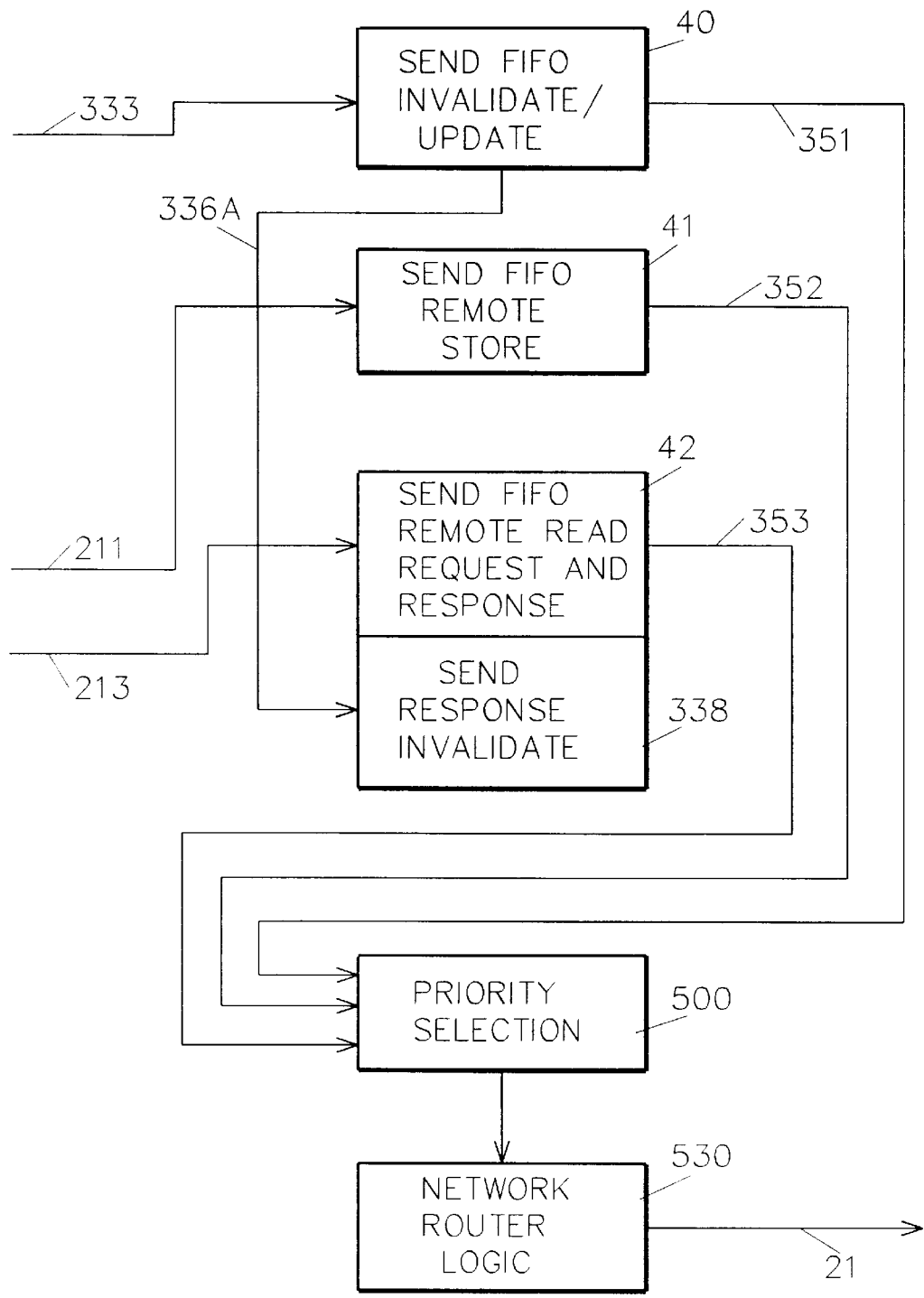

Referring to FIG. 11B, receive adapter 12 input port 22 is input to sync and recover logic block 540, the output of which is fed to receive FIFO selection block 510. The outputs of selection block 510 are fed on lines 451 to receive FIFO 44, lines 452 to receive FIFO 45, and lines 453 to receive FIFO 46. The outputs of receive FIFO 44 are fed on lines 336B to receive response invalidate block 339 associated with receive FIFO 46 and on remote invalidate line 410 to L2 cache 204. The output of receive FIFO 45 is fed on store data from remote line 216 to invalidate directory 32 and memory controller 210. The output of receive FIFO 46 is fed on read request/response from remote line 218 to memory controller 210.

Figure 12:
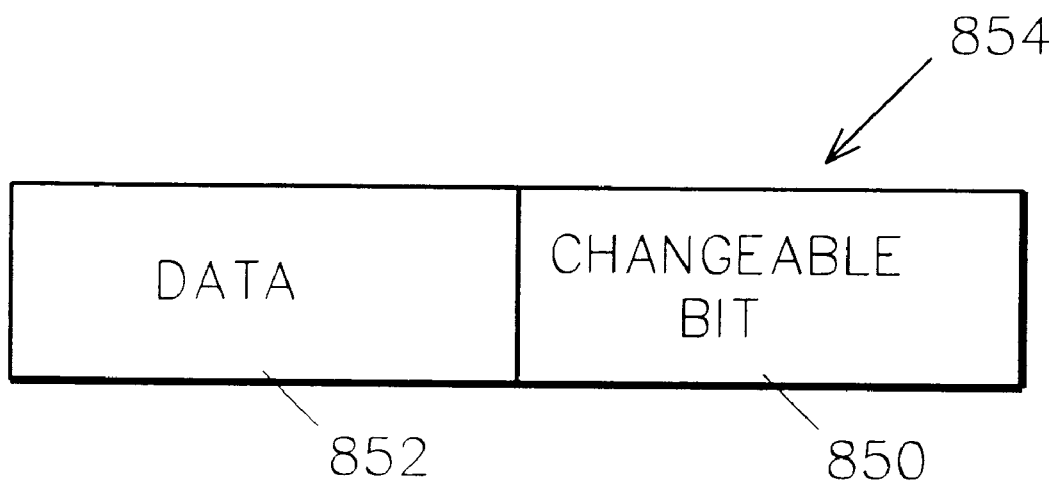
FIG. 12 is a diagram showing the composition of the memory data words, which are organized as double words plus a control bit according to the preferred embodiment of this invention.

Referring to FIG. 12, as will be described more fully hereafter, memory data word 854 is 65 bits—64 data bits 852 plus changeable bit 850.

Figure 13A:
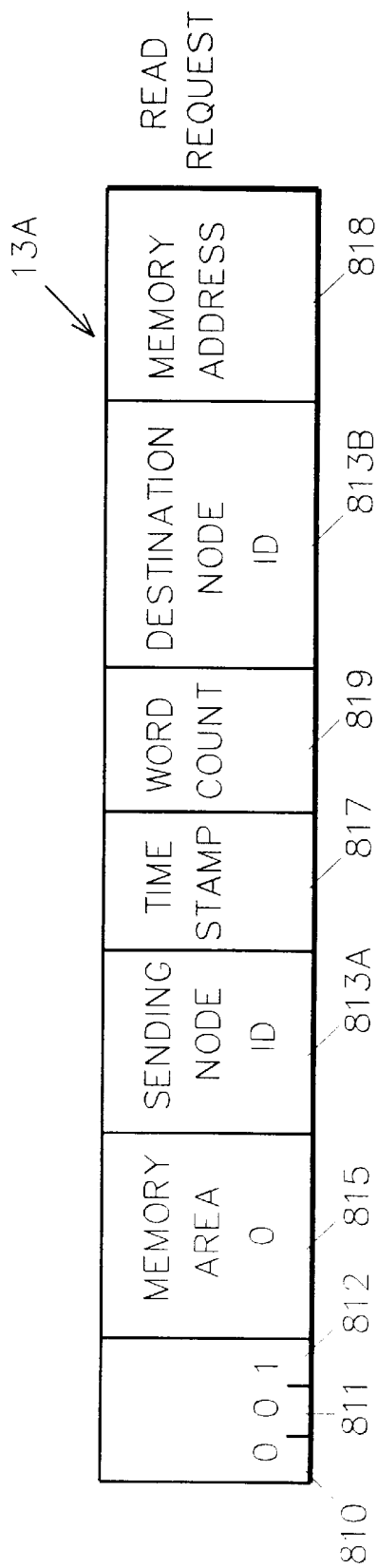
Figure 13B:
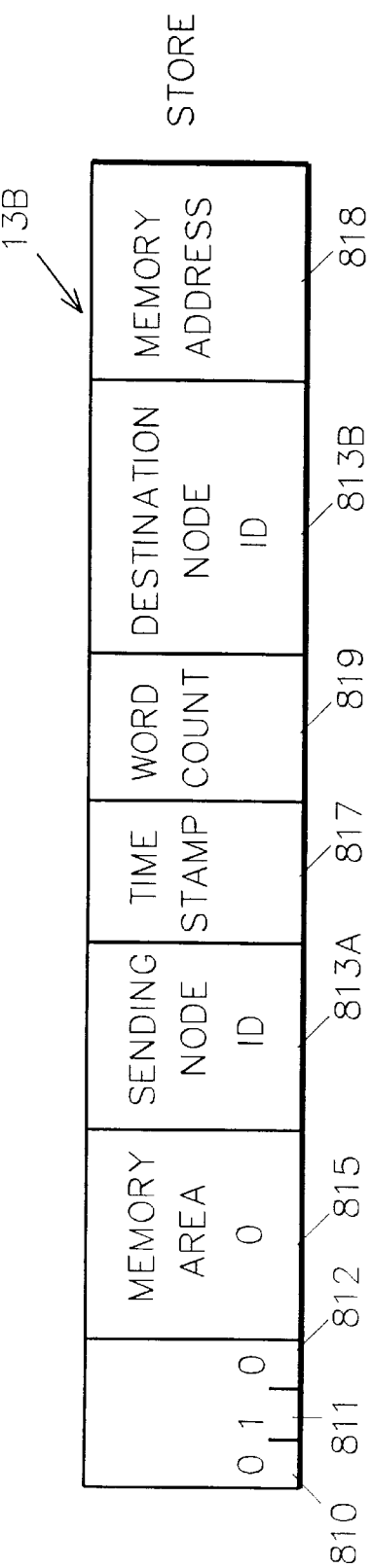
Figure 13G:
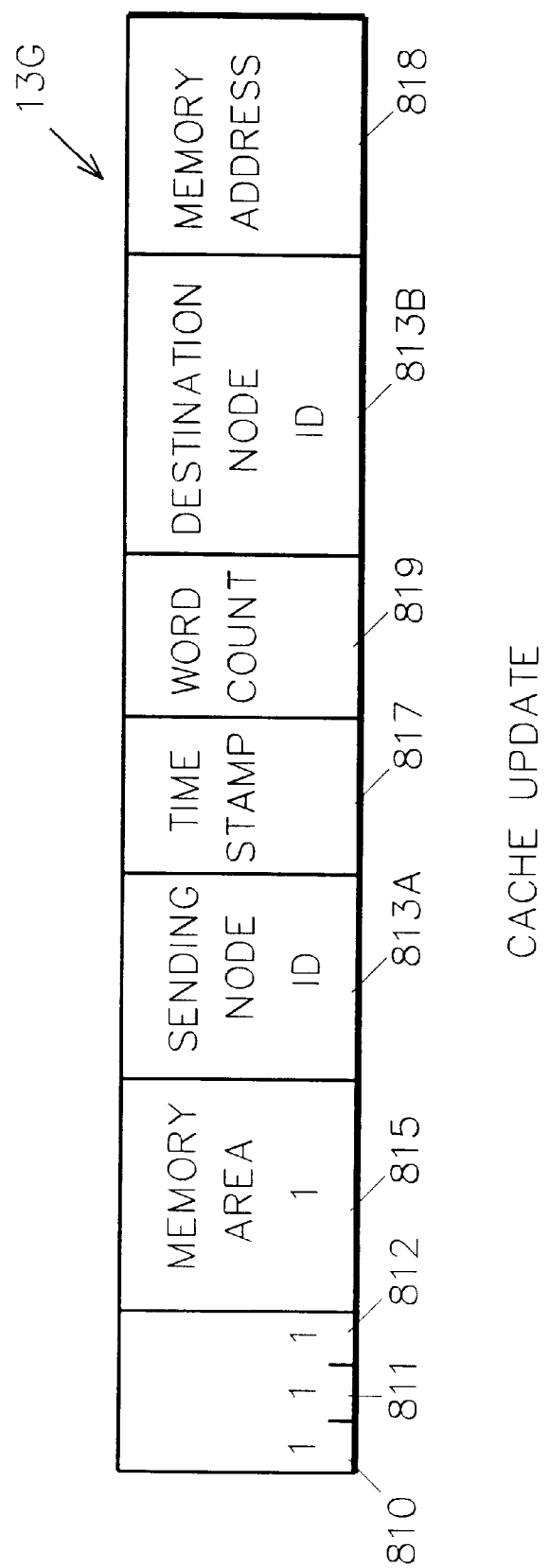

Referring to FIGS. 13A through 13G in connection with FIGS. 6 and 7, network adapter 10 uses seven different message types, each an implementation of the basic message header 128 format shown in FIG. 7. FIG. 13A is the format of the header words 128 for a read request message, FIG. 13B that of the store message, FIG. 13C that of the response message, FIG. 13D that of the node ID assignment message, FIG. 13E that of the invalidation message, FIG. 13F that of the cast out message, and FIG. 13G that of the cache update message. Reference to a particular message 13A through 13G will, depending upon the context, refer not only to the corresponding header 128 but also to the data words 130 which accompany the header.

Figure 14A:
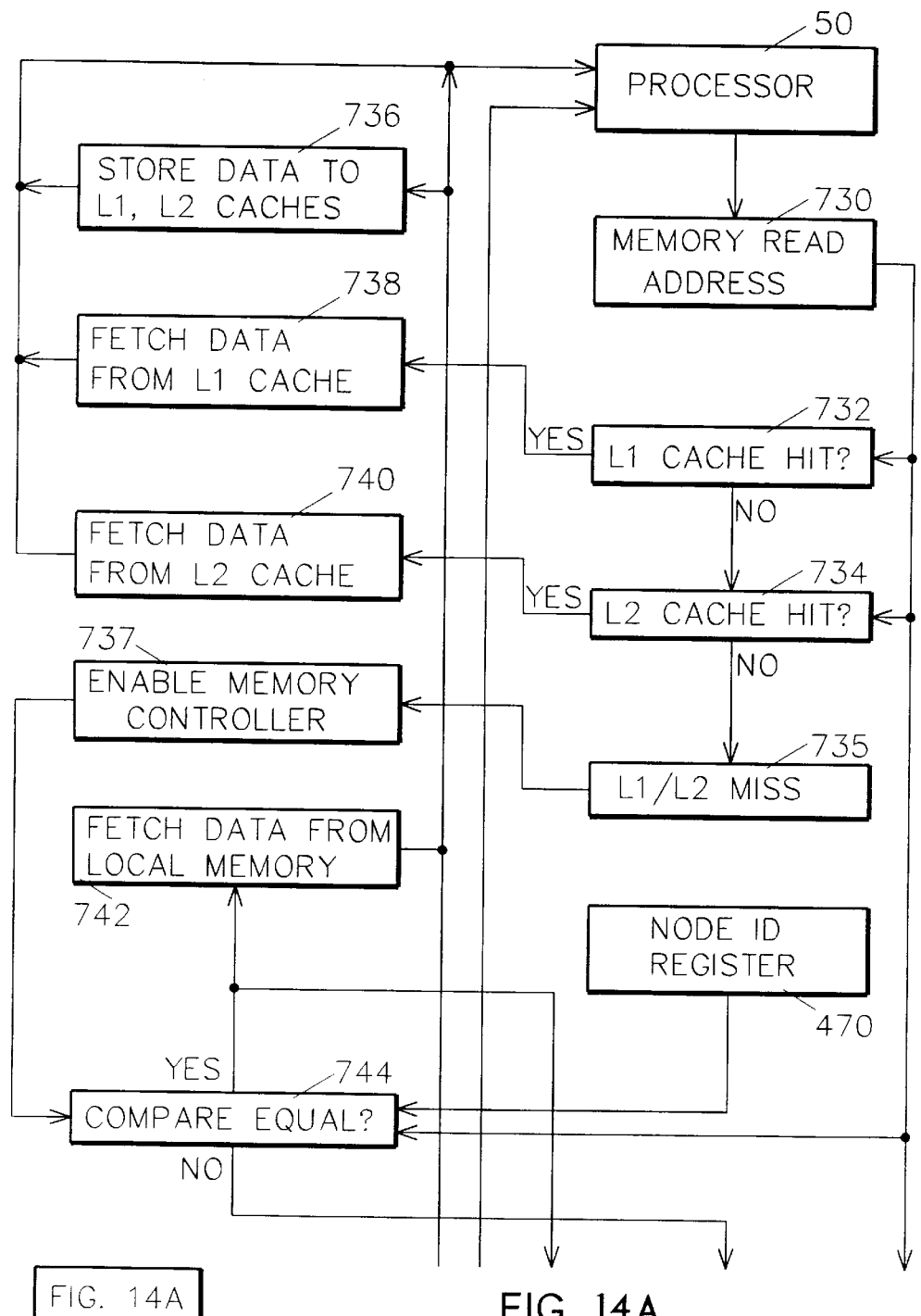
FIGS. 14A and 14B, arranged as shown in FIG. 14, are a flow chart of the processor operation when reading data from shared memory according to the preferred embodiment of this invention.
Figure 14B:
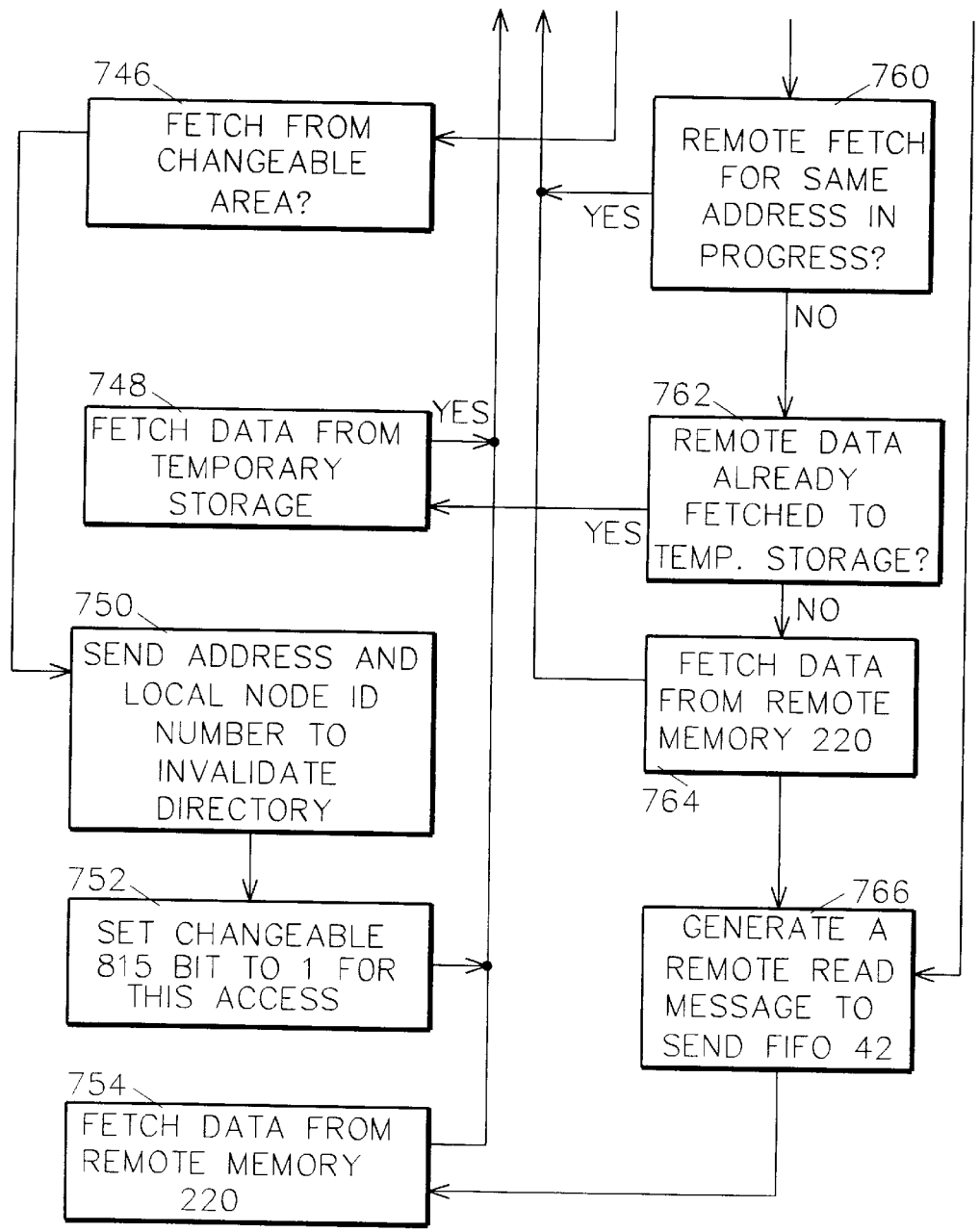

Referring to FIGS. 14A and 14B, a flowchart of the process for a read operation from shared memory is set forth. This will be referred to hereafter in connection with a description of the operation of FIGS. 11A, 11B and 15A–15C.

Figure 15B:
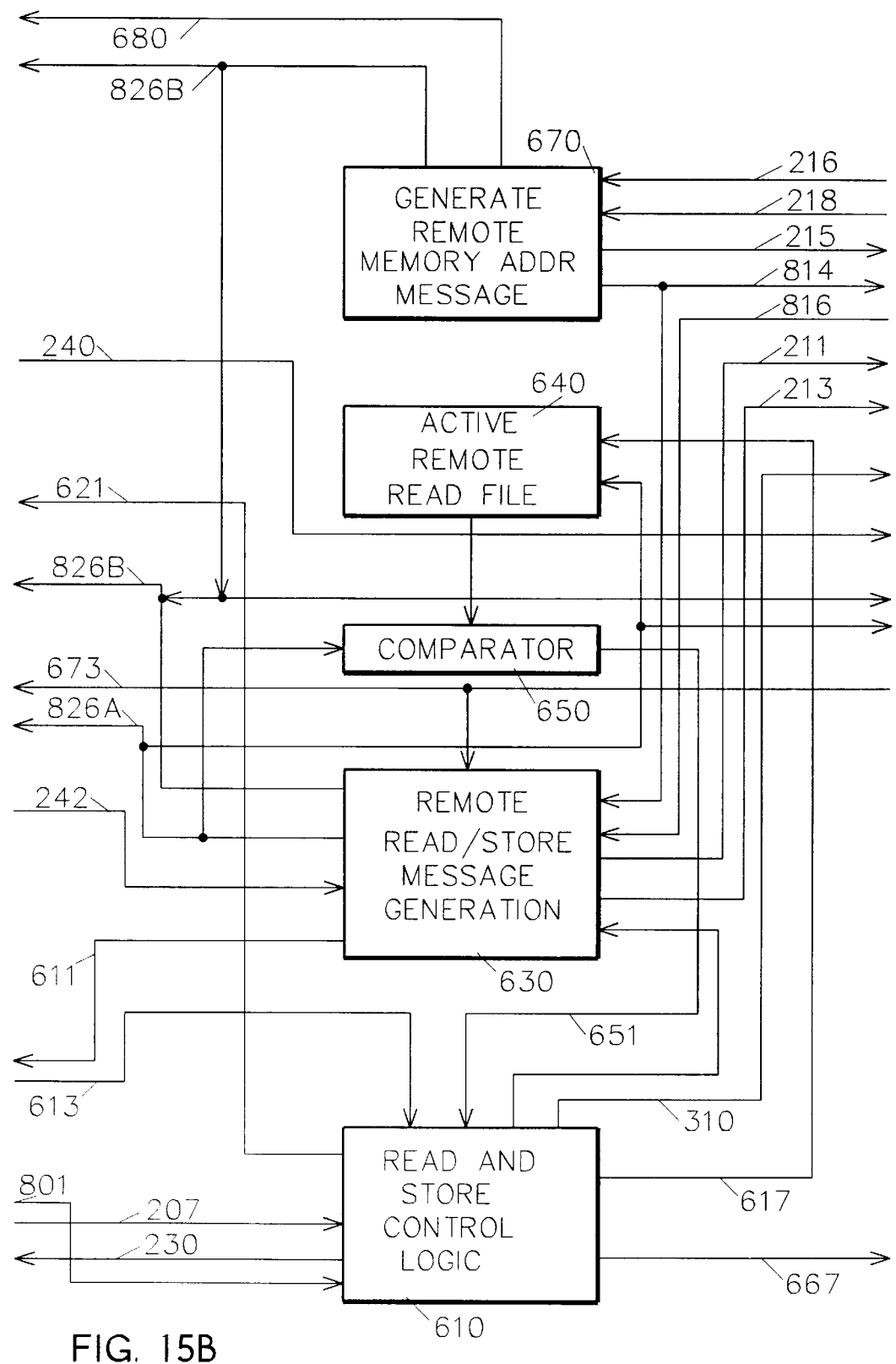
Figure 15C:
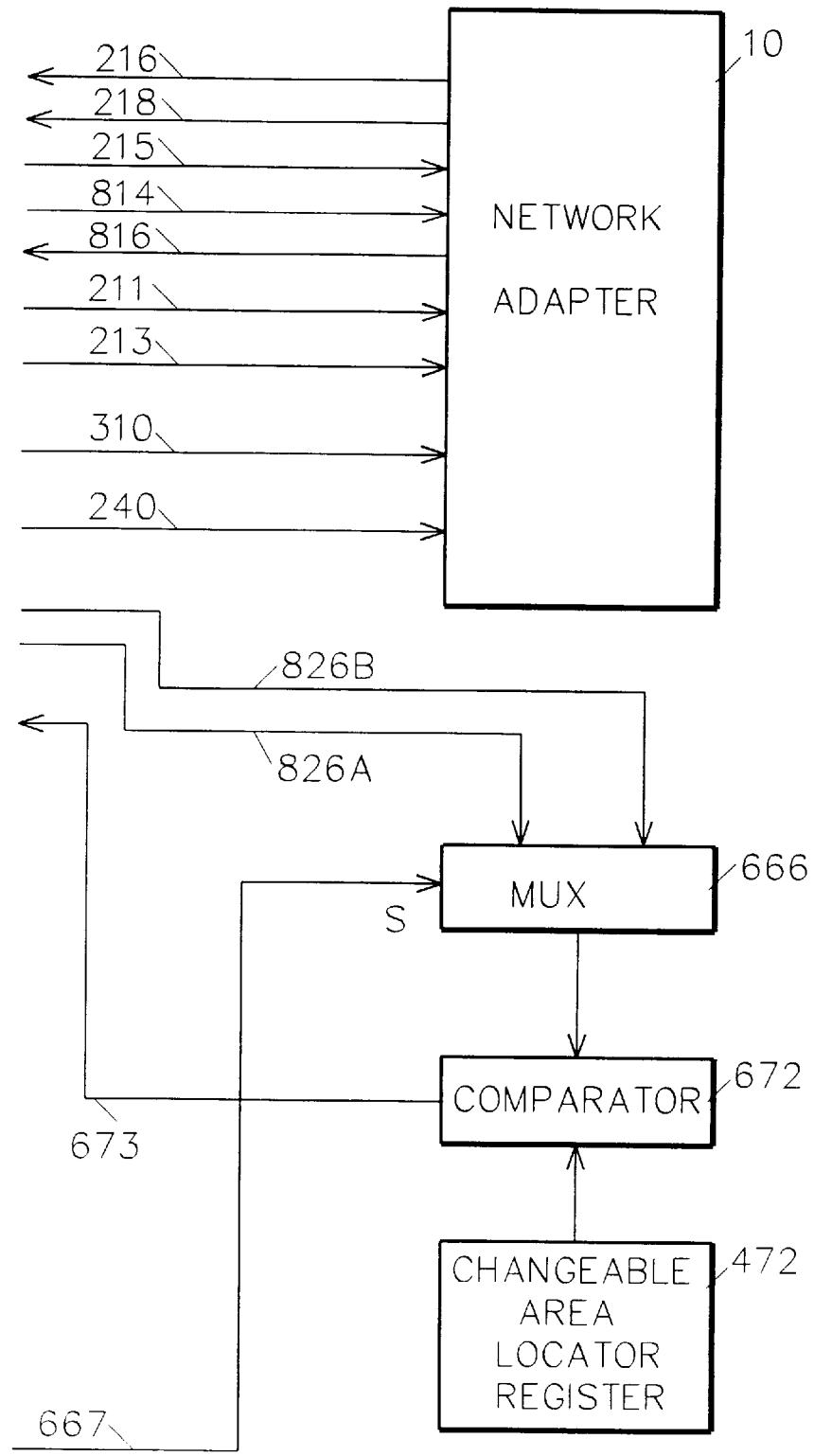

Referring to FIGS. 15A through 15C, the structure of memory controller 210 will be described. The operation of FIGS. 15A through 15C will be described hereafter in connection with the operation of FIGS. 11A and 11B, inter alia.

Processor data bus 202 interconnects processor 50, L1 cache 101 and L2 cache 204 with processor data in register 602 and processor data out register 604. Processor address bus 201 interconnects processor 50, L1 cache 101 and L2 cache 204 with processor address in register 606 and processor address out register 608. Register controls line 611 from remote read/store message generation block 630 is fed to registers 602, 604, 606 and 608. L1, L2 miss lines 207 are fed from processor/cache 50, 101, 204 to read and store control logic block 610. Remote fetch interrupt line 230 is an input to processor 50 from read and store control logic block 610.

The output of processor data in register 602 is fed on store data bus 242 to data multiplexer 675, as remote store data to remote read/store message generation block 630 and as local store data to node memory 54. Processor data out register 604 receives as input on 65 bit wide line 607 the 64 data bits output 807B of data multiplexer 675 and one bit non-cacheable line 807A from AND gate 806. AND gate 806 receives as input bit 850 and inverted bit 815 on signal lines 850A and 815A, respectively, the latter after being inverted in INV 809.

Processor address in register 606 provides outputs on local address bus 822A to memory address multiplexer register 620 and on sector line 820 to comparator 612. The other input to comparator 612 is the output of node ID register 470, and its output is fed on line 613 to read and store control logic 610.

Processor address out register 608 receives as input remote address line 826B from generate remote memory address and route message block 670. Address line 826B is also fed to temporary data storage 690, memory address multiplexer register 620, remote read/store message generation block 630 and multiplexer 666.

Temporary data storage 690 receives as inputs response data bus 680 and remote address bus 826B, both from generate remote memory address and route message block 670, and local address bus 826A from remote read/store message generation block 630. Response data bus 6780 is also fed to data multiplexer 675. Local address bus 826A is also fed to comparator 650, active remote read file block 640 and through multiplexer 666 (when selected by line 667) to comparator 672. The outputs of temporary data storage 690 are fed on 66 bit wide temporary read bus 804 to data multiplexer 675, and on temporary compare line 801 to the select input of data multiplexer 675 and to read and store control logic 610. Comparator 672 receives as its other input the output of changeable area locator register 472, and its output is fed on line 673, which represents bit 815 of the message header, to remote read/store message generation block 630 and multiplexer 675, where it is concatenated with the 65 bits (64 bits of data, plus bit 850) on data bus 242 to form the 66 bit input to data multiplexer 675. Bit 850 identifies whether a double data word (64 bits) contains changeable data or not changeable data. Bit 815 identifies which portion 222 or 224 of the memory 54 the data word resides in.

The inputs to memory address multiplexer 620, in addition to local address bus 822A are multiplexer select line 621 from read and store control logic 610 and remote address bus 826B generate message block 670. The output of memory address multiplexer register 620 is address bus 240, which is fed to node memory 54 and network adapter 10.

Inputs to generate remote memory address and route message block 670 are stores from remote nodes lines 216 and read requests line 218, both from network adapter 10. Outputs of generate address and message block 670 include read or store signal 215 and requesting node ID line 814, both to network adapter 10, the latter of which is also fed to remote read/store message generation block 630.

Active remote read file 640 receives as an input file controls lines 617 from read & store control logic block 610, and its output is fed to comparator 650, the output of which is fed on line 651 back to read & store control logic block 610. Other outputs of read & store control logic block 6710 are cast out signal 310 to network adapter 10 and start remote line 614 to remote read/store message generation block 630. The inputs to remote read/store message generation block 630 also include time stamp line 816 from network adapter 10. The outputs of remote read/store message generation block to network adapter 10 are stores to remote nodes signal line 211 and read requests and responses to remote nodes line 213.

Referring further to FIGS. 11A–11B and 15A–15C, in operation, four important features used will be described. They are: 1) Creating separate areas for changeable data in each memory sector, 2) allowing some variable data to be non-cacheable, 3) communicating over network 20 using seven different message types, and 4) implementing multiple Send FIFOs 40, 41, 42 and receive (RCV) FIFOs 44, 45, 46, where each FIFO is specifically designed to expedite remote memory fetches and to perform cache coherency across the entire system.

1) Separate Area for Changeable Data

Referring to FIG. 2A, cache coherency applies only to data that is changeable (variable). The cache coherency problem is greatly simplified by separating data stored in shared memory (instructions, constants, unchangeable data, and changeable data) into two categories: changeable and unchangeable. For the preferred embodiment, the distinction is made by address assignment within each memory sector 222 and 224 of node memory 54. A group of contiguous addresses for changeable data 222 in each sector is dedicated to containing the changeable variables. Data stored in the changeable area 222 of node memory 54 has cache coherency provided by network adapter 10. Data located in the remainder of node memory 54, referred to as unchangeable data 224, does not have cache coherency provided.

Referring to FIG. 12 in connection with FIGS. 2A and 2B, it is up to the compiler running in processor 50 to mark all instruction words, constants, and unchangeable data as being unchangeable, and all data that could change as changeable. The marking is done by an additional bit 850 carried by every double word 852 stored to memory 54. Bit 850 when set to 0 defines the associated data word 852 as being unchangeable, set to 1 means changeable. The compiler must also segregate the changeable data from the unchangeable data, and assign the changeable data to the changeable area 222 of node memory 54. Both network adapter 10 and memory controller 210 handle the changeable data differently than the unchangeable data. It is possible for processor 50 to program node memory 54 so that the mount of unchangeable memory 222 is equal to 0, and the amount of changeable memory 222 is equal to the complete size of node memory 54.

Referring to FIG. 12 in connection with FIG. 10, memory data word 854 is 65 bits—64 data bits plus changeable bit 850. This means that all memory 54 is organized to contain 65 bits plus error correcting bits if desired. The preferred embodiment assumes that there are no error correcting bits because error correction is an obvious extension of the preferred embodiment. Since the data width across the network is 36 bits, each memory data word (which is really a double wide data word), is transferred across the network as two successive words. Memory Address 822 in Node memory 54 is further organized as containing a sequential series of cache lines, each being comprised of 8 double-words. Memory address 822 further organizes each cache line, such that the first double-word of each cache line is assigned a memory address with the 3 low-order bits equal to 0, and sequentially assigns memory addresses so that the last double-word of the cache line is assigned a memory address with the 3 low-order bits equal to 1.

2) Some non-cacheable data

Referring again to FIG. 2A, it is possible to store unchangeable data to the changeable area 222 in node memory 54. This causes no problem as it is the state-of-the-art approach to mix changeable and unchangeable data together. It is also possible to store changeable data to the unchangeable area 224 in node memory 54. This is handled in the preferred embodiment by declaring such data as being non-cacheable, since it is located in an area of memory for which cache coherency is not provided. Thus, any node using this data must use it without putting it into any of its caches. The memory controller 210 when accessing such data detects that it is not cacheable because it is located in the unchangeable area 224 of memory and its changeable bit 850 is set to 1 in memory 54.

Referring further to FIGS. 2A and 2B, changeable area register 472 is loaded by processor 50 over internal I/O bus 710 during initialization to inform memory controller 210 of the location of the changeable area 222 in node memory 54.

3) Seven Network Message Types

Referring to FIG. 7 in connection with FIGS. 13A through 13G, network adapter 10 uses seven different message types, each comprised of the basic message header format shown in FIG. 7. The function of each message type will be explained hereinafter.

4) Multiple Send and RCV FIFOs

Figure 11C:
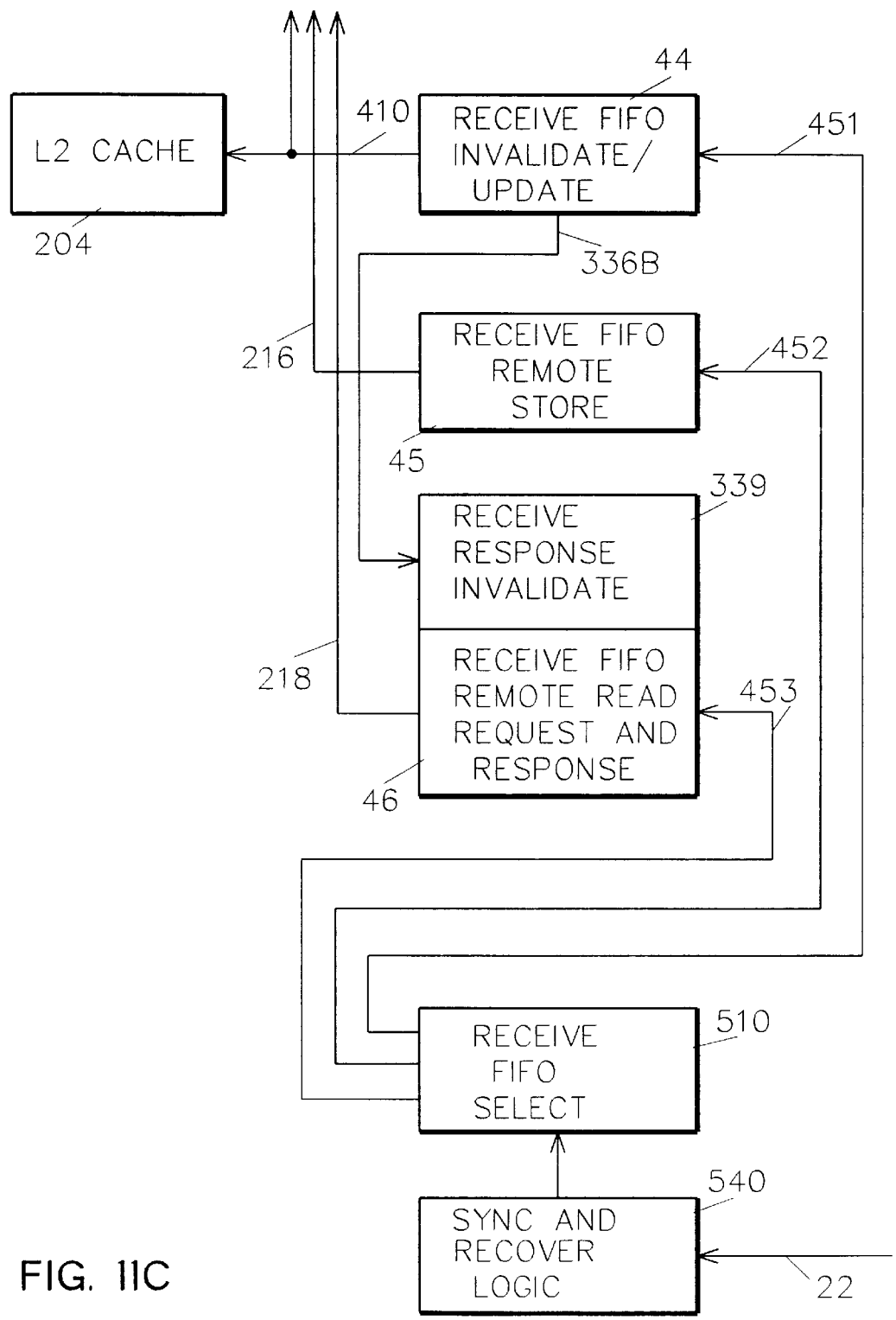

Referring to FIG. 11, send FIFOs 40–42 and receive FIFOs 44–46 are used to segregate and handle efficiently the cache invalidate functions, unchangeable remote accesses, and accesses requiring cache coherency. The six different network adapter operations (A, having two parts A1 and A2, and B through E, infra) use these six FIFOs.

A) Node 30 Accesses Data from Remote Memory 54

Referring to FIGS. 15A–15C in connection with the flow chart of FIGS. 14A and 14B, the operation of the preferred embodiment of the invention for reading from shared memory will be set forth. In step 730, processor 50 sends the local memory address word 826A of the next memory location to be accessed to L1 cache 100 and over bus 201 to memory controller 210 and L2 cache 204. In step 732, if the L1 cache 100 does not contain the addressed data, L1 miss line 203 is sent to L2 cache 204 and processing continues in step 734. If neither L1 cache 100 or L2 cache 204 contain the addressed data, in steps 735 and 737 L1, L2 miss line 207 enables memory controller 210. It then becomes the task of memory controller 210 to find and access the address in shared memory (the 16 memories 54—one located at each node 30, 34). Memory controller 210 functions, including compare step 744 and those steps on the YES output thereof, are only enabled if both caches miss (steps 732 and 734). Otherwise, compare step 744 is not reached for a read, and the read is completed in steps 738 or 740.

Memory controller 210 contains intelligence to decide whether the accessed address is located in local node memory 54 or remote node memory 54 located at some other node 34. This is accomplished in step 744 by comparing memory sector definition bits 820A of the local memory address word 826A to node ID register 470 via comparator 612. If the compare is equal, signal EQUAL 613 goes to 1 indicating the address is located in local node memory 54. In this case, in step 742 data is fetched from local memory 220 as follows: the read & store control logic 610 sends local memory address 822A to memory address MUX register 620 and activates MUX select 621 to send memory address 820 via address bus 240 to the local node memory 54. The requested data is accessed from local memory 54 and is returned to processor 50, L1 cache 100, and L2 cache 204 through processor data out register 604 and over data bus 202 without involving network adapter 10.

In step 742 data is fetched from local memory and returned to the local processor, local L1 cache, and local L2 cache. In step 746, as this data is fetched, a check is made to determine if the fetched data comes from the changeable area of memory. All copies of data fetched from the changeable area are tracked by the invalidate directory. If the data does not come from the changeable area, no tracking of data is required. In step 750, if the address does come from the changeable area, the address is sent to the invalidate directory along with the local node ID number. The invalidate directory uses this information to record that the local node has accessed a copy of the data for the corresponding address. In addition, the changeable area bit 815 is set and returned on line 673 to multiplexer 675, thence inverted at INV 809, AND'd with bit 850 in AND gate 806 and the resulting bit on line 807A concatenated with bus 807B to form bus 807 to processor data out register 604.

If the compare is not equal, in step 764 the requested memory address 826A is located in remote node memory 54. In this case, the read & store control logic 610 of memory controller 210 first checks in step 760 to see if there is a remote fetch for the same address in-progress. Read & store control logic 610 sends local memory address 826A plus file controls 617 to the active remote read file 640, where a real time record is kept of remote fetches in-progress.

Figure 16:
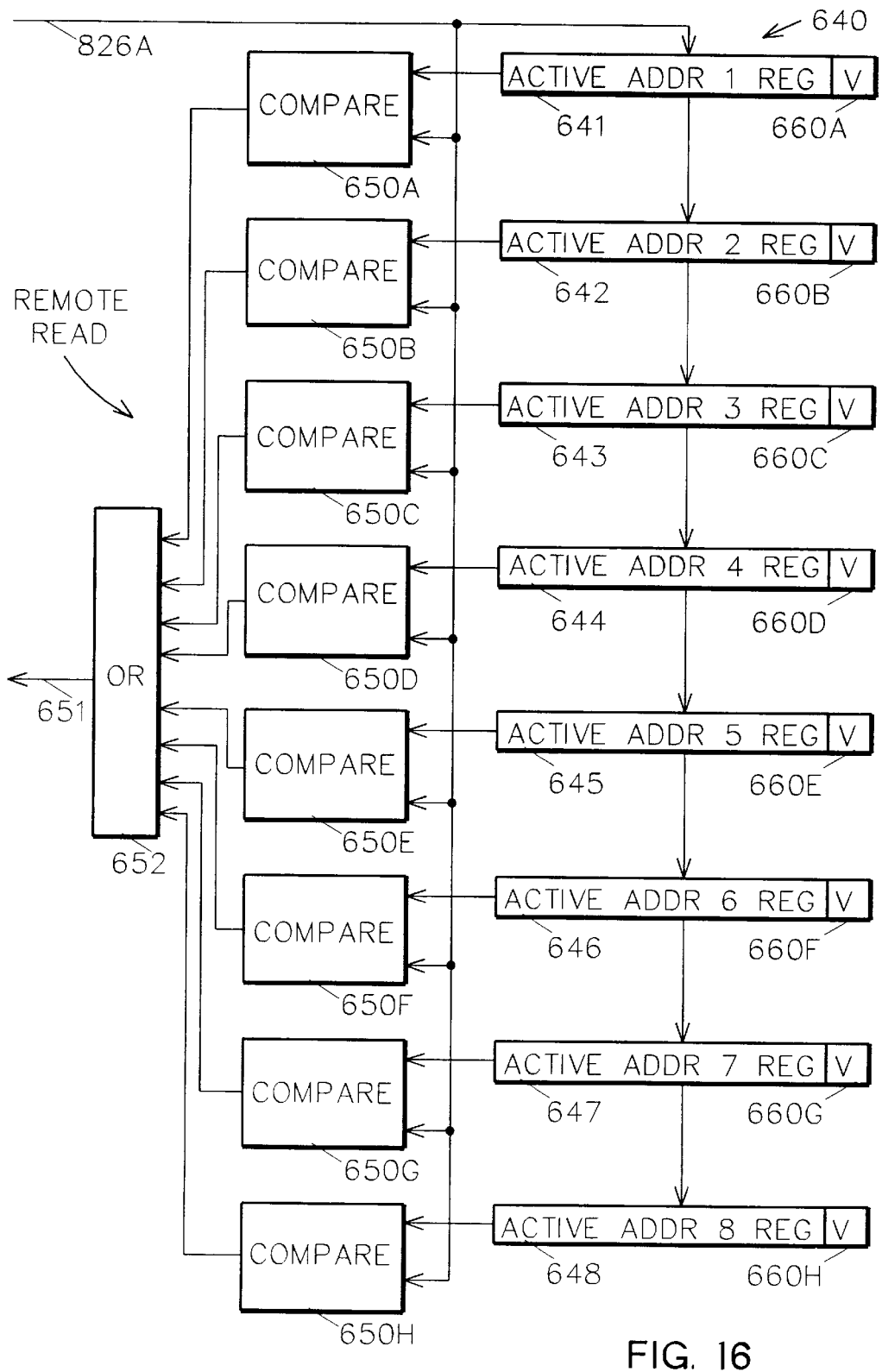
FIG. 16 is a diagram showing further details of the logic for tracking the remote read operations in-progress, which is part of the memory controller according to the preferred embodiment of this invention.

Referring to FIG. 16, further detail of the Active Remote Read File 640 is shown. File 640 contains 8 registers 641 to 648, each for storing a different address of a remote read request in-progress. The new local memory address 826A is sent to the comparators 650A to 650H and compared in parallel to all of the remote read requests presently in-progress (compared to all registers 641 to 648 which have their associated valid (V) bit 660A to 660H set to 1). The normal case is that there is no read request in-progress for the address 826A, and all the comparators 650A to 650H send zeroes to OR gate 652. In that case, in step 760, the compare equal 651 signal goes to 0 to indicate that there is no compare and there is no read request in-progress for the new address 826A. If compare equal 651 goes to 1 in step 760, there is a read request in-progress for the new address 826A; this case will be discussed hereinafter.

Further in step 760, upon compare equal 651 going to 0, read & store control logic 610 issues one of the file controls 617 commands to the active remote read file 640 commanding it to store the new address 826A to the file 640. The new address searches for an unused register 641 to 648, one whose valid (V) bit 660A to 660H is set to 0. The lowest number register 641 to 648 with V=0 stores the new address 826A and the associated V bit is set to 1. The V bit 660A to 660H remains at 1 until a response is returned from a remote node, then it is reset to 0 making the associated register 641 to 648 available to accept another address 826A of a subsequent read request.

In step 762, memory controller 210 checks temporary data storage 690 to determine if the remotely requested data has been previously stored to the temporary storage area internal to the memory controller 210. Normally, the requested data has not been previously stored to temporary data storage 690, and memory controller proceeds to step 764. The cases where data have been previously stored to temporary data storage 690 are discussed hereinafter.

In step 764, memory controller 210 returns status for the current thread to processor 50 to inform it that a remote read is required. This is accomplished by a pulse generated over the remote fetch interrupt line 230 to processor 50, that causes processor 50 to switch program threads because the present thread is being delayed. Remote fetch interrupt line 230 can be handled by the processor as a normal interrupt, in which case the interrupt causes a switch to another thread or more efficiently as a branch in the microcode of processor 50 to enter the thread switching routine. The exact implementation is left to the processor to handle in the best way, and is not pertinent to the present invention.

Referring to FIGS. 7, 10, 11A, 13A and 15C in connection with FIG. 14B, in step 766, memory controller 210 also generates the read request message to be sent, as is represented by line 213 to send FIFO 42 based on the local memory address word 826A. The message generation function is performed by the remote read/store message generation block 630. In this case the message is comprised of only the message header word 128. A conversion is made from the address word 826A of FIG. 10 to the header word 128 of FIG. 7. The local address 826A is converted to the message header word 128 by taking the 25-bit memory address field 822A of word 826A unchanged to become memory address field 818 of header 128, by taking memory sector field 820A of word 826A unchanged to become the destination field 813B of header 128, and by taking the contents of Node ID register 470 unchanged to be the source node field 814 of header 128. In addition, the OP code bits 810, 811, 812 are set to 0, 0, 1, respectively, to indicate a read request message 13A. The other control bits 815, 817, and the word count 819 are all set to zeroes. The word count is zero because message 13A is a header message only and requires no subsequent data words. Memory controller 210 forwards message header 128 over bus 213 to Send FIFO 42 of network adapter 10. All requests for reads from remote nodes are sent to Send FIFO 42 over bus 213.

The act of storing a message to send FIFO 42 in step 766 starts immediately starts the network operation of step 754, where node 30 becomes the requesting node because it is requesting (via message header 128) to access data from a remote node 34.

Referring to FIG. 11, each new message is stored at the tail of send FIFO 42. It awaits its turn to be sent to network 20. The message at the head of the FIFO is sent to the network first. If send FIFO 42 is empty when the header message is stored to the FIFO 42 (this is the normal case), the message goes immediately to the head of the FIFO 42 and is sent to network 20. If FIFO 42 is not empty, the message must work its way to the head of the FIFO before it is sent. Selector 500 performs a priority function amongst the three Send FIFOs 40, 41, 42 to determine which FIFO sends the next message. For the preferred embodiment the priority algorithm used is that send FIFO 40 is highest priority and send FIFOs 41 and 42 are both lowest priority. This means that if send FIFO 40 has no messages that send FIFOs 41 and 42 will send messages alternately, if both have messages to send.

In step 754, data is fetched from remote memory 220. This operation will be explained in connection with FIG. 17.

Figure 17:
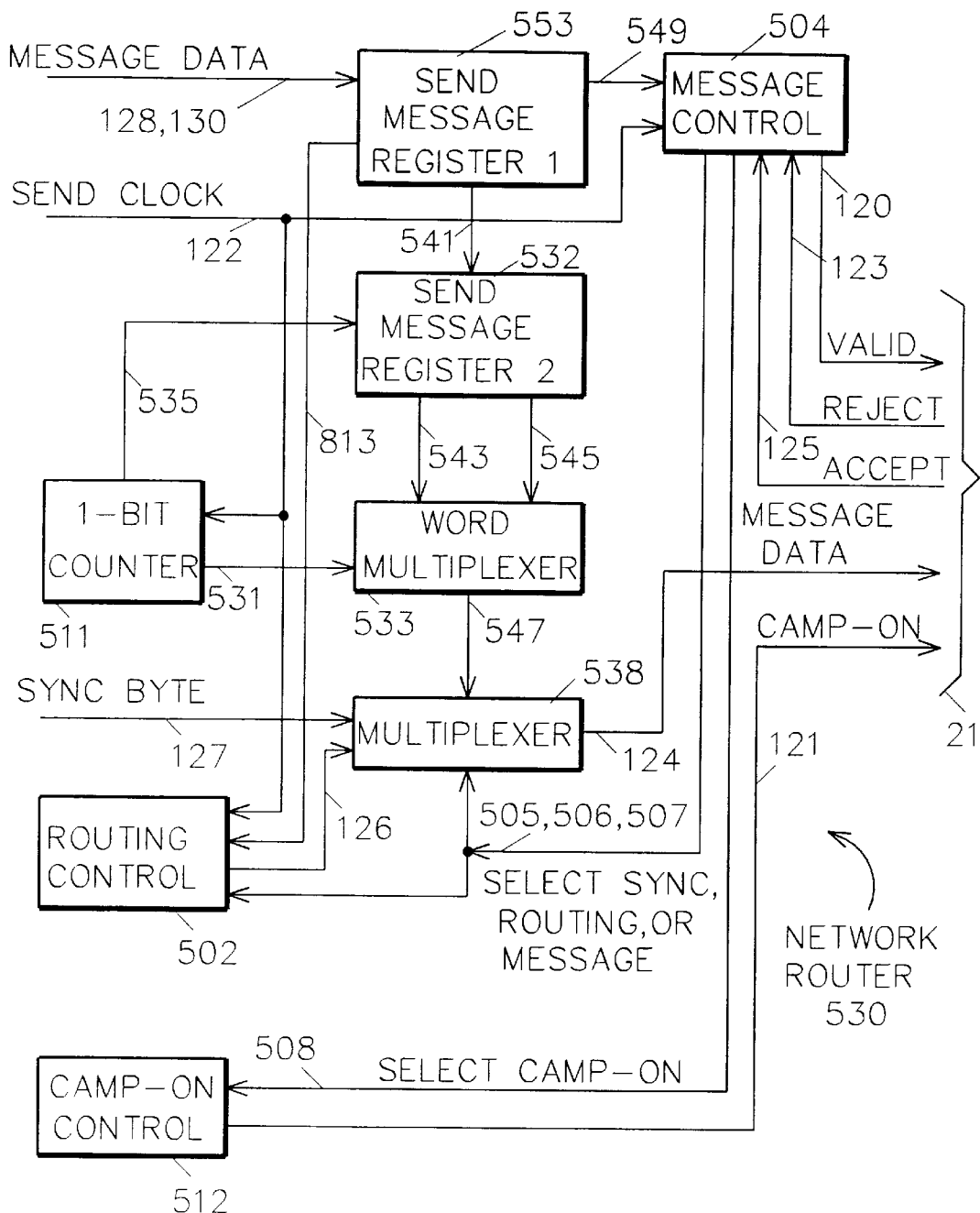
FIG. 17 is a diagram showing further details of the network router logic of the network adapter according to the preferred embodiment of this invention.

Referring to FIG. 17, a read request message 13A comprised only of header 128 requesting a remote read travels across the network as routed by network router logic 530. Send clock 122 is fed to message control block 504, 1-bit counter 511 and routing control 502. Message data busses 128, 130 feed send message register 553, the output of which is fed to message control 504 as represented by line 549. Outputs of send message register 1 are also fed on line 813 to routing control block 502 and on line 541 to send message register 2 532 along with the output of 1-bit counter 511 on line 535. The outputs of 1-bit counter 511 also include line 531 to word multiplexer 533, along with lines 543 and 545 from send message register 2 532. The output of word multiplexer 533 is fed on lines 547 to multiplexer 538, along with sync byte 127 and the output of routing control 502 on line 126 and select sync, routing, or message lines 505, 507, and 506 from message control 504, the latter of which (select routing line 506) is also fed to routing control 502. The output of multiplexer 538 is message data line 124 to port 21. Message control 504 receives as additional inputs reject line 123 and accept line 125 from port 21, and provides as additional outputs select camp-on line 508 to camp-on control 512 and valid line 120 to port 21. The output of camp-on control 512 is camp-on line 121 to port 21.

Referring further FIG. 17, network router logic 530 routes messages stored in send FIFOs 40, 41, 42 over network 20 to the destination node 34. Messages are stored to send FIFOs 40, 41, 42 as 65-bit double-words, which are comprised of two 33-bit words each. The first double-word (header word 128) of the message is read from the selected send FIFO in adapter memory 18 to send data register 553. The destination portion 813B of header word 128 in send data register 553 is sent to network routing control 502, where an alternate path is selected and routing bytes R1 and R2 are generated. Message control block 504 controls the send message operation. First, message control block 504 activates VALID 120 signal to network 20, and then sends the select routing signal 506 to MUX 538 and routing control 502, plus the select camp-on 508 signal to camp-on control 512. Select camp-on 508 is activated only after the first attempt at delivering the message over the quick path fails, and it causes the CAMP-ON 121 signal to be sent to the network over network interface 21. The select routing signal 506 being active to Mux 538 and routing control 502, causes routing control 502 to generate the network routing sequence 126 comprised of R1 and R2 separated by null (00h) bytes. R1 is an alternate path selection made at random for the appropriate destination 813B; i.e, the alternate path is selected from alternate paths AP1L, AP2L, AP3L, and AP4L if the destination node is number 8 or lower, and the alternate path is selected from alternate paths AP1H, AP2H, AP3H, and AP4H if the destination node is number 9 or higher. R2 is a straight binary selection based on the low-order 3 bits of the destination field 813B. The routing bytes 126 route the message to the correct destination by selecting one output from each switch stage of the network for connection. Routing byte R1 is stripped from the message as it goes through stage 1 of the network, routing byte R2 is stripped from the message as it goes through stage 2 of the network. Message control block 504 tracks the network routing sequence 126 being generated by routing control 502, and activates the select SYNC 505 signal for 1 clock time (of sending clock 122) to MUX 538, causing it to select and send sync byte 127 (all ones into Mux 538) to the network.

Referring to FIG. 17 in connection with FIGS. 4 and 6, since both the routing bytes 126 and SYNC byte 127 are only byte-wide entities and the switch data 124 width is 36 bits, bytes 126 and 127 plus a parity bit are replicated 4 times across the switch data 124 lines to provide the full 36 bits required. If each switch 60A, 60B, 60C, 60D of FIG. 4 of network 20 is comprised of 4 switches in parallel with each being 9 bits wide, each switch of the 4 parallel switches receives a different 9 bits of the 36 bit switch data field 124, and all functions are includes within each set of 9 bits; i.e., each set of 9 bit includes routing bytes 126 and SYNC byte 127 due to the above replication. Thus, each of the 4 parallel switches operates independently on a different set of 9 bits of the switch data 124, over which it receives routing, sync, and data. If each switch 60A, 60B, 60C, 60D of network 20 is comprised of a single switch with each being 36 bits wide, each switch can derive routing commands from any of the four different set of 9 bits of the switch data 124.

Referring further to FIG. 17, message control block 504, immediately after the one clock time for SYNC byte 127, activates the select message signal 507 causing header word 128 to begin the sending of the message, one word (36 bits) per clock time as selected by word multiplexer 533. The message is read from one of the send FIFOs 40, 41, 42 into to send data register 553 to send message register 532 and word multiplexer 533. Word multiplexer 533 selects a different word every clock time as controlled by 1-Bit Counter 511. Every second clock time the word in send data register 553 is moved to send message register 532, and the next word of the message is fetched from the send FIFOs into send data register 553. The double-words read from the send FIFOs are 65 bits wide, and they are sent to the network as two words of 32 and 33 bits, respectively. The network supports 36 bits to transport 32 and 33-bit message words. The extra network bits can be used to support error detection, which is not described herein because it is not pertinent to the present invention.

The SYNC byte 127 arrives first at the receiving node 34 to synchronize the asynchronous message to the receiving node clock. The method used for synchronizing and recovering the message arriving from the network is disclosed in U.S. Pat. No. 5,610,953, "Asynchronous Switch Data Recovery" by Olnowich et al. The method is not explained herein, since it is not pertinent to the present invention, except to know that there is a method and apparatus in the prior art for recovering data arriving in the format shown in FIG. 6. The incoming message is synchronized and recovered by block 540 of FIG. 11. The send FIFO operation is complete at this time as the message has been transferred from send FIFO 42 of the requesting node 30 across the network 20 to the RCV FIFO 46 of the destination node 34. The message 13A is erased from the send FIFO, allowing the next message in the FIFO to move to the head of the FIFO for transmission to the network. The next send FIFO operation begins immediately, there is no restriction that the next message transmittal must wait for the requested data to be returned before it can proceed. The number of remote fetches that can be active at anytime is limited by the number of registers implemented in the active remote read file 640 of FIG. 16. The preferred embodiment implements 8 registers, which permits 8 active remote fetches. However, other embodiments would implement 16, 32, or any number of registers in the active remote read file 640, so that the number of active remote fetches could be virtually limitless.

Referring to FIGS. 11A and 11B in connection with FIGS. 14A, 14B and 15A, 15B and 15C, destination node 34 receives and processes the remote fetch message from step 754 as follows. The RCV FIFO 44, 45, or 46 which is to receive the message is selected by RCV FIFO selection logic 510. Logic 510 determines that the message is to be passed to RCV FIFO 46 because it is a read request message 13A as indicated by bit 810=0, bit 811=0, and bit 812=1 in message header word 128. RCV FIFO 46 receives only read request messages 13A and response messages 13B. The incoming message 13A is stored at the tail of RCV FIFO 46. If the RCV FIFO is empty when the message 13A is stored to the FIFO 46 (this is the normal case), the message goes immediately to the head of the RCV FIFO 46 and is processed. If RCV FIFO 46 is not empty, the message must work its way to the head of the FIFO before it is processed. The processing involves forwarding the message comprised only of header 128 over remote responses and read requests Bus 218 to memory controller 210 of the receiving node 34. Memory controller 210 stores the read request message 13A to block 670, and from this point memory controller 210 processes the remote read request. The RCV FIFO operation is complete at this time and the message is erased from RCV FIFO 46, allowing the next message in the FIFO to move to the head of the FIFO for processing. The number of read request messages 13A that can be received to node 30 is limited by the size of RCV FIFO 46. For the preferred embodiment RCV FIFO 46 is implemented to contain 1K words of 65 bits each plus error detection and correction. Thus, RCV FIFO 46 could store up to 1K read request messages before it became full. This, makes the number of remote read requests being held in RCV FIFO 46 virtually limitless. If RCV FIFO 46 ever becomes full, the next arriving remote request would not be accepted over the network. It would be rejected and the requesting node 30 would continuously retry sending the message over the network until there was room for the message in RCV FIFO 46 at the destination node 34, and the message was accepted over network 20.

Figure 15D:
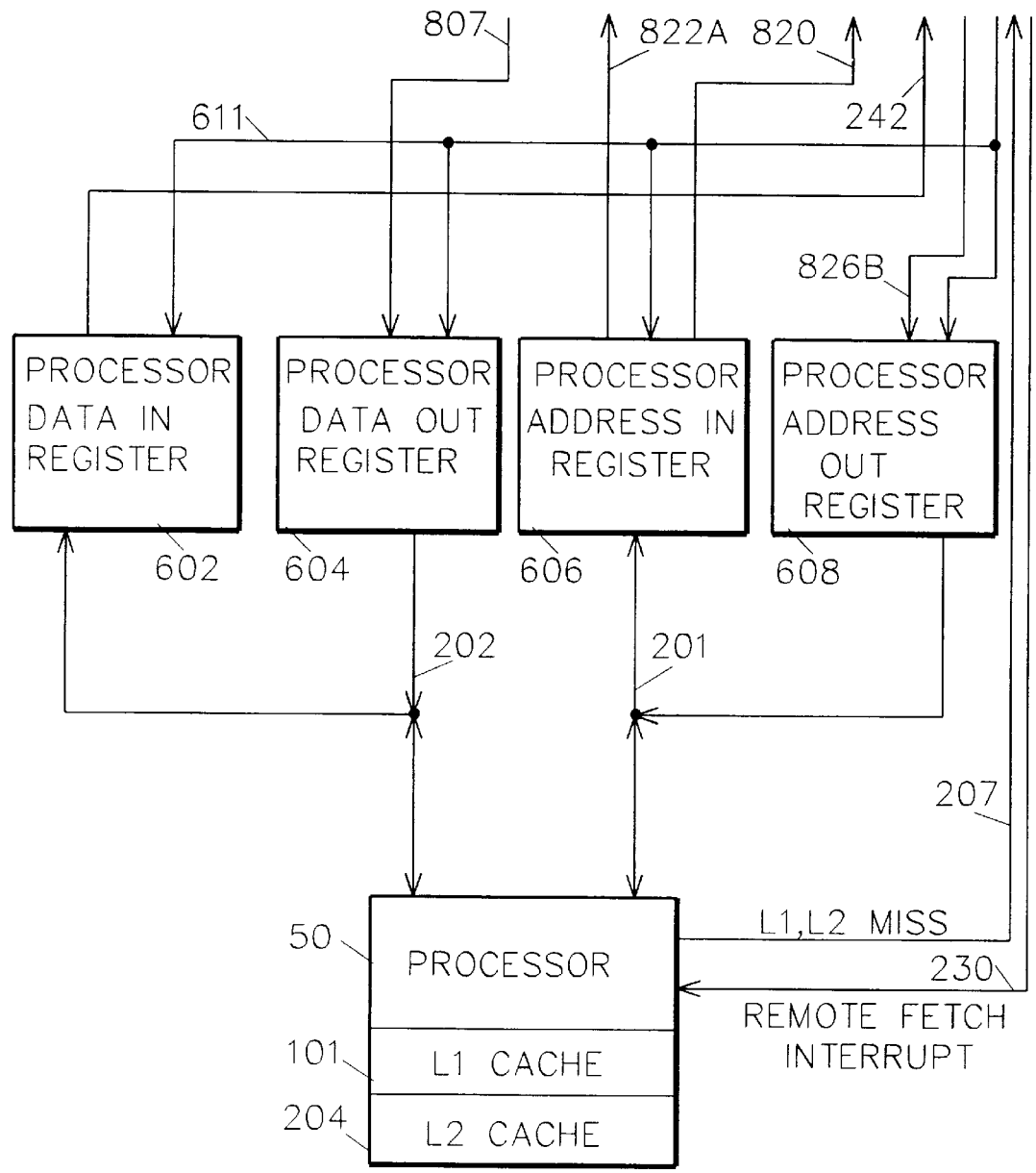

Referring to FIGS. 11 and 15 in connection with FIGS. 7 and 10, the remote read operation of step 754 continues as generate memory address from message header block 670 of memory controller 210 at receiving node 34 turns the message header 128 back into the same memory address word 826 from whence it was generated at the sending (requesting) node 30. This is just the reverse of the operation at requesting node 30. At the destination node 34, block 670 generates remote memory address word 826B (FIG. 10) from the message header 128 (FIG. 7.) Remote address 826B is used to find and access node memory 54 in the destination node 813B. Remote memory address 822B is passed to memory address MUX register 620 and gated to address bus 240 under control of the MUX select 621 signal from read & stores control logic 610. Thus, memory controller 210 accesses the data from node memory 54 based on the remotely sent address 826B. An entire cache line of 8 double-words are accessed from read/store data bus 242 and routed to remote read/store message generation block 630, along with the recreated remote memory address word 826. All remote reads (requests or responses) are changed into message format by the remote read/store message generation block 630, and the messages are sent to send FIFO 42 of network adapter 10.

Referring to FIG. 15C in connection with FIG. 2, for a remote read request remote read/store message generation block 630 generates a response message 13C containing a cache line of data 130 and a message header 128 to be returned to requesting node 30 over network 20. Header 128 of the response message 13C is generated basically in the same manner as described for the read request message 13A. In addition, memory controller 210 checks if the addressed location resides in the changeable area 222 of memory 54 based on the contents of changeable area locator register 472. The remote address word 826B, having been selected at multiplexer 666 by read and store control logic 610 line 667, is compared against the changeable area locator register 472 using comparator 672. If the remote address word 826B is less than the contents of changeable area locator register 472, it is located in the changeable area 222 of memory 54 and the changeable area signal 673 goes to 1. If the addressed location resides in the changeable area 222 of memory 54, remote read/store message generation block 630 senses that changeable area signal 673 is a 1, and a decision is made to involve invalidate directory 32 in any read from changeable memory 222, whether it is a local or a remote read of that data. Note that if processor 50 programs the contents of changeable area locator register 472 to be the highest order address in node memory 54, then the entire node memory 54 is comprised only of changeable memory 222. Locator register 472 identifies the location, or extent, of the changeable area and, depending upon whether that extent represents the minimum or maximum address value, the unchangeable area would be beyond that extent, whether it be above a maximum or below a minimum would be equivalent.

Referring to FIG. 11, invalidate directory 32 keeps an up-to-date account of which nodes 30, 34 have copies of each cache line of changeable data. This is so that when the changeable data is updated, invalidate directory 32 can be used to find the nodes which require invalidation of the corresponding data line in their caches. Thus, two different operations become active when data is read from the changeable area 222 of memory 54: 1) return of the remotely requested data, and 2) data tracking through the invalidate directory 32.

1) Return of Remotely Requested Data—Response Message

Figures 20, 20A:
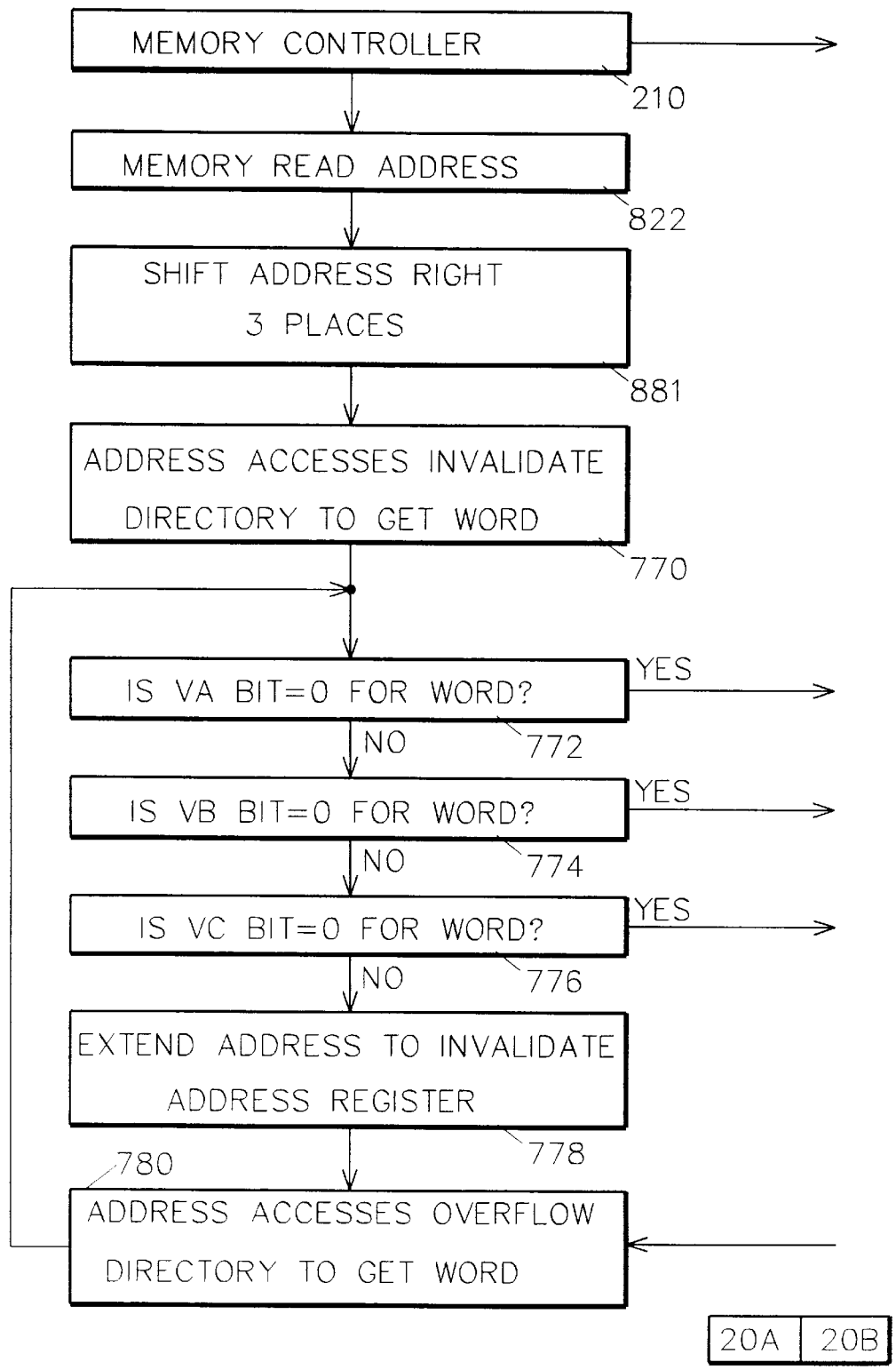
FIGS. 20A and 20B, arranged as shown in FIG. 20, are a flow chart of the operation for adding an entry to the invalidate directory according to the preferred embodiment of this invention.

Referring to FIGS. 15A through 15C, this function applies to both remotely requested data in changeable area 222 of memory 54 at this node 30 or unchangeable area 224 of remote node 34 memory 54. Remote read/store message generation block 630 of memory controller 210 constructs response message 13C by using the sending node ID field 814 of the received message header 128 to create the destination field 813B for the return message header 128. Memory area bit 815 is set to 1 if the memory access came from changeable area 222 of memory 54, and bit 815 is not set if the access came from unchangeable area 224. Bits 810 to 812 are set to 011, respectively, to indicate a response message 13C. Memory address field 818 of response message 13C is set equal to memory address field 822B of the remote address word 826B being held in block 670. As usual, sending node 30 ID field 813A of response message 13C is loaded from the node ID register 470 at the node 34 generating the message. The word count field 819 is given a value equal to binary 16. This is because the message now includes 8 double-words 854 (FIG. 12) or 16 words for transmission over network 20. This is based on the number of double-words in the cache line of the preferred embodiment being 8. Time stamp field 817 is set equal to the contents of the time stamp Register 889 (FIG. 21A.) The purpose of the Time Stamp 817 is to establish a point in time when response message 13C was issued. If the accessed data 130 is subsequently changed before the response message 13C is delivered, examination of the time stamp will enable the cache coherency logic to determine if the data 130 in the response message is obsolete. Further details of the time stamp are discussed hereinafter in relation to FIGS. 20A–20B and 21A–20B.

Referring to FIGS. 2A and 2B in connection with FIGS. 11A and 15A through 15C, memory controller 210 always sends to send FIFO 42 the changeable data bit 850 from memory 54 for each data word. This is done to let the requesting node 30 know if the data can be cached or not, based upon examining both bits 850 and 815. Controller 210 sends the return message header 128 plus the 8 double-words (each having a bit 850) over line 213 to send FIFO 42. In the same manner as described above, the message is sent across the network to the requesting node 30; the only difference being that the returning message is comprised of header plus 16 data words 130. The returning message goes back to RCV FIFO 46 of the requesting node 30 because it is a response message 13C. RCV FIFO 46 sends the data to memory controller 210 of the requesting node 30 over bus 218 to block 670. Controller 210 based on the message header bits 810 to 812 being 011 determines that the message is a response message 13C. The data is not stored to node memory 54, but sent from Generate Remote Memory Address & Route Responses 670 over response data bus 680 through data MUX 675 to processor data-out register 604. Register 604 sends the data to L1 Cache 100 and L2 cache 204 over data bus 202, just as if the data had been accessed from local node memory 54. The only difference from a local read is that a remote read takes longer. The address of the data is returned over address bus 201.

Referring further to FIGS. 2A and 15A through 15C, for all but one case, the remotely accessed cache line is returned immediately over the processor data bus 202 and the processor address bus 201 and stored into the caches 100, 204. The one exception is the case where bit 850 of the remotely fetched double-word 854 is equal to 1 and bit 815 in header word 128 equals 0. This special case means that changeable data has been read from the unchangeable memory area 224 of memory 54. The algorithm for handling this case is to treat the data word as being non-cacheable. This is the only case were data is not stored to caches 100, 204. All other data, whether changeable or unchangeable or regardless of from the area of memory they are read, are stored to the caches 100, 204. Prior art caches 100, 204 are used with the present invention and their design is not reviewed herein. Caches having individual validity bits for each double-word in a cache line would be the most advantageous. The individual double-word validity bit would never be set in caches 100, 204 for a data word 854 covered by the special case (bit 815=0 and bit 850=1). If the special case (bit 815=0 and bit 850=1) applied only to 1 or some of the double-words in a cache line, they would be marked as invalid in the caches 100, 204 and the rest of the double-words in the cache line would be marked as valid in the caches 100, 204. Caches 100, 204 implemented to have only one validity bit for the cache line would not store any cache line having one or more double-words which had 815=0 and bit 850=1. In either case, caches with individual validity bits or not, the prior art caches would operate efficiently because the special case of bit 815=0 and bit 850=1 is not a normal occurrence in most systems.

Referring to FIGS. 14A and 14B in connection with FIGS. 2A and 15A–15B, for the normal case, remotely read data is returned to the processor caches, making the requested data available locally in L1 and/or L2 caches 101, 204. When processor 50 switches back to the thread that required the remote read, processor 50 gets in step 732 or 734 a cache hit and the thread continues to execute in steps 738 or 740, respectively. If processor 50 returns to the thread prior to the remote access completing, in steps 732 and 734 there is once again a cache miss at both the L1 and L2 caches. In step 735, L1/L2 miss signal 207 is sent to memory controller 210 requesting a read of a cache line. In step 744, memory controller 210 proceeds as usual to determine if the read request is for local or remote memory 54. If it is for remote memory 54, in step 760 the active remote read file 640 is checked and compare equal 651 goes to 1, since there is a previous remote read request in-progress for the present memory address word 826A. Memory controller 210 at this point does not start another remote request for the same address 826A. Instead, memory controller 210 takes only one action and again returns status for the current thread to processor 50 to inform it that a remote read is in-progress. This is accomplished in the same manner as described hereinabove; i.e., a pulse generated over the remote fetch interrupt line 230 to processor 50, that causes processor 50 to switch program threads because the present thread is being delayed. Processor 50 keeps returning to the thread after other threads are interrupted until it gets a hit in the caches 100, 204, or in step 762 a memory controller response from temporary storage.

Figures 18, 18A:
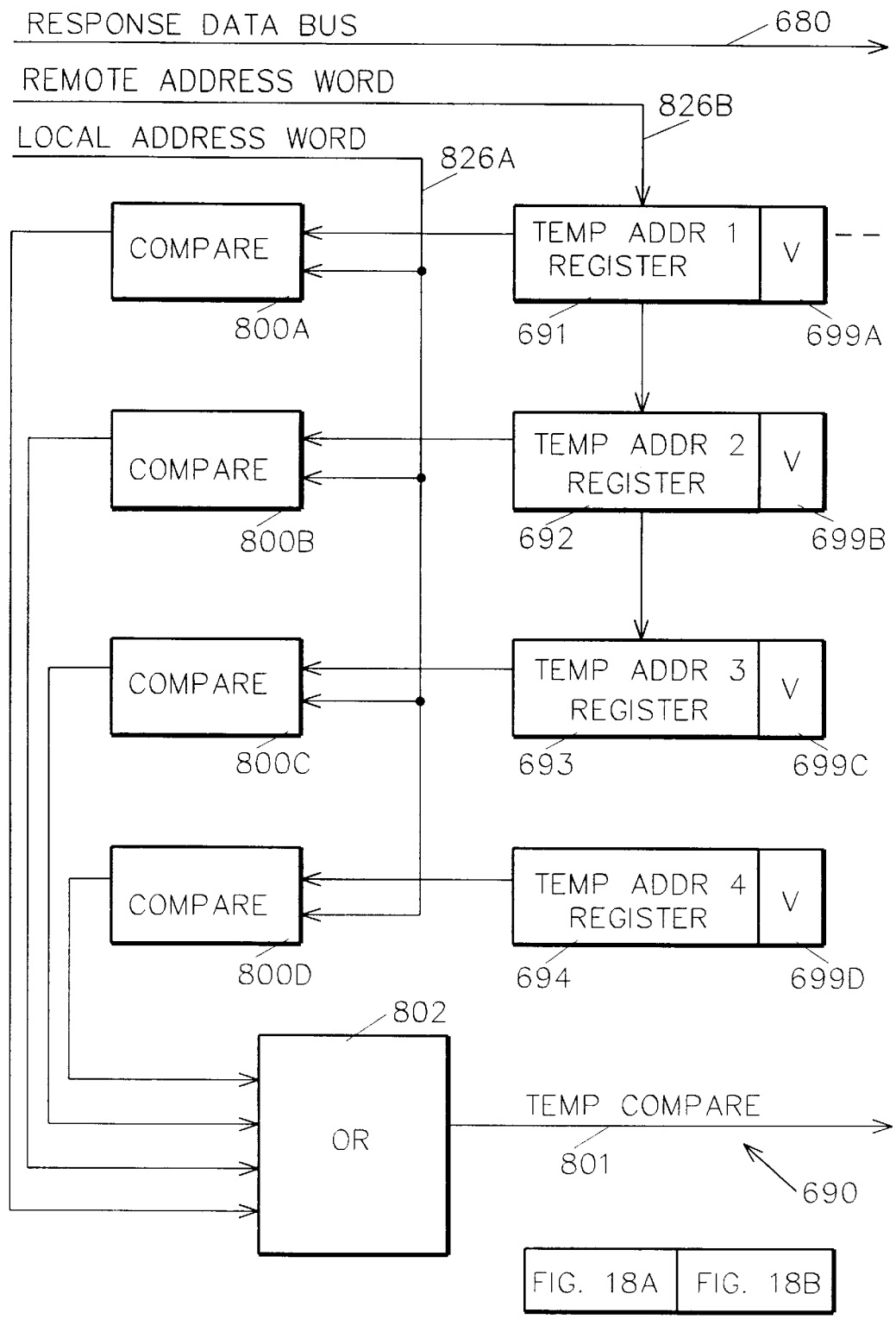
FIGS. 18A and 18B, arranged as shown in FIG. 18, are a diagram showing further details of the temporary data storage unit of the memory controller according to the preferred embodiment of this invention.
Figure 18B:
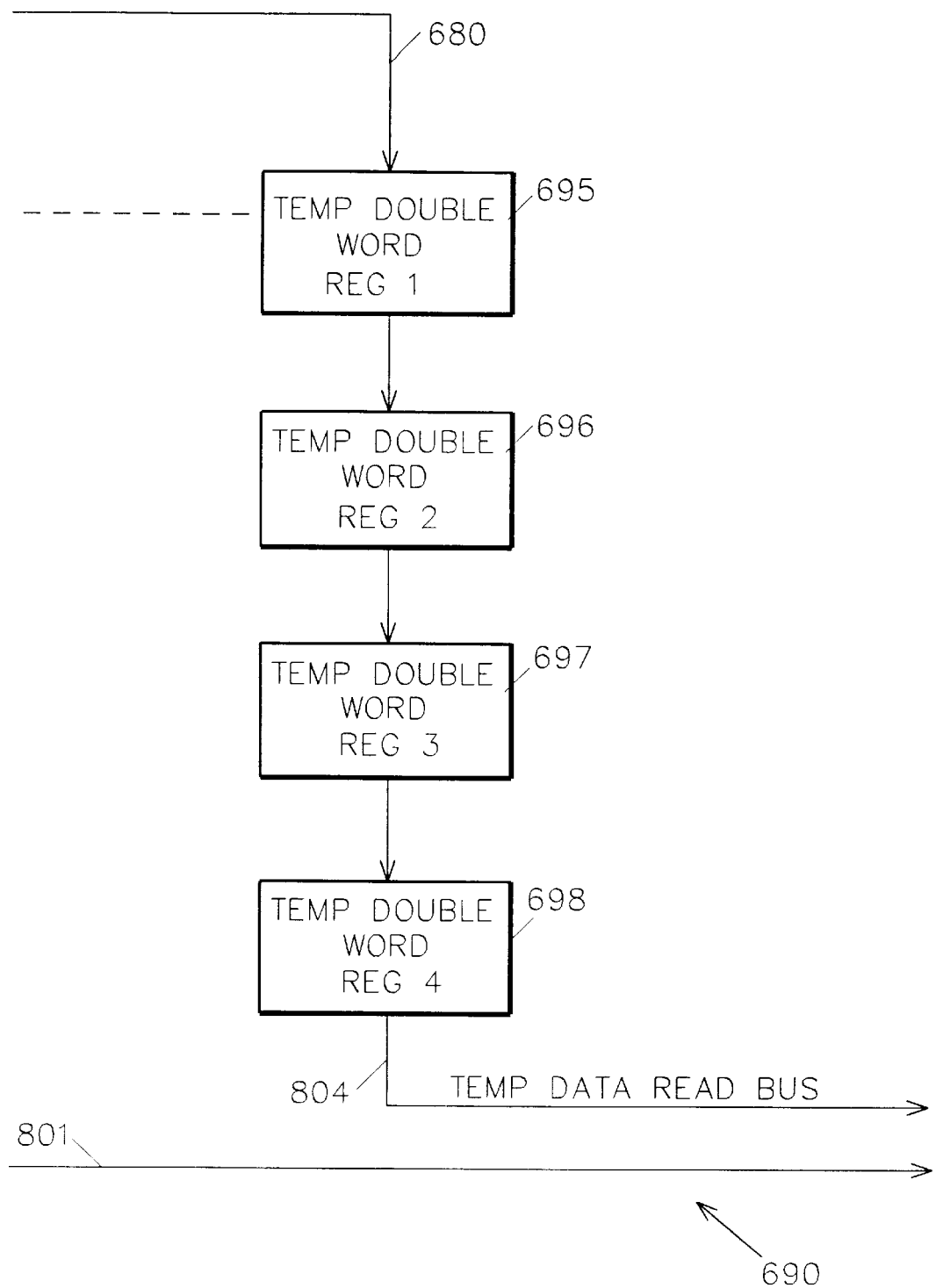

Referring to FIG. 18 in connection with FIG. 15C, further detail of temporary data storage 690 is shown. For the preferred embodiment temporary data storage 690 contains four register pairs 691, 695; 692, 696; 693, 697; and 694, 698 for providing temporary storage for 4 addresses 826B and their associated double-word of data. This is plenty of storage since this is a rare case. For every cache line returned by a remote response message, block 670 checks bit 815 of the message header 128 and the eight bits 850, one returned with each double data word. Bit 815 indicates whether the cache line was accessed from the changeable section 222 (Bit 815=1) or the unchangeable section 224 (Bit 815=0) of memory 54, and bit 850 indicates whether each data word 854 is changeable or unchangeable. The eight bits 850 for the accessed cache line are logically Ored (not shown) and if the result of the OR is 1 and bit 815=0, the special case is detected. In this case, block 150 sends only the one double-word requested plus the associated bits 815, 850 to Temporary Data Store 690. The new data and address searches for an unused register pair, one whose valid (V) bit 699A to 699D is set to 0. The lowest number register pair with V=0 stores the new address 826B and its associated double-word (64 bits), concatenated with bits 815 and 850, on 66 bit wide bus 680. The associated V bit 699A–D is then set to 1. The lower numbered registers 691 to 694 store the address word 826B, while the higher numbered registers 695 to 698 store the double-data word from bus 680. The associated V bit 660A to 660H in the active remote read file 640 is set to 0, after the entry is made to temporary data storage 690—thus completing a remote access operation just as if the data had been stored to the caches 100, 204 for the normal case. The associated V bit 699A to 699D takes over at this point, and remains at 1 until processor 50 reads the special case data from temporary data storage 690. Data is sent to temporary data storage 690 over response data bus 680. Only the one requested double-word of the eight returned is sent to temporary data storage in memory controller 210, along with the remote address 826B. The other 7 double words are destroyed if the caches 100, 204 do not have individual validity bits for each double-word. However, if the caches 100, 204 have individual validity bits for each double-word, the 7 words are not destroyed. The data is returned to the caches as usual, even if bit 815=0 and bits 850=1. Data is returned over response data bus 680 through MUX 675 to processor busses 202, 201. If the caches 100, 204 have individual validity bits, the words in the caches which have bit 850 set are marked as invalid in the caches. Processor 50 will still get a cache miss when it accesses the invalid location in cache, and processor 50 will still have to get the data from temporary data storage 690.

Referring to FIGS. 15A–15C and 18, the special case (bit 815=0 and bit 850=1), indicating the double-word requested remotely is non-cacheable, will be described. In the usual manner, processor 50, when returning to a thread that was delayed by performing a remote read request, in steps 732, 734 checks the caches 100, 204 first for the remotely accessed data and then goes to the memory controller 210 for the data. For the special case memory controller 210 cannot return the data to the caches 100, 204, so the memory controller must temporarily store the remotely accessed data internally and wait for the processor 50 to request the data again.

Referring to FIG. 18 in connection with FIGS. 14A and 14B, every address 826A sent by processor 50 is processed in step 760 by comparing address 826A against the 4 temporary address registers 691 to 694 in temporary data storage 690 in parallel using comparators 800A to 800D. When the processor accesses a location in temporary data storage 690, the output of one of the comparators 800A to 800D goes to 1 and drives OR gate 802 to 1, activating the temporary compare 801 signal to 1. Temporary compare 801 going to one selects data MUX 675 to select the data on temporary read bus 804 to be sent through MUX 675 to processor data-out register 604 and then to processor 50 over processor data bus 202. Bits 815 and 850 are read with the data from temporary data storage 690 over temporary read bus 804 and MUX 675. However, after going through MUX 675, bits 815 (on line 815A) and 850 (on line 850A) are converted by inverter 809 and AND gate 806 to form the non-cacheable 807A signal. The non-cacheable 807A signal is activated to 1 only when bit 815=0 and bit 850=1. The non-cacheable 807A line is sent as part of the processor data bus 202 to inform caches 100, 204 that this data is not to be stored in the caches. After this the associated valid bit 699A to 699D is reset to 0, clearing the data entry from temporary data store 690 and making the associated register pair available to accept a subsequent entry.

Referring to FIGS. 15A–15C in connection with FIG. 2, non-cacheable 807A signal is sent with every double-word sent to processor 50 and caches 100, 204 over Processor Data Bus 202. For local accesses to local memory 54, bit 815 is created from the changeable area 673 signal line sent along with read/store data bus 242 to multiplexer 675. Bit 850 is read from local memory and is already present on read/store data bus 242 as the 65th bit.

The preferred embodiment returns data to the processor and caches over the processor data bus 202. To do this it has to arbitrate and interfere with other users of the processor data bus 202. An alternative embodiment would be to implement 2 ported caches that would receive remote data and invalidates over the second port, so that they would not interfere with the other users of processor data bus 202 on the first port. The present invention works equally well in either case—with either 1 ported or 2 ported caches.

2) Data Tracking through the Invalidate Directory 32

Figure 19:
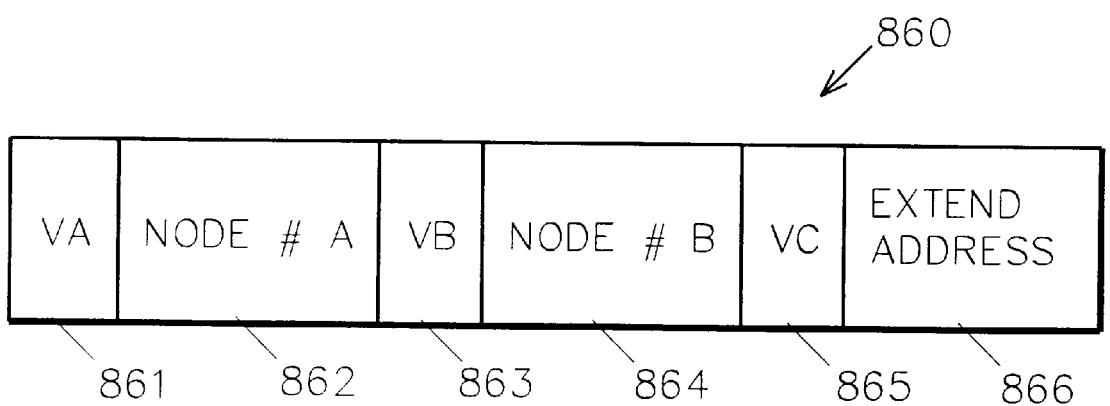
FIG. 19 is a diagram showing the composition of each invalidate word stored in the invalidate directory according to the preferred embodiment of this invention.

Referring to FIGS. 10 and 19 in connection with FIGS. 2, 11, 20, and 21, invalidate directory 32 can be implemented in several ways, but the preferred embodiment uses word 860 of FIG. 19. One word 860 is required in invalidate directory 32 for each cache line residing in changeable memory 222. The word 860 for any cache line is accessed from the invalidate directory 32 by using address 822 sent by memory controller 210 over address bus 240 to memory 54 and network adapter 10. However, before address 822 is applied to invalidate directory 32, address 822 is shifted right 3 places to divide it by 8 and store it into invalidate address register 880 to create invalidate address 881. The 3 bit shift is necessary because invalidate directory 32 contains 1 word 860 for every cache line (every 8 words), so there are ⅛th the number of addresses required for the invalidate directory 32 as there are changeable data words in memory 222. For the preferred embodiment address 822 is 25 bits and addresses 8 Megawords of changeable data and 24 Megawords of unchangeable data per sector of memory, and the invalidate address 881 is 21 bits and addresses 1 Megaword invalidate directory 32 plus a 64K word overflow directory 334. Word 860 indicates which nodes 34 have accessed a copy of the corresponding cache line. For instance, field 862 of word 860 contains one 8-bit field 862 which contains the node ID number 470 of one node 30, 34 (either remote or local) that has read a copy of the corresponding cache line. Field 864 stores the Node ID number 470 of another node 34 that has read a copy of the corresponding cache line. Additional node indicia (ID numbers) are pointed to by the extend address 866 field of word 860. Each entry 862, 864, 866 of word 860 has a validity bit VA 861, VB 863, VC 865, respectively, which defines if the associated node ID 862, 864 or address 866 is valid (VX=1) or not (VX=0).

Figure 21A:
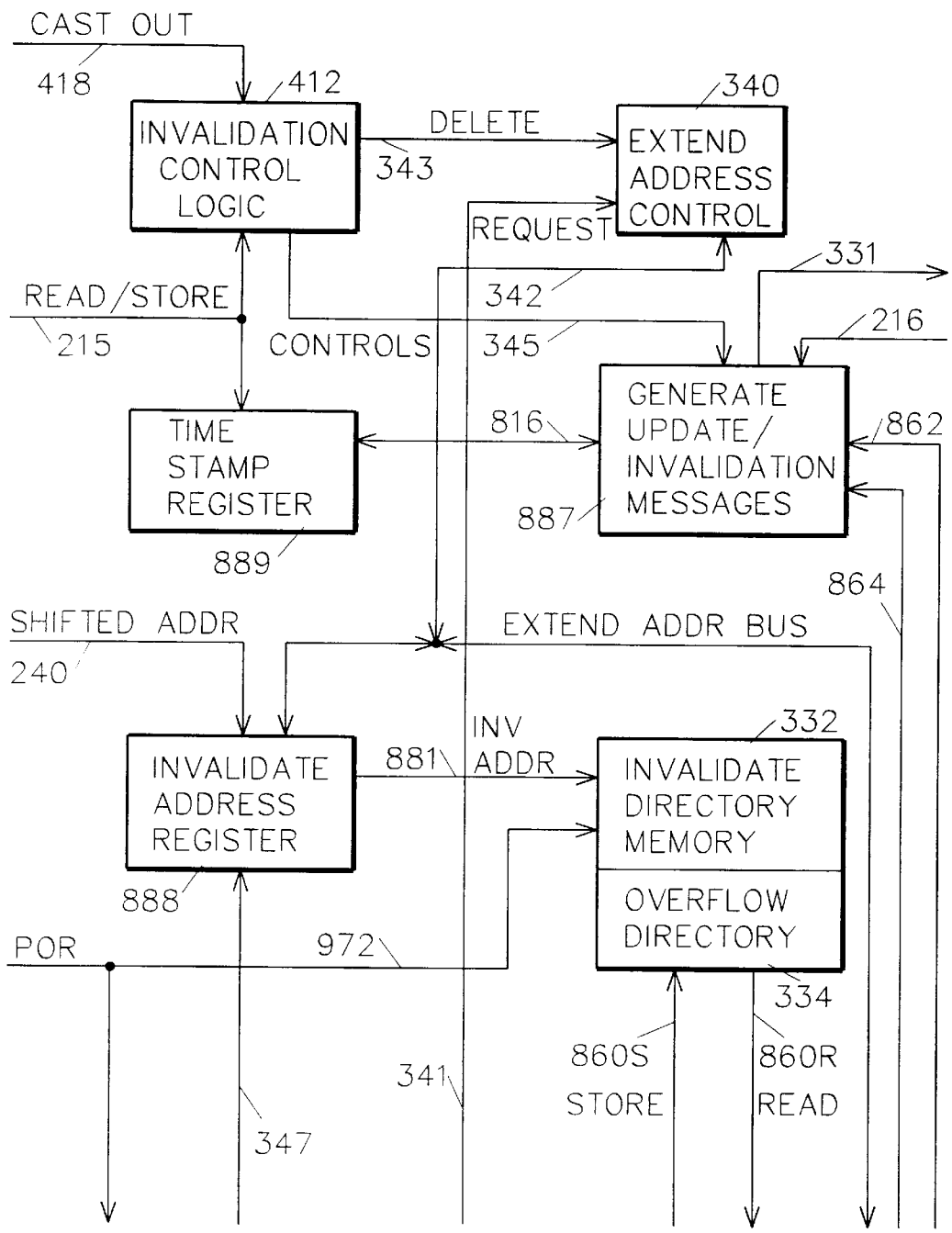
FIG. 21A and 21B, arranged as shown in FIG. 21, are a block diagram of the operation for adding an entry to invalidate directory according to the preferred embodiment of this invention.
Figure 21B:
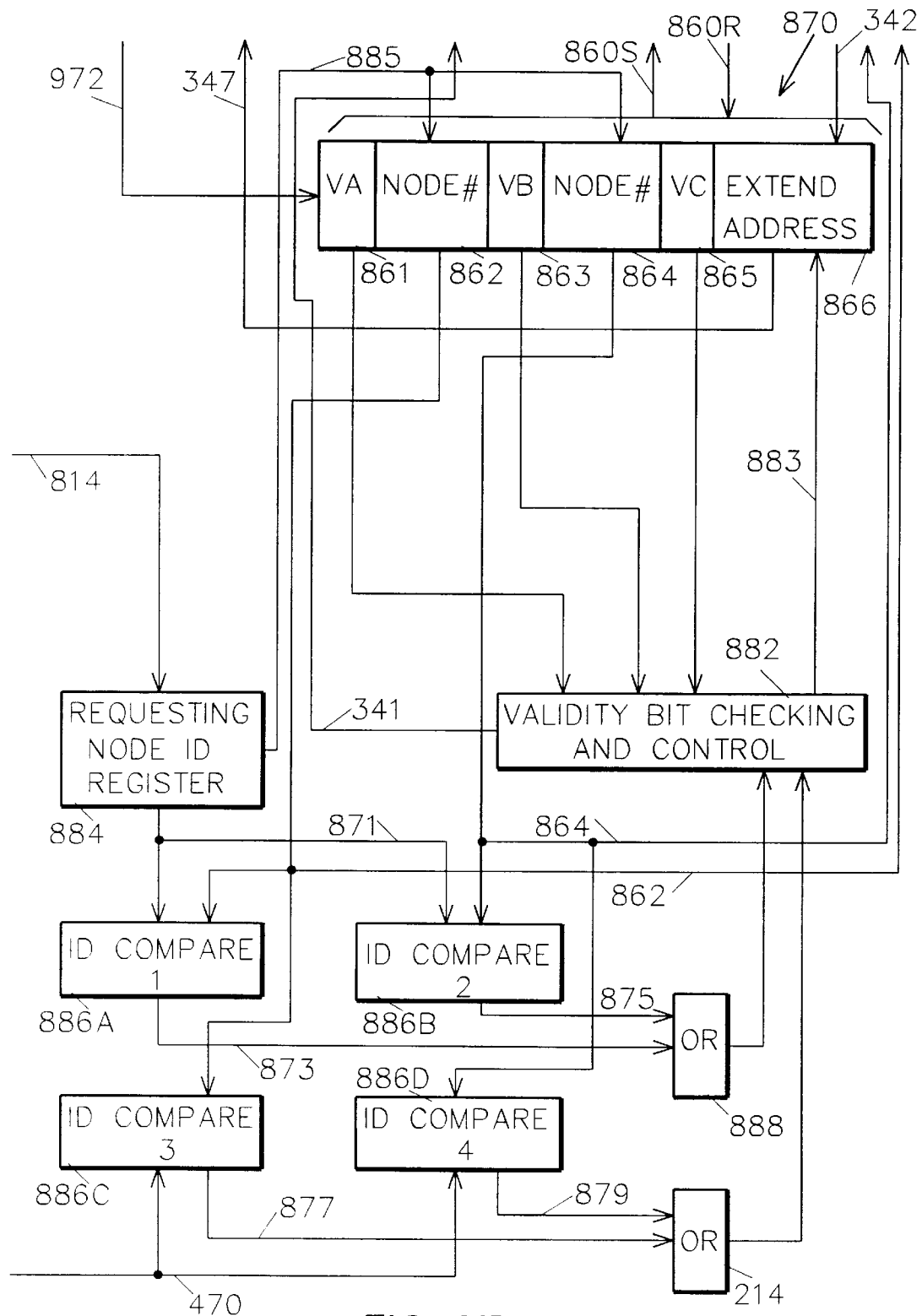

Referring to FIGS. 21A and 21B, invalidate directory 32 will be described. Power on reset (POR) line 972 is input to directory memory 332/334 and register 870. Invalidate register 870 contains a plurality of invalidate directory words 860, of the format previously explained with respect to FIG. 19, and including fields 861–866. Cast out line 418 is input to invalidation control logic, along with read or store line 215, which is also fed to time stamp register 889, the output of which is fed on time stamp line 816 to generate update/invalidation messages block 887. Controls line 345 is fed from invalidation control logic block 412 to messages block 887, and delete line 343 to extend address control block 340. Bidirectional extend address bus 342 interconnects extend address control 340, invalidate address register 880 and extend address field 886 of invalidate register 870; new address are loaded to bus 342 by control 340, and delete address are directed to control 340 from register 880 or field 866 of register 870. Shifted address bus 240 is input to invalidate address register 880, along with extend address line 347 from register 870. The output of register 880 is fed on invalidate address line 881 to invalidate directory memory 332. Invalidate directory memory 332 and overflow directory 334 contents are loaded to invalidate register 870 over store bus 860S, and read therefrom over read bus 860R.

Figure 20B:
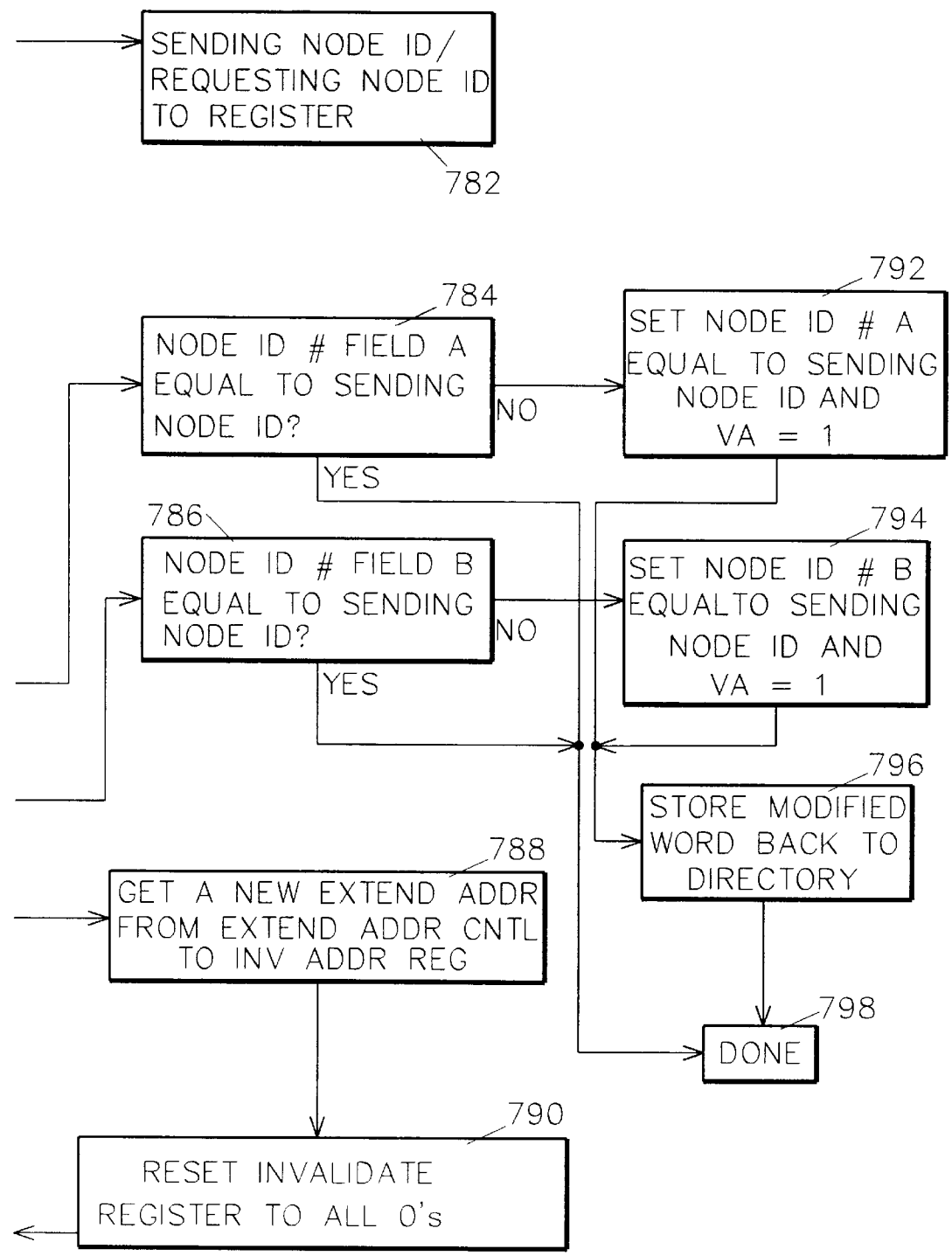

Referring to FIG. 20B in connection with FIG. 21B, in step 782, requesting node ID is fed on line 814 to register 884, and used to determine the node 30, 34 that is accessing a copy of the addressed cache line. The outputs of register 884 are fed on lines 885 to node ID fields 862 and 864, and on lines 871 to ID comparators 886A and 886B. Node ID register output line 470 is fed to ID comparators 886C and 886D. Node ID field 862 is fed on lines 862 to ID comparators 886A and 886C and update/invalidation messages block 887. Node ID field 864 is fed on lines 864 to ID comparators 886B and 886D and block 887. Validity fields 861, 863 and 865 are fed to validity bit checking and control block 882, along with the outputs of OR gates 888 and 214. OR gate receives the outputs of comparators 886A and 886B on lines 873 and 875, respectively. OR gate 214 receives the outputs of comparators 886C and 886D, respectively. Validity bit checking and control block 882 provides load zeros line 883 to field 886 of register 870, and request line 341 to extend address control block 340. Generate messages block 887 receives as input stores from remote lines 216, and provides as output send invalidate/update lines 331.

Referring to FIGS. 21A and 21B, in operation, the memory portion of invalidate directory 32 is comprised of two memory sections 332, 334. Section 332 contains the normal invalidate directory memory and section 334 contains the overflow directory. Both directories contain the same invalidate directory Word 860 shown in FIG. 19, and overflow directory 334 words 860 can be extended by pointing to other overflow directory words 860 using extend address 866 field. When the invalidate directory memory 332 has two valid Node ID fields 862, 864, the arrival of the next address 822 causes overflow. The extend address field 866 is used to locate another word 860 stored in section 334. Extend address control logic 340 keeps track of which addresses in overflow directory 334 are available for use. Invalidate directory 32 requests an extend address from control logic 340 over request signal 341, and an address is returned over bus 342. Invalidate directory 32 stores the extend address to field 866 of word 860 and sets VC bit 865 to valid (VC=1) to indicate that the list has overflowed to another word 860 which is pointed to by the extend address field 866. For the preferred embodiment, the overflow directory 334 contains 64K words.

Referring to FIGS. 20A and 20B in connection with FIGS. 2A, 15A, 15C, 21A and 21B, the process for adding an entry to invalidate directory 32 will be described.

In step 770, when memory controller 210 is returning remotely requested data by generating a response message in block 630, it sends the memory address 822 from field 822B of message header 128 shifted right 3 places (block 881) to the invalidate directory 32 over address bus 240.

In step 782, the sending Node ID 813A of message header 128 is also sent to invalidate directory 32 over requesting node ID bus 814 and stored in register 884. Sending node ID 813A and the requesting node ID 814 are the same value, and that value is used to determine the node 30, 34 that is accessing a copy of the addressed cache line.

Further in step 770, invalidate directory memory 332 stores the shifted address 822 to invalidate address register 880 to become invalidate address 881, and accesses the corresponding first invalidate directory word 860 from invalidate directory memory section 332 for the corresponding cache line. Word 860 is stored to invalidate register 870.

In steps 772, 774 and 776, validity bit checking and control logic 882 checks all three validity fields VA 861, VB 863, VC 865, respectively, to determine if an invalid node ID field 862, 864 is available in the first word 860.

In steps 784 and 786, validity bit checking and control logic 882 compares the node ID fields 862, 864 to the incoming requesting node ID field 814, which is stored in register 884. If an equal compare exists and the associated validity bit 861, 863 is set, the incoming address 814 is already in the list from a previous request and at step 798 no further action is taken at this time.

The following cases occur if the compares in steps 784 and 786 are not equal:

a) In steps 792 and 794, if at least 1 validity field VA 861, VB 863 is invalid (V=0), one invalid field 862, 864 is selected to contain the sending node ID 814 from register 884. Register 884 is stored to the selected field 862, 864 and the associated validity bit 861, 863 is set to valid (VX=1). In step 796, the modified word 860 is then stored back to the same address in the invalidate directory 32, which completes the function of adding the access of a new copy of the cache line to the invalidate directory 32.

b) In steps 772–776, if both validity fields 861, 863 are valid (VX=1) but field 865 is invalid (VC=0), in step 778 extend address control 340 is requested over signal 341 to supply the next valid extend address on line 342. Validity bit VC 865 is set to 1 and extend address line 342 is stored to field 866 of word 860 and to invalidate address register 880. The modified word 860 becomes the first word 860 and is stored back to the same address in the invalidate directory memory 332 from which it was read as pointed to by invalidate address register 880. A second invalidate directory word 860 containing all zeroes is started, as in step 790 control logic 882 clears invalidate register 870 to all zeroes. The sending node ID 814 in register 884 is stored to field 862 over the new node # 885 signals and the associated validity bit VA 861 is set to valid (VA=1). In step 780, the second word 860 is then stored back to the overflow directory 334 from invalidate register 870 based on invalidate address 881 from invalidate address register 880 which now points to the extend address from line 342. Third, fourth, etc. words 860 are created in the same manner.

c) In step 788, if all 3 validity fields 861, 863, 865 are valid (VA=VB=VC=1), extend address field 866 is used to access a second word 860 from the overflow invalidate directory 334. Second words 860 accessed from the overflow directory 334 are processed in the exact same manner as words 860 from the normal invalidate directory memory 332.

Figure 22:
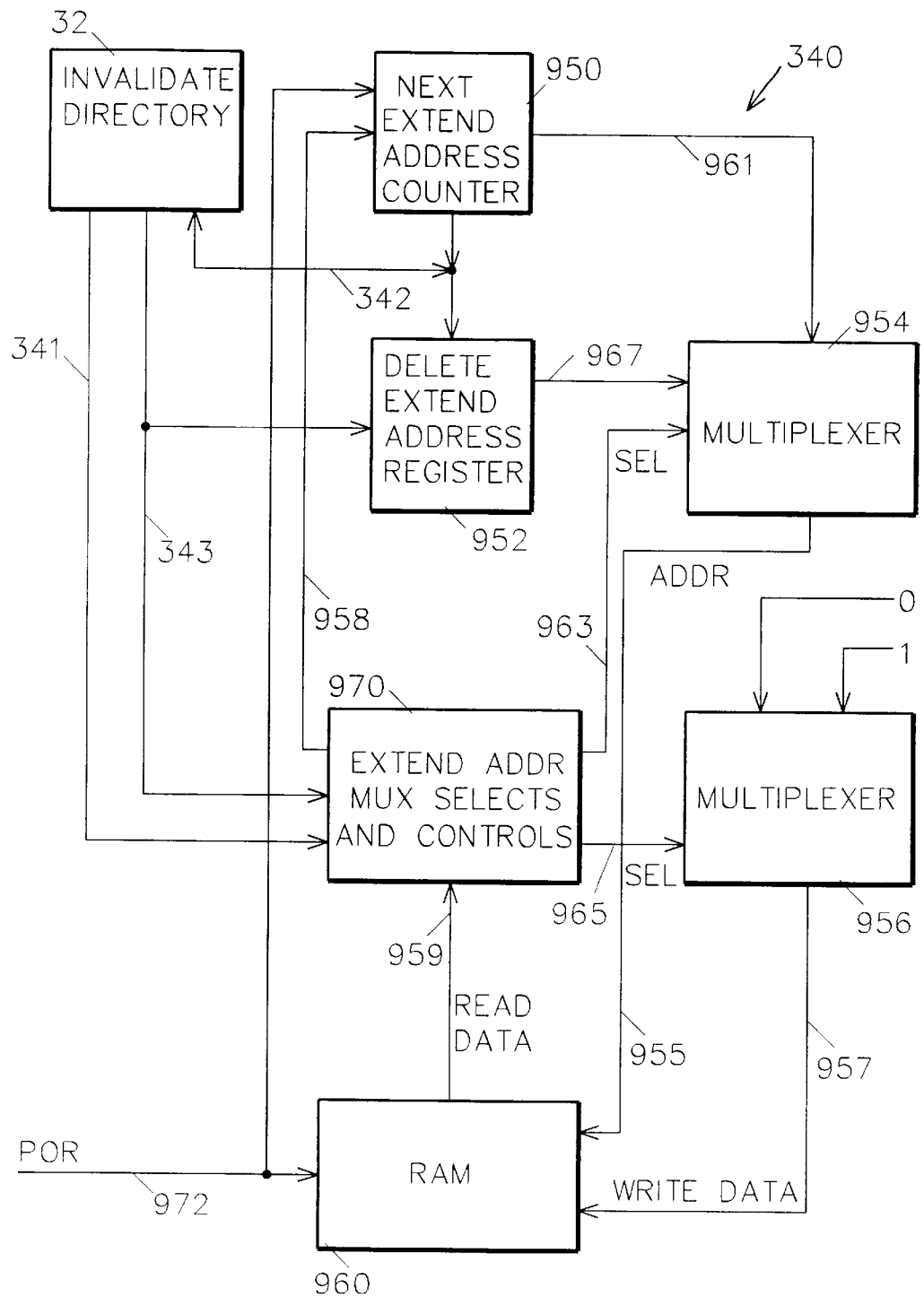
FIG. 22 is a block diagram of the extend address controls of the invalidate directory according to the preferred embodiment of this invention.
Figures 23, 23A:
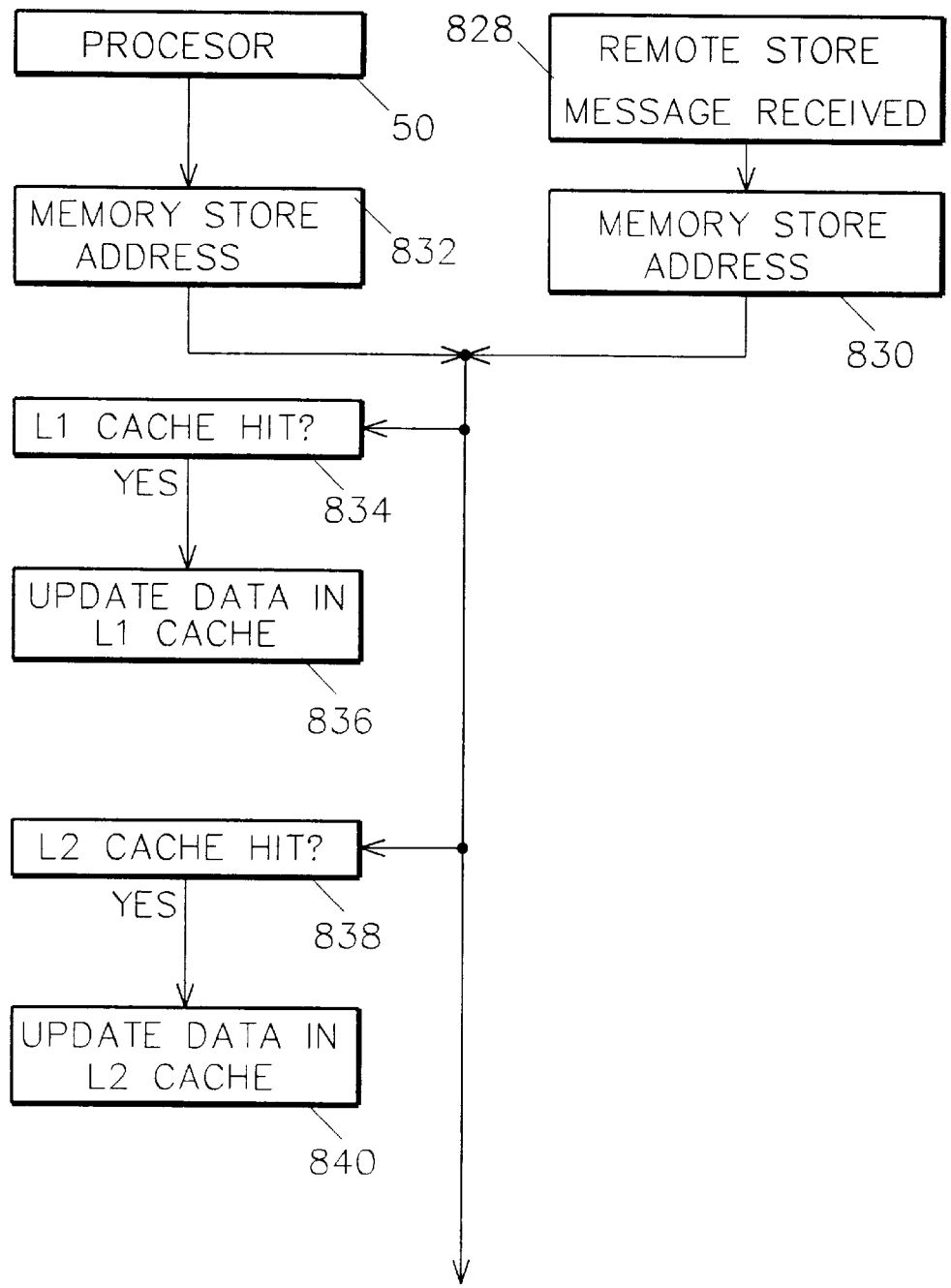
FIGS. 23A and 23B, arranged as shown in FIG. 23, are a flow chart of the processor operation for storing data to shared memory according to the preferred embodiment of this invention.
Figure 23B:
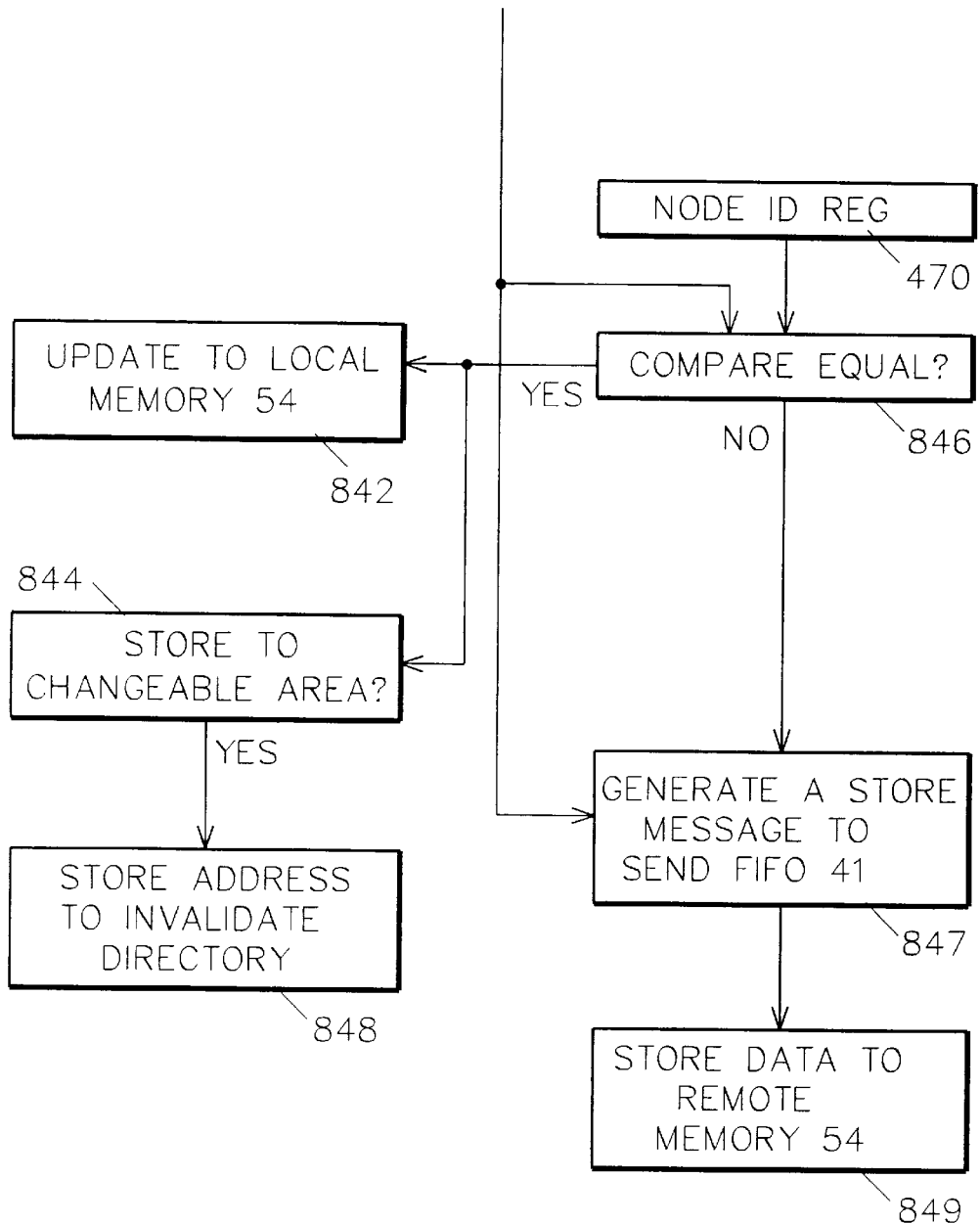

Referring to FIG. 22, a block diagram of the implementation of extend address control 340 is shown. Invalidate directory 32 request line 341 feed extend address multiplexer selects and controls block 970; and delete line 343 is fed to controls 970 and delete extend address register 952. Power on reset line 972 is fed to RAM 960, invalidate directory 32, and next extend address counter 950. Increment line 958 is input to next extend address counter from controls 970. Next extend address counter 950 output line 961 and delete extend address register 952 output line 967 are fed to multiplexer 954, and thence fed on RAM address line 955 to RAM 960 under control of select line 963 from controls 970. Select line 965 is fed from controls 970 to multiplexer 956, the inputs to which are 0 and 1. Multiplexer output is write data line 957 to RAM 960. Extend address bus 342 interconnects invalidate directory 32, next extend address counter 950 and delete extend address register 952, with new extend addresses directed from counter 950 to directory 32, and delete addresses directed from directory 32 to register 952. Read data line 959 is fed to controls 970 from RAM 960.

Referring further to FIG. 22 in connection with FIGS. 21A and 21B, in operation, invalidate directory 32 requests an extend address on extend address bus 342 by request line 341 being activated to the extend address MUX selects and control block 970. Extend address controls 340 normally has the next extend address waiting in next extend address counter 950. Next extend address counter 950 is gated to extend address bus 342 and sent to invalidate directory 32 immediately. Then, extend address controls 340 searches for the next new address in preparation for the next request 341. Extend address controls 340 contains RAM 960, which is comprised of one bit associated with each of the 64K addresses in the overflow directory 334. Each bit in RAM 960 is a 0 or a 1, where a 0 indicates an unused extend address 866 and a 1 indicates a previously used extend address 866.

Extend address MUX selects and control block 970 activates the Increment 958 signal to step the next extend address counter 950 by 1. The new RAM address 955 from MUX 954 being equal to the value in next extend address counter 950 is used to address the RAM and read out one bit of data for the corresponding address 955 over RAM read data 959. Extend address mux selects and control block 970 determines the value of the bit read from the RAM. If it is a 1, the increment 958 signal is activated again to step the Next extend address counter 950 by 1, and the search continues for the next available address. When a 0 is read from RAM 960, the next available extend address has been found. The next address is stored in the next extend address counter 950, which is not incremented any further at this time. Extend address MUX selects and control block 970, controls MUX 956 to select a 1, and writes the 1 to the address stored in the next extend address counter 950. This indicates that the newly found address will be used for the next request 341, and it is marked as used in advance to save time when the next extend address is requested.

To make an address location in overflow directory 334 available, a 0 is written to RAM 960 for the corresponding address. This is called a delete operation, where an extend address 866 is made available by deleting its prior usage. The operation is triggered by the invalidate directory 32 activating the delete signal 343, which stores the extend address 866 to be deleted to delete extend address register 952. The method for activating delete 343 and determining the extend address 866 to be deleted will be explained hereinafter. Extend address mux selects and control block 970 responds to delete 343 by selecting a 0 to MUX 956 and register 952 to MUX 954. The address in register 952 is used on RAM address 955 to RAM 960 and selects the bit of data that is to be deleted (made available). Extend address MUX selects and control block 970 controls the writing of a 0 over RAM write data 957 to RAM 960 and the operation is complete. Power-on-reset 972 is pulsed during system power-up or initialization, and clears the contents of RAM 960, invalidate directory 32, next extend address counter 950, and invalidate register 870 to all zeroes.

B) Node 100 Stores Data to Local Memory

Referring to FIG. 2A, processor 50 sends the memory address word 826 (FIG. 19) of the memory location to be updated (stored) to L1 cache 100 and over bus 201 to memory controller 210 and L2 cache 204. All stores must operate in the write-thru mode; i.e., the new data must be stored to local caches 100, 204 and to shared memory.

In operation, referring to FIGS. 15A through 15C, 23A and 23B, memory controller 210 controls the store to shared memory 54 by receiving memory address word 826A over address bus 201 to processor address-in register 606 and memory data word 854 over data bus 202 to processor data-in register 602.

In step 846, memory controller 210 compares sector field 820A of address 826A of the store operation 830, 832 to node ID register 470. If the compare is equal, the store is determined to be to local memory 54, and in step 842 memory controller 210 stores word 854 to local node memory 54 over bus 242 from register 602 and sends address 826A through memory address MUX register 620 to bus 240 to select the memory location to be written.

In step 844, memory controller 210 compares the address 826A of the store operation to changeable area locator register 472 in comparator 672. If the store is determined to be to the unchangeable area 224 of memory 54, no further action is required because the data is non-cacheable and cannot be stored in caches at any nodes 30, 34. If the store is determined to be to changeable area 222 of memory 54, in step 848 the network adapter 10 becomes involved. Referring to FIGS. 11A and 11B, address 822A is sent over address bus 240 to the invalidate directory 32. The invalidate directory 32 becomes involved in the store operation to maintain cache coherency across the plurality of nodes 30, 34. The invalidate directory 32 of FIG. 21 contains a list of nodes which have accessed copies of each cache line in the changeable area 222 of memory 54. The store operation of step 848 over-writes old data with new data 854, and all copies of the cache line are invalidated or updated in order to maintain cache coherency.

Invalidation occurs by sending invalidation messages over network 20 to all nodes 34 which have copies of the changed cache line, except for the node 30 which initiated the store and the node 34 which is storing the new data to its local memory. Memory controller 210 signals invalidation directory 32 that a store to address 822A on address bus 240 has been executed by sending the node ID number 814 of the node requesting the store operation to invalidation directory 32 over the requesting node ID 814 signal plus an indication of the type of operation over the read or store signal 215. The requesting node ID number 814 informs invalidation directory 32 which remote node 34 does not get an invalidation message plus it never sends an invalidation message to its local node 30. Instead, these two nodes are updated. This is because both nodes receive copies of the updated data, the other nodes do not. If the node 30 initiating the store and the node 30 performing the store are identical, then only that one node gets the updated data and it does not get an invalidation message.

The invalidation message, as shown in FIG. 13E, is comprised of only one word—message header word 128 of FIG. 7. The invalidation message is identified by OP code bits 810 to 812 equalling 101, respectively. Word count field 819 is set to 0 to indicate the message is fully contained within header 128. In one embodiment of the invention, the cache line is invalidated in all remote caches. If the node 34 receiving the invalidation message still requires the updated cache line, it must send a read request message to access an updated copy of the cache line.

Referring to FIGS. 21A and 21B, invalidate directory 32 generates and sends invalidate messages to send FIFO 40. invalidate directory 32 uses the address 240 from memory controller 210 to access the first invalidate directory word 860 from invalidate directory memory section 332. Invalidate directory word 860 is examined to determine if any copies of the cache line have been accessed by other nodes 34. This is determined by checking validity bits 861, 863, 865 of word 860 of FIG. 19. If all three validity bits 861, 863, 865 are zeroes, there are no copies at other nodes, there is no need to send any invalidation messages, and the store operation is complete. For each validity bit that is set to 1, whether it be in the first invalidate directory word 860 or second words 860, an invalidate message is stored to send FIFO 40, except for the node 34 which is storing the data and the node 30 requesting the data update. Invalidation directory 32 checks for node ID number of the node storing the data 854 by comparing every valid 862 and 864 field in invalidate directory word 860 to both the requesting node number 814 and node ID register 470. FIG. 21 shows the four compares using comparators 886A to 886D. If either set of compares is equal, the associated validity bit is left at 1, no invalidation message is sent, and the invalidate directory 32 looks for other valid 862, 864 fields if extend address 866 is valid (VC=1).

Referring further to FIGS. 21A and 21B, in operation, for a valid field 862, 864 that does not compare equal to the requesting node number 814 or local node ID register 470, an invalidation message is generated by generate invalidation messages block 887 and sent to send FIFO 40. The invalidation message 31E is formed similar to any normal message header 128, except that field 862 or 864 is loaded to destination field 813B of invalidation message 13E and bit 815 is set to 1 to indicate the store is to the changeable area of memory 222. In addition, time stamp field 817 of invalidation message 13E is loaded from time stamp counter register 889. Time stamp counter 887 maintains a continually incrementing binary number which is used in regards to invalidation to tell if a read of the changed data in the form of a response message 13C occurred prior to or after an invalidation of the associated data. Everytime the read/store signal 215 indicates a new store is occurring to invalidation control logic 412, time stamp counter 889 is incremented by 1. The incremented value of the time stamp counter 889 is loaded to the invalidation message 13E to define the time that the invalidation occurred. Further use of the time stamp field 817 in message headers 128 are explained hereinafter.

Referring again to FIGS. 19, 21A and 21B, validity bit 861 or 862 in invalidation words 860 is set to 0 (VA=VB= 0=invalid) after its associated Node # field 862, 864 is used to define the destination of an invalidation message 13E. After fields 862, 864 have been processed (generated invalidation messages or left as is), they are checked to see if either or both are still valid. If either is not valid, their corresponding 862 and 864 fields are reloaded with any missing requesting node ID from register 884 or local node ID number from register and the corresponding validity bits 861, 863 are set to 1. The extend address from extend address bus 342 is used to locate another invalidate directory word 860 in overflow directory 334, if validity bit 865 equals 1 (VC=1). However, previous to accessing the overflow directory 334, the validity bit 865 of word 860 in register 870 is set to 0 (VC=0=invalid) and the modified invalidation directory word 860 containing one or two valid node numbers of the nodes having copies of the updated cache line is restored to invalidate directory 32. Then, extend address received from bus 342, if previously valid, is moved from field 866 of register 870 to invalidate address register 880, and used to address a second word 860, which is stored to register 870. The second word 860 is processed exactly the same way the first word 860 was processed—generating further invalidation messages or being left as is. Multiple words 860 are processed until a word 860 is found having validity bit 865 equal 0 (VC=0).

Referring to FIG. 22 in connection with FIG. 21, all second words 860 need not be rewritten after being modified. Instead, all second words 860 involved in the invalidation process are made available to be used again through extend address control logic 340. Extend address 866 of each second word 860 from overflow directory 334 is returned to the extend address control block 340 over bidirectional bus 342 and stored in delete extend address register 952. Then, invalidation control logic 412 activates delete signal 343, and extend address control logic 340 writes zero at the address pointed to in RAM 960 by register 952. This makes the address in the overflow directory available to be used again, as previously explained.

Referring to FIG. 11A, each new invalidate message 13E on line 333 is stored at the tail of Send FIFO 40. Each awaits its turn to be sent to network 20. The message at the head of FIFO 40 is sent to the network first. If Send FIFO 40 is empty when the message is stored, the message goes immediately to the head of the FIFO 40 and is sent to network 20 immediately. If FIFO 40 is not empty, the message must work its way to the head of FIFO 40 before it is sent. Selector 500 performs the priority function amongst the three send FIFOs 40, 41, 42 to determine which FIFO sends the next message. For the preferred embodiment the priority algorithm used is that send FIFO 40 is highest priority and send FIFOs 41 and 42 are both lowest priority. This means that the invalidation messages 13E in send FIFO 40 are always sent immediately to network 20.

Precaution must be taken not to permit any response messages 13C being held in send FIFO 42 or RCV FIFO 46 and containing old data for an address just invalidated are delivered and processed. If there are response messages for an invalidated address being held in send FIFO 42 or RCV FIFO 46, the invalidation message 13C could be received before the response messages 13C and coherency would be corrupted. This problem is prevented by checking all outgoing response messages 13C in send FIFO 42 with all incoming response messages 13C in RCV FIFO 46. These messages 13C contain remotely requested data yet to be returned to the caches of the requesting node 30. Prevention of this condition is implemented by erasing, instead of forwarding, response messages 13C containing a same cache line having obsolete data.

Figure 24A:
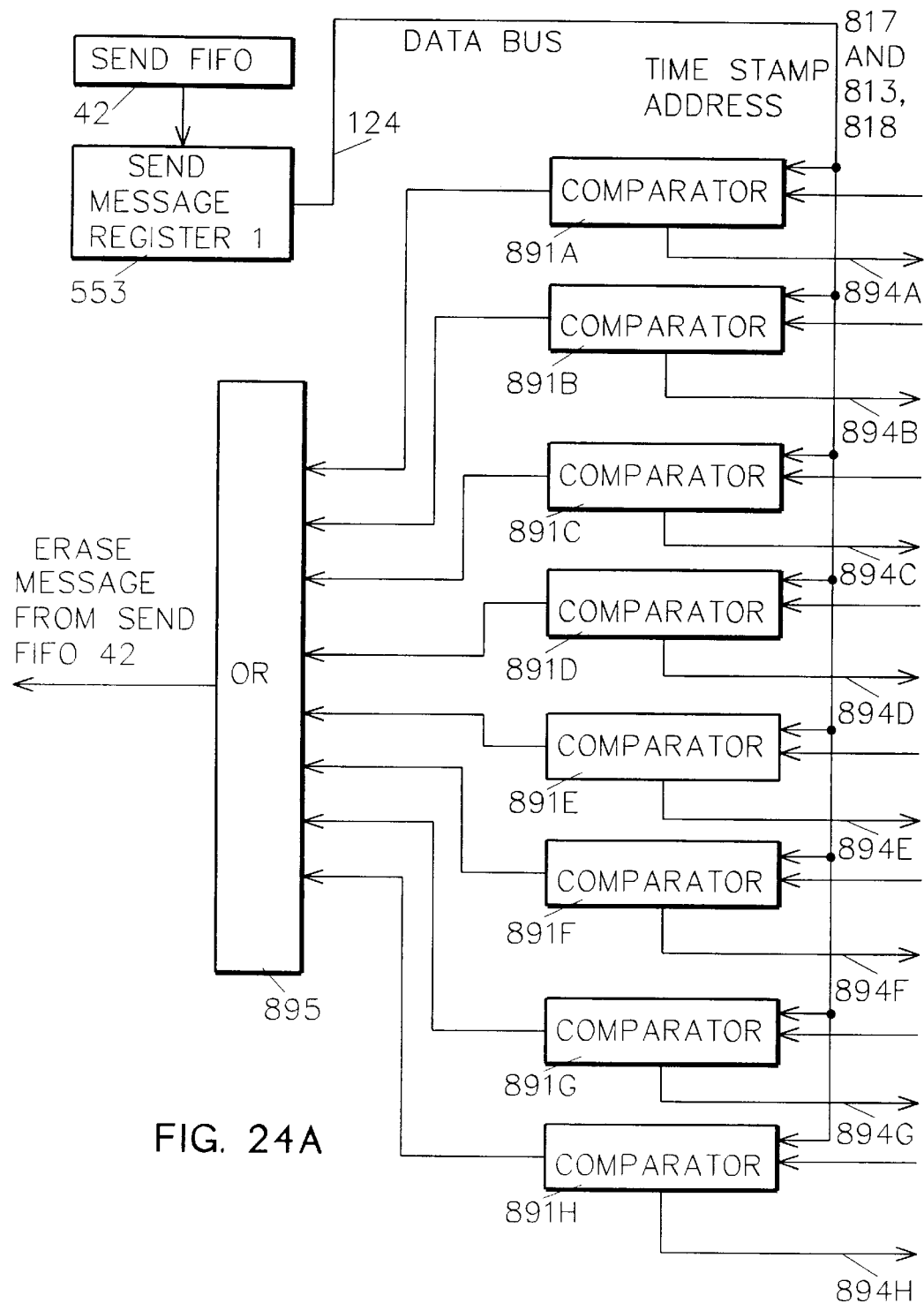
FIGS. 24A, 24B and 24C, arranged as shown in FIG. 24, are a block diagram of the invalidation control logic for erasing obsolete messages from the send FIFO according to the preferred embodiment of this invention.
Figure 24B:
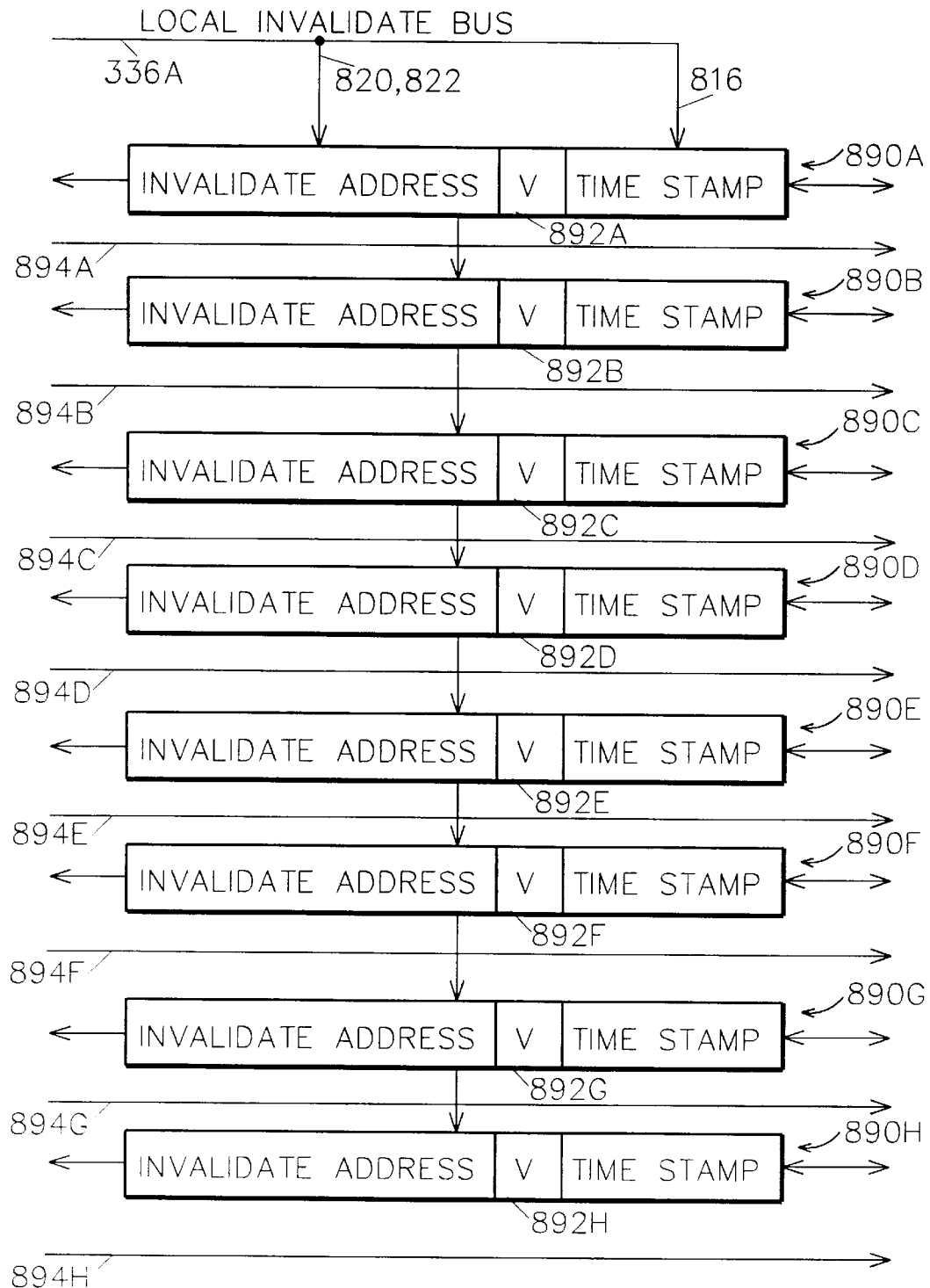
Figure 24C:
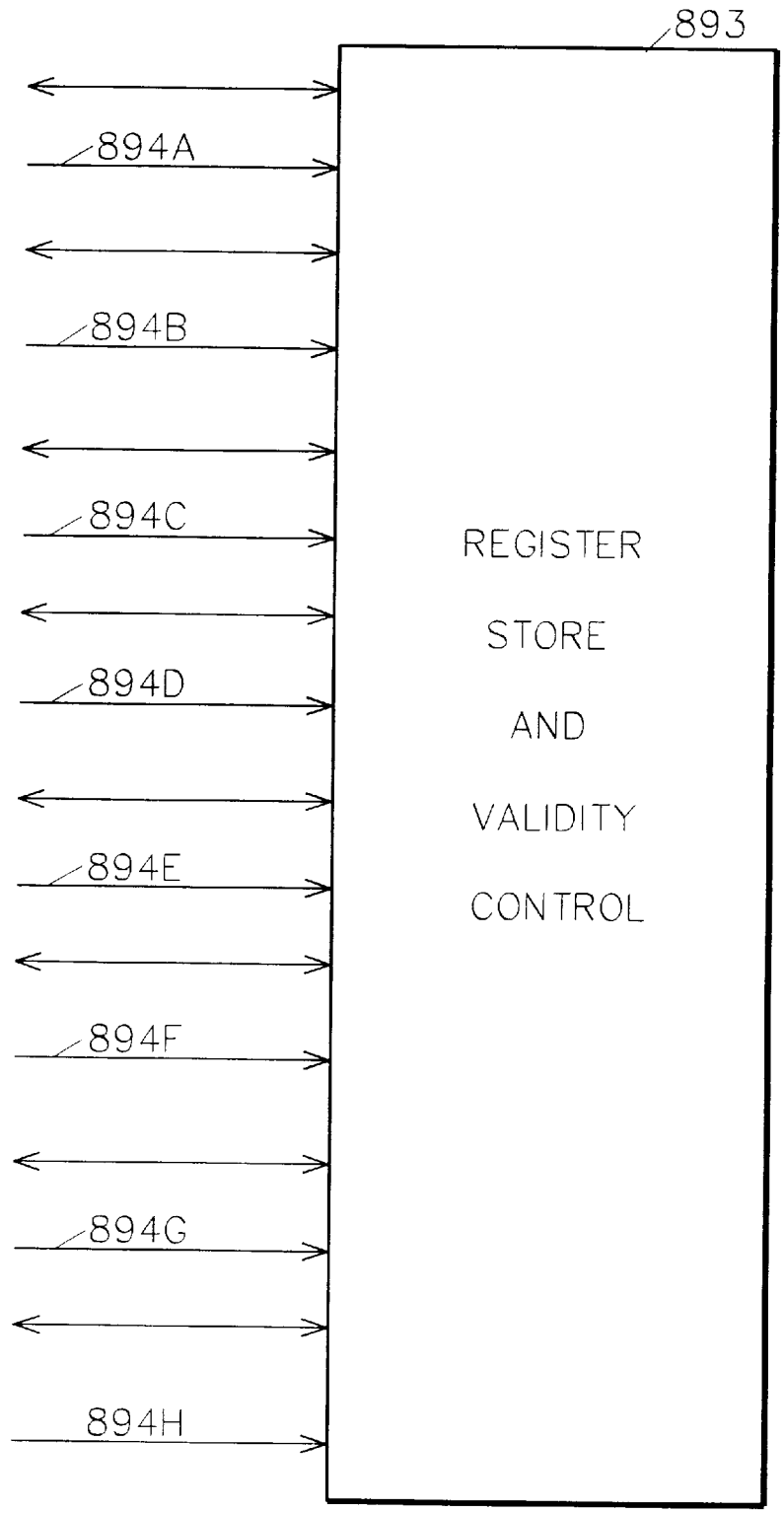

Referring to FIG. 24, the send response invalidate logic block 338 of FIG. 11A will be described. Send FIFO 42 send message register 1 553 word-wide message data bus 124 feeds time stamp 817 and address fields 813 and 818 from message header 128 to comparators 891A through 891H. Time stamp 816 and address word 826 are fed from local bus 336A into the corresponding fields of registers 890A to 890H, along with register valid fields 892A through 892H. Registers 892A through 892H outputs are fed to comparators 891A through 891H, respectively. Time stamp 817 greater (than time stamp 890A through 890H, respectively) lines 894A through 894H are fed to register store and validity control block 893. Comparator 891A through 891H outputs are also fed to OR gate 895, which generates as its output a signal signifying erase message from send FIFO 42. Bidirectional buses also interconnect register store and validity control 893 with each of registers 890A through 890H. Register valid bits 892A through 892H are set to 1 when address 820, 822 and time stamp 816 are loaded the corresponding register 892A through 892H, and set to 0 when time stamp 817 is greater than time stamp 816.

Referring to FIGS. 11A, 11B, 24A and 24B, the method and structure for erasing response messages 13C from send FIFO 42 involves send response invalidate logic 338. When send FIFO 40 is sending each invalidate message to network 20, send FIFO 42 is not sending messages to network 20 because only one send FIFO 40, 41, 42 can be sending at any given time. While sending each invalidate message for a given cache line, send FIFO 40 sends the address field 813, 818 and time stamp 817 of the update for that cache line over bus 336A to the send response invalidate logic 338 associated with send FIFO 42. Logic 338 is a set of eight registers 890A to 890H, where each register contains one copy of the address fields 813, 818 and time stamp 817 for every cache line that has been stored with updated data to node memory 54 of the local node 30. The contents of each register 890A to 890H is marked as containing valid data or not by validity bits 892A to 892H, respectively. Register store & validity control logic 893 searches for an available register 890A to 890H to store each new set of invalidation parameters 813, 818, 817 as they arrive over bus 336A. Send response invalidate logic 338 checks the header 128 (available from send message register 553) of every outgoing message being sent to the network 20 from send FIFO 42, when each outgoing message header 128 gets to the head of FIFO 42 and is placed in send message register 553.

Logic 338 compares in parallel, using comparators 891A to 891H, the address fields 820, 822 and time stamp 816 of all registers 890A to 890H with the address fields 813, 818 and time stamp 817 of the outgoing message header 128. If there is an address field compare (820, 822 compares identically with 813, 818) and the time stamp 817 of the outgoing messages is less than time stamp 816 of the register 890a to 890H, the message is erased (not sent over network 20) from send FIFO 42 and the next sequential message is moved to the head of send FIFO 42 and undergoes the same set of compares in logic 338.

If the address fields 813, 818 do not compare equally, the message is sent to network 20. If the time stamp 817 of the outgoing message is greater than the time stamp 816 of any register 890A to 890H, the associated register 890A to 890H is cleared to make room for more recent address fields 820, 822 and time stamps 816 arriving from invalidation directory 32 over bus 336A. In accordance with the method of the preferred embodiment of the invention, if the next message in send FIFO 42 has a time stamp 817 that is later in time than the time stamp 816 held in any register 890A to 890H, then there are no messages in send FIFO 42 that could contain old data for the address field 813, 818 of the corresponding register 890A to 890H, because all messages in send FIFO 42 were generated after the old data was updated in local memory 54.

Referring further to FIGS. 11A and 11B, the method of the preferred embodiment of the invention for erasing response messages at RCV FIFO 46 having cache lines containing invalidated data involves RCV response invalidate logic 339. RCV response invalidate logic 339 works exactly the same way send response invalidate logic 338 works, as was previously explained with respect to FIGS. 24A and 24B, except it applies to messages being held in RCV FIFO 46. The purpose is to erase messages containing obsolete data that have been sent across the network from a remote node 34. Whether the copy of the cache line having the obsolete data has been stored to the local caches or is waiting to be processed in RCV FIFO 46 does not matter. The obsolete data must be invalidated from the caches or erased from RCV FIFO 46. The only difference between send response invalidate logic 338 and RCV response invalidate logic 339 is that address fields 814, 818 and time stamp 817 are sent over bus 336B to RCV response invalidate logic 339, after memory controller 210 received an invalidate message 13E from the network for that address 814, 818.

Referring further to FIGS. 11A and 11B, after being transferred across network 20, invalidate messages 13E are received into RCV FIFO 44. Logic 510 causes the message to be passed to RCV FIFO 44 based on bits 810 to 812 of message header word 826 being 101, respectively. RCV FIFO 44 receives all messages having bits 810 to 812 set to 101, because this indicates an invalidation message 13E. The incoming message 13E is stored at the tail of RCV FIFO 46. If the RCV FIFO is empty when the message is stored to the FIFO 44 (this is the normal case), the message goes immediately to the head of the RCV FIFO 44 and is processed immediately. If RCV FIFO 44 is not empty, the message must work its way to the head of the FIFO before it is processed. The processing involves forwarding invalidation address 814, 818 over bus 410 to L2 Cache 204 and memory controller 210 of the receiving node. The L2 Cache will invalidate the cache line if it still has a copy, and inform the L1 Cache to invalidate the cache line also if it still has a copy.

Referring to FIG. 15, Memory controller 210 is informed of the invalidation in case it has an active remote read file 640 entry for the cache line being invalidated. If it does, memory controller 210 initiates another read request message 13A for the same cache line to read the update data from a remote node. It is not possible that obsolete data can be returned for the invalidated cache line, because obsolete data has been erased from both the sending FIFO 42 of the node 34 generating the response message 13C, and from the RCV FIFO 46 of the node 30 receiving the invalidation message 13E. The RCV FIFO operation is complete at this time and the old cache line is erased from caches 100, 204, allowing the next message in the RCV FIFO 44 to move to the head of the FIFO for processing.

C) Node 30 Stores Data to Remote Memory

When processor 50 performs a store operation to memory controller 210, and the sector address 820 of the cache line being updated (stored) is not equal to the node ID register 470, the store goes out over network 20 to remote memory 54. Remote read/store message generation block 630 of memory controller 210 generates a remote store message 13B to send FIFO 41 based on the memory address word 826A. In this case the message 13B is comprised of the message header word 128 followed by the eight double-words of cache line being updated by the store operation. The memory address word 826A is converted to the message header word 128 as described above, except bits 810 to 812 are set to 010, respectively, to indicate a remote store message 13B. The other control bits 815 and 817 and 19 are all set to zeroes. The word count is set to binary 16 (1000), indicating that the message contains 16 data words. Memory controller 210 forwards message header 128 followed by the 16 data words 854 over bus 211 to send FIFO 41 of network adapter 10. All stores to remote nodes are sent to send FIFO 41 over bus 211. Storing a message to send FIFO 41 starts a network operation, where node 30 becomes the sending node because it is sending store data to a remote node 34.

Referring to FIGS. 11A, 11B, and 15A through 15C, each new message is stored at the tail of Send FIFO 41. It awaits its turn to be sent to network 20. The message at the head of the FIFO is sent to the network first. Selector 500 performs a priority function amongst the three send FIFOs 40, 41, 42 to determine which FIFO sends the next message. When selected to be transmitted to network 20, the remote store message 13B travels across the network as routed by network router logic 530 based on the destination field 813B. At the remote receiving node 34, the incoming message is synchronized and recovered by block 540. The RCV FIFO 45 is selected to receive the store message by RCV FIFO Selection logic 510 because bits 810 and 811 are both zeroes. RCV FIFO 45 receives all store messages. The processing involves forwarding the message header 128 and the updated cache line to remote memory controller 210 over bus 216 of the remote receiving node 34. The RCV FIFO operation is complete at this time and the message 13B is erased from RCV FIFO 45, allowing the next message in the FIFO to move to the head of the FIFO for processing.

Referring to FIGS. 15A through 15C, the remote store operation continues as memory controller 210 uses block 670 to turn message header 128 back into the same memory address word 826B from whence it was generated at the sending node. The recreated memory address word 826B is used to find and write to the cache line of memory in node memory 54 pointed to by address word 826. Memory controller 210 compares the Memory Sector bits 820 of the memory address word 826 to Node ID register 470. The compare is found to be identical determining that the address 826 is located in the local node memory 54 of the receiving node. Memory controller 210 sends address 826B over bus 240 to select the memory location to be written, and writes data words 854 over bus 242 to node memory 54. Memory controller 210 sends address 826B and the new store data to L2 Cache 204, so the caches get a copy of the changed cache line. The L2 Cache will inform the L1 Cache if it has a copy to invalidate the cache line.

Memory controller 210 compares the address 826 of the store operation to changeable area locator register 472 using comparator 672. If the store is determined to be outside of the changeable area 222 of memory 54, no further action is required except to store word 854 to memory 54. If the store is determined to be to changeable area 222 of memory 54, the network adapter 10 becomes involved. Address word 826 is shifted right 3 places and sent over bus 240 to the invalidate directory 32. The invalidate directory 32 then sends invalidation messages 13E when required, and functions identically to the way described above for invalidation messages 13E generated by the local processor 50.

D) L2 Caches Casts Out a Cache Line

Referring to FIGS. 2A–2B and 15A–15C, everytime L2 cache 204 casts out a least recently used cache line to make room for an incoming cache line, the address 826A of the replaced cache line is sent to memory controller 210 over address bus 201. Memory controller 210 receives the address word 826A and performs the usual local verse remote node check. If address 826A is for a local address, memory controller 210 passes section 822A of address 826A (shifted 3 places to the right) over address bus 240 to invalidate directory 32, while activating cast out signal 999 and sending its own node # from register 470 as the requesting node ID 814 number.

Referring to FIGS. 21A and 21B, invalidate directory 32 receives address 822A to invalidate address register 880, and the requesting node ID 814 to register 884. Invalidate directory 32 reads invalidate words 860 (FIG. 19) from invalidate directory memory 332 to register 870 and searches for an 862 or 864 field that matches the node ID number in register 884. When if finds a compare, validity bit checking and control block 882 turns the associated validity bit 861 or 863 to remove the requesting node from the list of nodes 30, 34 in the invalidate directory 32 that have copies of the cache line addresses by address word 826A. In a similar operation, if a local or remote store operation attempts to replace a cache line in the L1 or L2 cache 100, 204, which previously did not exist in either cache 100, 204, the caches 100, 204 do not store the updated cache line. Instead, the caches 100, 204 return the address 826A of the updated cache line over bus 201 as a cast out address. Memory controller 210 then performs the same procedure described above and removes node ID number of the cast out cache line from the list of nodes having a copy of the cache line as stored in invalidation directory 32.

Referring again to FIGS. 15A–15C, if the address 826A of the cast out cache line is determined by memory controller 210 to be located in remote memory rather than local memory, memory controller generates a cast out message 13F. The remote read/store message generation block 630 generates the cast out message 13F exactly the same way it generates a read request message 13A, except that bits 810 to 812 are set to 110, respectively, to indicate that this message is a cast out message 13F. Message 13F is processed the same way a read request message 13A is processed by being sent to send FIFO 42, over network 20, to RCV FIFO 46. RCV FIFO 46 passes the cast out message 13F to the memory controller 210 of the remote node 34 receiving the message 13F over bus 218. Memory controller 210 determines it is a cast out message and passes address 822B, sending node ID 814, and the cast out signal 999 to invalidation directory 32. Invalidation directory 32 processes the cast out operation in the exact same manner as described above, and sets the corresponding validity bit 861 or 863 to 0 to remove the requesting node from the list of nodes 30, 34 in the invalidate directory 32 that have copies of the cache line addresses by address word 822B.

E) Cache Update Instead of Invalidate

An alternative embodiment is to update all caches having copies of the cache line, instead of invalidating them. In this case, cache update messages 13G are used over the network instead of invalidation messages 13E. Referring to FIGS. 2A–2B and 21A–21B, invalidate directory 32 generates cache update messages 13G in block 887 similar to the way it generates invalidation messages 13E. The message header 128 of message 13G is generated in the same way that the invalidate message 13E is generated, except that bits 810 to 812 are set to ill, respectively, to indicate that this message is a cache update message 13G. In addition, cache update message 13G is comprised of 16 words containing the updated data for the changed cache line. Generate invalidation/update messages block 887 receives the updated cache line from store from remote node bus 216 from RCV FIFO 45 in parallel with the updated cache line being sent to memory controller 210. Generate invalidation/update messages block 887 buffers the updated cache line and then appends the 16 data words 130 to message header 128 to form cache update message 13G. Cache update messages 13G, like invalidation messages 13E, are sent to all nodes having copies of the cache line as recorded in invalidation words 860 of invalidation directory 32. The only difference in the operation for sending cache update message 13G is that the words 860 are not changed by cache update messages 13G, because all nodes 30, 34 having copies of the cache line are given updated copies of the cache line instead. Cache update messages 13G, like invalidation messages 13E, go from node to node using send FIFO 42 and RCV FIFO 46.

Advantages Over the Prior Art

It is an advantage of the system and method of the invention that distributed memory system is provided which includes a scalable plurality of nodes having with shared memory and cache coherency.

It is a further advantage this invention that normal SMP performance enhancement techniques, such as caching and multi-threading, is provided to be used with SMPs when operating over multi-stage networks.

It is a further advantage of this invention that a tightly coupled system, with each processing node containing a portion of the shared memory space, and any node able to access its local portion of shared memory or the remote portion of shared memory contained at other nodes over the network is provided in the most expedient manner.

It is an advantage of the invention that coherency functions over a network are greatly facilitated through the segregation of these functions among three message protocols among three FIFO pairs across the network.

Alternative Embodiments

It will be appreciated that, although specific embodiments of the invention have been described herein for purposes of illustration, various modifications may be made without departing from the spirit and scope of the invention.

Accordingly, the scope of protection of this invention is limited only by the following claims and their equivalents.

I claim:

1. A shared memory parallel processing system including a plurality of processing nodes, comprising:
   a multi-stage communication network for interconnecting said processing nodes, said network including a plurality of self-routing switches cascaded into first, middle and last stages, each said switch including a plurality of switch inputs and a plurality of switch outputs, each of said switch outputs of each said switch coupled to a different switch input of others of said switches, switch outputs of said last stage switches including network output ports, and switch inputs of said first stage switches comprising network input ports;
   each processing node including:
      a network adapter for transmitting and receiving messages with respect to other processing nodes over said network;
      a local processor;
      at least one private write-through cache;
      a section of shared memory organized into a plurality of cache lines, each cache line including one or more addressable memory locations;
      a cache coherency directory for tracking which of said nodes have copies of each cache line;
   said local processor at a first processing node being operable for writing data to said private cache at said first node, as the same data is written to either shared memory at said first node or sent over said network for writing to the shared memory and private cache of a second processing node.

2. The shared memory parallel processing system of claim 1, wherein said section of shared memory is divided into first and second portions, said first portion for storing unchangeable data, and said second portion for storing changeable data.

3. The shared memory parallel processing system of claim 2, said cache coherency directory for this processing node listing which nodes of the plurality of nodes have accessed copies of said cache lines in said second portion of shared memory at this processing node.

4. The shared memory parallel processing system of claim 3, wherein each said processing node is operable for reading, storing, and invalidating the shared memory at any of said plurality of processing nodes selectively by transmitting and receiving messages over said network, a first message type for requesting the read of a cache line, a second message type for returning the requested cache line, a third message type for storing a cache line, and a fourth message type for invalidating a cache line.

5. The shared memory parallel processing system of claim 4, said network adapter further comprising:

- a first buffer for transmitting to said network shared memory read command messages of said first message type and said second message type;
- a second buffer for transmitting to said network shared memory store command messages of said third message type;
- a third buffer for transmitting to said network invalidate messages for said cache coherency directory of said fourth message type;
- a fourth buffer for receiving from said network shared memory read command messages of said first message type and said second message type;
- a fifth buffer for receiving from said network shared memory store command messages of said third message type; and
- a sixth buffer for receiving from said network invalidate messages for said cache coherency directory of said fourth message type.

6. A shared memory parallel processing system, comprising:

- a plurality of nodes, each node including a node memory, at least one cache, and a memory controller;
- a multi-stage switching network for interconnecting said processing nodes, said switching network including a plurality of self-routing switches cascaded into first, middle and last stages, each said switch including a plurality of switch inputs and a plurality of switch outputs, each of said switch outputs of each said switch coupled to a different switch input of others of said switches, switch outputs of said last stage switches including network output ports, and switch inputs of said first stage switches comprising network input ports;
- a system memory distributed to said node memories of said plurality of nodes and accessible by any node; each said node memory being organized into a plurality of addressable word locations;
- said memory controller at this node operable for performing local memory access to the portion of system memory at this node and for performing remote memory access over said network to the portion of system memory at other nodes; and
- a cache coherency controller at this node being responsive to both local memory accesses and remote memory accesses to data stored in a word location of said node memory at this node for caching accessed data in the cache of this node and for communicating data for assuring cache coherency throughout said system over said network.

7. The shared memory processing system of claim 6, said system memory being distributed in equal portions to each said node memory; and said node memory being further sub-divided into a first memory section for storing data that is changeable and a second memory section for storing data that is unchangeable.

8. The shared memory processing system of claim 6, further comprising node indicia for uniquely identifying each node.

9. The shared memory processing system of claim 6, said cache coherency controller further comprising:

- an invalidation directory for storing a list of node indicia identifying those nodes having accessed a copy of each said cache line of node memory since the last time the cache line was changed.

10. The shared memory processing system of claim 9, said cache coherency controller further comprising:

- an overflow directory for expanding said invalidation directory when the list of node indicia for a cache line becomes too long to contain entirely with said invalidation directory.

11. A shared memory parallel processing system, comprising:

- a plurality of nodes, each node including a node memory, at least one cache, and a memory controller;
- a multi-stage switching network for interconnecting said processing nodes, said switching network including a plurality of self-routing switches cascaded into first, middle and last stages, each said switch including a plurality of switch inputs and a plurality of switch outputs, each of said switch outputs of each said switch coupled to a different switch input of others of said switches, switch outputs of said last stage switches including network output ports, and switch inputs of said first stage switches comprising network input ports; and
- a network adapter responsive to a node connection request for establishing a connection path to a target node, first by attempting to establish a quick connection path across a plurality of segments of said switching network to said target node, and upon determining any one of said plurality of segments is not available, issuing a camp-on connection request to said target node.

12. The shared memory parallel processing system of claim 11, further comprising:

- said plurality of nodes each coupled to one of the network output ports and to one of the network input ports;
- each node further including:
  - receive means for receiving a data message; and
  - send means for sending a data message across an n-stage switching network from a local node to a remote node, said send means generating said connection request including n sequential connection commands, each sequential connection command selecting one of said plurality of connection segments for each of the n switch stages of said network.

13. The shared memory parallel processing system of claim 11, each said switch being responsive to node connection requests and camp-on connection requests for establishing connection segments from any switch input port to any switch output ports.

14. The shared memory parallel processing system of claim 13, each said switch further comprising:

- a data bus for transferring said data message;
- a rejection control line for signaling back to a sending node a rejection of any connection request;

an acceptance control line for signaling back to said sending node the acceptance of a camp-on connection request;

a valid control line for receiving from said sending node the activation of a node connection request; and a camp-on control line for receiving from said sending node the activation of a camp-on connection request.

15. A method for operating a shared memory parallel processing system, said system including:

a plurality of processing nodes, each node including a node memory, at least one cache, and a memory controller;

a multi-stage switching network for interconnecting said processing nodes, said switching network including a plurality of self-routing switches cascaded into first, middle and last stages;

the method comprising the steps of:

distributing a system memory to said node memories of said plurality of nodes and accessible by any node; each said node memory being organized into a plurality of addressable word locations;

operating said memory controller at this node for performing local memory access to the portion of system memory at this node and for performing remote memory access over said network to the portion of system memory at other nodes; and operating a cache coherency controller at this node responsive to both local memory accesses and remote memory accesses to data stored in a word location of said node memory at this node for caching accessed data in the cache of this node and for communicating data for assuring cache coherency throughout said system over said network.

16. The method of claim 15, wherein each said switch includes a plurality of switch inputs and a plurality of switch outputs, each of said switch outputs of each said switch coupled to a different switch input of others of said switches, switch outputs of said last stage switches including network output ports, and switch inputs of said first stage switches comprising network input ports.

17. The method of claim 16, said plurality of nodes each coupled to one of the network output ports and to one of the network input ports, further comprising the steps of:

receiving a data message; and sending a data message across an n-stage switching network from a local node to a remote node, including generating a connection request having n sequential connection commands, each sequential connection command selecting one of said plurality of connection segments for each of the n switch stages of said network.

18. The method of claim 16, further comprising the steps of:

responsive to node connection requests and camp-on connection requests, establishing connection segments from any switch input port to any switch output ports.

19. The method of claim 18, further comprising the steps of:

transferring said data message to a data bus;

selectively signaling back to a sending node a rejection of any connection request;

selectively signaling back to said sending node the acceptance of a camp-on connection request;

selectively receiving from said sending node the activation of a node connection request; and selectively receiving from said sending node the activation of a camp-on connection request.

20. A program storage device readable by a machine, tangibly embodying a program of instructions executable by a machine to perform method steps for operating a shared memory parallel processing system, said method steps comprising:

distributing a system memory to node memories of a plurality of nodes and accessible by any node; each said node memory being organized into a plurality of addressable word locations;

operating a memory controller at this node for performing local memory access to a portion of system memory at this node and for performing remote memory access over a network to the portion of system memory at other nodes; and operating a cache coherency controller at this node responsive to both local memory accesses and remote memory accesses to data stored in a word location of said node memory at this node for caching accessed data in the cache of this node and for communicating data for assuring cache coherency throughout said system over said network.

21. An article of manufacture comprising:

a computer useable medium having computer readable program code means embodied therein for operating a shared memory parallel processing system, the computer readable program means in said article of manufacture comprising:

computer readable program code means for causing a computer to effect distributing a system memory to node memories of a plurality of nodes and accessible by any node; each said node memory being organized into a plurality of addressable word locations;

computer readable program code means for causing a computer to effect operating a memory controller at this node for performing local memory access to a portion of system memory at this node and for performing remote memory access over a network to the portion of system memory at other nodes; and computer readable program code means for causing a computer to effect operating a cache coherency controller at this node responsive to both local memory accesses and remote memory accesses to data stored in a word location of said node memory at this node for caching accessed data in the cache of this node and for communicating data for assuring cache coherency throughout said system over said network.

22. A computer program element for operating a shared memory parallel processing system according to the steps of:

distributing a system memory to node memories of a plurality of nodes and accessible by any node; each said node memory being organized into a plurality of addressable word locations;

operating a memory controller at this node for performing local memory access to a portion of system memory at this node and for performing remote memory access over a network to the portion of system memory at other nodes; and operating a cache coherency controller at this node responsive to both local memory accesses and remote memory accesses to data stored in a word location of said node memory at this node for caching accessed data in the cache of this node and for communicating data for assuring cache coherency throughout said system over said network.

23. A method for operating a shared memory parallel processing system, comprising the steps of:
- distributing a system memory to node memories of a plurality of nodes and accessible by any node; each node memory being organized into a plurality of addressable word locations;
- performing local memory access to a portion of system memory at this node;
- performing remote memory access over a network to the portion of system memory at other nodes; and
- responsive to both local memory accesses and remote memory accesses to data stored in a word location of said node memory at this node,
   - caching accessed data in the cache of this node, and
   - communicating data for assuring cache coherency throughout said system over said network.

24. A shared memory parallel processing system, comprising:
- means for distributing a system memory to node memories of a plurality of nodes and accessible by any node; each node memory being organized into a plurality of addressable word locations;
- means for performing local memory access to a portion of system memory at this node;
- means for performing remote memory access over a network to the portion of system memory at other nodes; and
- means responsive to both local memory accesses and remote memory accesses to data stored in a word location of said node memory at this node,
   - for caching accessed data in the cache of this node, and
   - for communicating data for assuring cache coherency throughout said system over said network.

* * * * *